(12) United States Patent
Altberg et al.

(10) Patent No.: US 8,077,849 B2
(45) Date of Patent: Dec. 13, 2011

(54) SYSTEMS AND METHODS TO BLOCK COMMUNICATION CALLS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US)

(73) Assignee: UTBK, Inc., Dover, DE (US)

( * ) Notice: Subject to any disclaimer, the term of this patent is extended or adjusted under 35 U.S.C. 154(b) by 1303 days.

(21) Appl. No.: 11/624,641

(22) Filed: Jan. 18, 2007

(65) Prior Publication Data

US 2007/0165821 A1    Jul. 19, 2007

Related U.S. Application Data

(60) Provisional application No. 60/830,927, filed on Jul. 13, 2006.

(51) Int. Cl.
*H04M 3/42*    (2006.01)

(52) U.S. Cl. .................................................. 379/201.01

(58) Field of Classification Search ................ 705/1, 39; 370/352
See application file for complete search history.

(56) References Cited

U.S. PATENT DOCUMENTS

| | | | |
|---|---|---|---|
| 4,741,025 A | 4/1988 | Maruyama et al. | |
| 4,796,293 A | 1/1989 | Blinken et al. | |
| 5,099,510 A | 3/1992 | Blinken, Jr. et al. | |
| 5,373,549 A | 12/1994 | Bales et al. | |
| 5,436,957 A | 7/1995 | McConnell | |
| 5,483,352 A | 1/1996 | Fukuyama et al. | |
| 5,483,588 A | 1/1996 | Eaton et al. | |
| 5,539,813 A | 7/1996 | Jonsson | |
| 5,544,237 A | 8/1996 | Bales et al. | |
| 5,559,875 A | 9/1996 | Bieselin et al. | |
| 5,619,555 A | 4/1997 | Fenton et al. | |
| 5,644,715 A | 7/1997 | Baugher | |
| 5,689,553 A | 11/1997 | Ahuja et al. | |
| 5,740,549 A | 4/1998 | Reilly et al. | |
| 5,793,851 A | 8/1998 | Albertson | |
| 5,841,763 A | 11/1998 | Leondires et al. | |
| RE36,111 E | 2/1999 | Neville | |
| 6,085,084 A | 7/2000 | Christmas | |
| 6,131,085 A | 10/2000 | Rossides | |
| 6,301,350 B1 | 10/2001 | Henningson et al. | |
| 6,535,506 B1 | 3/2003 | Narain et al. | |
| 6,813,346 B2 | 11/2004 | Gruchala et al. | |
| 6,832,321 B1 | 12/2004 | Barrett | |
| 6,836,225 B2 | 12/2004 | Lee et al. | |
| 6,847,992 B1 | 1/2005 | Haitsuka et al. | |

(Continued)

OTHER PUBLICATIONS

USPTO Transaction History of U.S. Appl. No. 10/923,396, filed Aug. 20, 2004, entitled "Gate Keeper."

(Continued)

*Primary Examiner* — Creighton Smith
(74) *Attorney, Agent, or Firm* — Greenberg Traurig, LLP

(57) ABSTRACT

Methods and apparatuses to block calls from reaching destinations. In one embodiment, a method includes: receiving a call for a connection to an entity via a reference; based on the reference used for the call, determining a reference of the entity; determining whether the call is to be blocked; and responsive to a determination that the call is not to be blocked, establishing the connection to the entity using the reference of the entity.

19 Claims, 33 Drawing Sheets

U.S. PATENT DOCUMENTS

| | | | |
|---|---|---|---|
| 6,850,965 | B2 | 2/2005 | Allen |
| 6,859,833 | B2 | 2/2005 | Kirsch et al. |
| 6,910,159 | B2 | 6/2005 | Phillips et al. |
| 6,937,699 | B1 | 8/2005 | Schuster et al. |
| 6,965,870 | B1 | 11/2005 | Petras et al. |
| 6,968,174 | B1 | 11/2005 | Trandal et al. |
| 6,990,183 | B2 | 1/2006 | Holland et al. |
| 6,996,216 | B2 | 2/2006 | Brown et al. |
| 6,999,478 | B2 | 2/2006 | D'Angelo |
| 7,013,001 | B1 | 3/2006 | Felger et al. |
| 7,028,012 | B2 | 4/2006 | St. Vrain |
| 7,031,697 | B2 | 4/2006 | Yang et al. |
| 7,035,381 | B2 | 4/2006 | D'Ascenzo et al. |
| 7,046,782 | B2 | 5/2006 | Miller |
| 7,076,037 | B1 | 7/2006 | Gonen et al. |
| 7,092,901 | B2 | 8/2006 | Davis et al. |
| 7,103,010 | B2 | 9/2006 | Melideo |
| 7,120,235 | B2 | 10/2006 | Altberg et al. |
| 7,142,840 | B1 | 11/2006 | Geddes et al. |
| 7,200,413 | B2 | 4/2007 | Montemer |
| 7,212,615 | B2 | 5/2007 | Wolmuth |
| 7,224,781 | B2 | 5/2007 | Jacob et al. |
| 7,231,405 | B2 | 6/2007 | Xia |
| 7,249,045 | B2 | 7/2007 | Lauffer |
| 7,366,683 | B2 | 4/2008 | Altberg et al. |
| 7,412,049 | B1 | 8/2008 | Koch |
| 7,434,169 | B2 | 10/2008 | Quillen et al. |
| 7,886,009 | B2 | 2/2011 | Faber et al. |
| 2001/0018178 | A1 | 8/2001 | Siefert |
| 2002/0035647 | A1 | 3/2002 | Brown et al. |
| 2002/0087353 | A1* | 7/2002 | Han .................................. 705/1 |
| 2002/0137490 | A1 | 9/2002 | Gallant |
| 2002/0164006 | A1* | 11/2002 | Weiss ....................... 379/201.01 |
| 2003/0041255 | A1 | 2/2003 | Chen et al. |
| 2003/0115089 | A1 | 6/2003 | Lurie |
| 2004/0038673 | A1 | 2/2004 | Dunn et al. |
| 2004/0054741 | A1 | 3/2004 | Weatherby et al. |
| 2005/0071509 | A1 | 3/2005 | Faber et al. |
| 2005/0119957 | A1 | 6/2005 | Faber et al. |
| 2005/0239447 | A1 | 10/2005 | Holzman et al. |
| 2006/0034257 | A1 | 2/2006 | Hollatz et al. |
| 2006/0069610 | A1 | 3/2006 | Rossini |
| 2007/0283006 | A1* | 12/2007 | Hong ............................ 709/224 |
| 2008/0207190 | A1 | 8/2008 | Altberg et al. |
| 2009/0316687 | A1* | 12/2009 | Kruppa ........................ 370/352 |
| 2010/0144380 | A1* | 6/2010 | Washburn .................... 455/466 |
| 2010/0226261 | A1* | 9/2010 | Piche ........................... 370/252 |

OTHER PUBLICATIONS

USPTO Transaction History of U.S. Appl. No. 11/678,012, filed Feb. 22, 2007, entitled "Systems and Methods to Confirm Initiation of a Callback."

USPTO Transaction History of U.S. Appl. No. 11/697,932, filed Apr. 9, 2007, entitled "Systems and Methods to Provide Connections via Callback Acceptance."

Avinta Communications, Inc., TriVOX product information located at http://www.avinta.com/products-1/uwc/home/uwchme.htm, available at least by Oct. 11, 2006.

Privacy Corps, Caller ID Manager product information located at http://www.privacycorps.com/products/?id=20, available at least by Oct. 11, 2006.

Privacy Rights Clearinghouse, "Fact Sheet 3: Stopping Harassing Phone Calls," located at http://www.privacyrights.org/fs/fs3-hrs2.htm, available at least by Oct. 11, 2006.

Voice Call Central, Picture Caller ID Software product information located at http://www.voicecallcentral.com/block_unwanted_calls.htm, available at least by Oct. 11, 2006.

* cited by examiner

Start your call now

Your Telephone — How this works — Bill
Tell more about me

We're going to call Bill now and tell him that you would like to talk. We'll let him know that you're available to start a call sometime in the tine window you selected below.

Time window: [4 Hours ▽] 1001

Your Phone number: ( [415] ) [731] – [0277] 1003

Your comments to this person in requesting this connection: [I'm Bob Stanley. Remember we met at the golf conference last weekend.] 1005

> You will not be charged if we cannot get a hold of this person.
> Your phone number is never revealed (More about security).

[Call Now] 1007    SECURE SERVER

© 2005 Ingenio, Inc. All Rights Reserved. | Trademark Notice | Privacy

FIG. 17

| Caller | Call Within | Status | Past Purchase | Comment | |
|--------|-------------|--------|---------------|---------|---|
| Bob37 | 4 Hour | New ▽ | 0 | I'm Bob Stanley. Remember we met at the golf conference last weekend. | △ △ ▽ ▽ |
| unknown | 3 Hour | New ▽ | 0 | | △ △ ▽ ▽ |
| Smith Lee | 1 Hour | VIP ▽ | $237 | | △ △ ▽ ▽ |
| Tod | 1 Hour | Preferred ▽ | $37 | I need a quick answer. | △ △ ▽ ▽ |
| SSX | 4 Hour | Block ▽ | 0 | | △ △ ▽ ▽ |

Hide Blocked Callers

| Callee's User ID 3101 | Callee's Phone Number 3102 | Caller's User ID 3103 | Caller's Phone Number 3104 | Caller's IP Address 3105 | Block Expiration 3106 |
|---|---|---|---|---|---|
| A123 3111 | * 3112 | * 3113 | 456-789-1234 3114 | 178-25-3 3115 | 2006-11-31 3116 |
| * 3121 | * 3122 | * 3123 | 456-789-1234 3124 | * 3125 | 2006-12-31 3126 |
| B213 3131 | * 3132 | C821 3133 | 456-789-1234 3134 | * 3135 | 2006-12-31 3136 |
| D533 3141 | 800-789-1234 3142 | C821 3143 | 456-789-1234 3144 | * 3145 | 2006-12-31 3146 |

SYSTEMS AND METHODS TO BLOCK COMMUNICATION CALLS

"This application is related to U.S. application Ser. No. 11/329,677, entitled "Systems and methods to arrange call back" and filed on Jan. 10, 2006, and Provisional U.S. Provisional Application No. 60/830,927, filed Jul. 13, 2006, entitled "Systems and Methods to Manage a Queue of People Requesting Real Time Communication Connections". The disclosures of the above referenced applications are hereby incorporated herein by reference".

TECHNOLOGY FIELD

At least some embodiments of the present invention relate to user interface techniques to assist people to connect for real-time communication, such as connecting people for telephonic conversation, chat, document sharing, screen-sharing, etc.

BACKGROUND

Internet, cellular communication systems, television, newspaper, etc., provide diverse communication media channels through which people may receive information and/or communicate with each other.

For example, telephone systems allow users to conduct real time two-way/full-duplex communications in voice. Traditional land-line based telephone systems connect one telephone set to another through one or more switching centers, operated by one or more telephone companies, over a land-line based telephone network. Traditionally, a telephone connection is based on a circuit switched network.

Current telephone systems can also use a packet-switched network for a telephone connection. A packet switched network is typical in a computer data environment. Voice over Internet Protocol (VoIP) allow the delivery of voice information using a packet-switched network, such as the Internet, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide services, such as call forwarding. Call forwarding of a telephone system allows a user of a phone at a given phone number to dial a specific sequence on the phone to cause the telephone system to forward incoming calls addressed to the phone number to another specified phone number that is indicated by the dialed sequence.

Click-to-call is another service which allows users to click a button in a web page to request a voice connection to a destination. The call can be initiated from the user side via VoIP, or be initiated via a callback to a phone number that is specified by the user.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users or that returns the result of a user requested search. Since advertisements included in the web pages contain a limited amount of information (e.g., a small paragraph, an icon, etc.), the advertisements can provide links to web sites that provide further detailed information.

In certain arrangements, the advertisers pay the advertisements based on the number of visits directed to the web sites through the links embedded in the advertisements. Thus, the advertisers pay for the performance of the advertisements.

Performance based advertising generally refers to a type of advertising in which an advertiser pays for a measurable event that is a direct result of an advertisement being viewed by a consumer. For example, measurable events for some advertisements are based on the selection ("click") of the advertisements by the customers to follow the links embedded in the advertisements to the web sites of the advertisers.

People may use a web site to chronologically publish personal thoughts and web links. Such a web site may be referred to as a blog. A blog may include content showing what is happening in the life of the person, collecting information on certain types of subjects of interest to the person, providing links to related web sites, etc. Thus, a personal web site may include a collection of contents that may be helpful to people of similar interest.

BRIEF DESCRIPTION OF THE DRAWINGS

The present invention is illustrated by way of example and not limitation in the figures of the accompanying drawings in which like references indicate similar elements.

FIG. 17 shows a user interface to collect comments on a request for a communication connection according to one embodiment of the present invention.

FIG. 18 shows a user interface to manage a queue of requesters of phone connections to a callee according to one embodiment of the present invention.

FIG. 31 illustrates rules to block calls according to one embodiment of the disclosure.

SUMMARY

Figure 1:
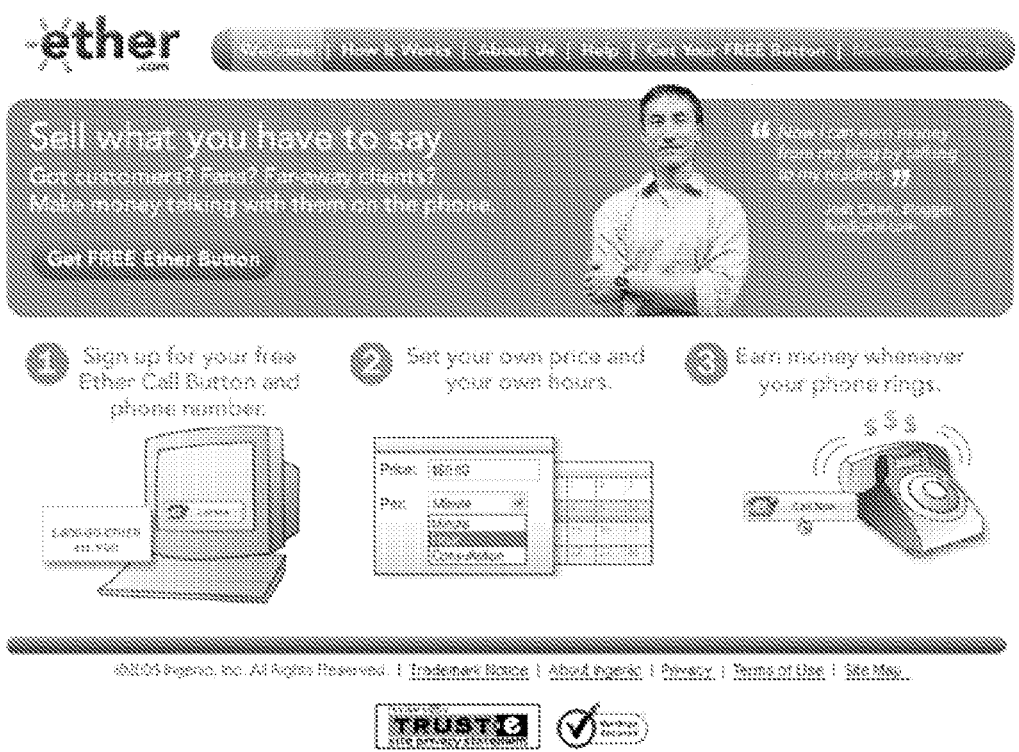
FIG. 1 illustrates a system according to one embodiment of the present invention.

Methods and apparatuses to block calls from reaching destinations are described herein. Some embodiments are summarized in this section.

In one embodiment, a method includes: receiving a call for a connection to an entity via a reference; based on the reference used for the call, determining a reference of the entity; determining whether the call is to be blocked; and responsive to a determination that the call is not to be blocked, establishing the connection to the entity using the reference of the entity.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description. References to one or an embodiment in the present disclosure can be, but not necessarily are, references to the same embodiment; and, such references mean at least one.

In one embodiment of the present invention, a system is to provide services to people who wish to make connections for real time communication, such as live telephone conversation, chat, video conferencing, instant messaging, and other forms of real time communications.

For example, benefits of the services may include anonymity for one or more of the parties of the real time communication. For example, the service can connect the caller and callee without revealing the contact information of one party to another, such as the actual telephone number. The services may include filtering callers/participants so that only those who are willing to pay can get connected. The services may include collecting payments for the callee so that the callee can earn money from talking to the callers over the phone without the burden of managing payment collection, etc. The services may include scheduling so that the real time communication are initiated at a convenient time (e.g., no night calls). The services may include queue managing to serve both the callees and the callers. The services may include providing the cool, convenient click-to-call functionality to attract callers for the callees.

In one embodiment, the services may include providing a persistent and consistent way to reach people. For example, a web link, or a toll-free number, or a local phone number can be provided by the system so that the callers can reach the callee using the web link, or the toll-free number, or the local phone number even after the telephone of the callee has been changed. The callee can publish the web link and/or the phone number, knowing that the calls will follow if the callee updates the telephone number in the system. The callees do not need to reveal their actual telephone numbers to the potential callers. If desired, the callee can keep the caller from knowing the actual telephone number of the callee for anonymity.

In general, the service may provide any combination of the benefits discussed above.

Many examples are presented in the context of telephone connection for real time conversation. Embodiments of the present invention can also be applied to other real time communication systems (e.g., text chat, instant messaging, voice/video conferencing, etc.) in a way similar to the telephone conversation.

FIG. 1 illustrates a system according to one embodiment of the present invention. As illustrated in FIG. 1, callees who have customers, fans, far-away clients, etc., can make money talking with them on the phone. The system provides the callees with services of managing the transactions such that the callees can sell what they have to say with reduced/minimum efforts on business aspects. For example, a blogger can earn money from the blog by talking to the interested readers of the blog.

In one embodiment, the callee can sign up for a call button of the system and/or for a phone number provided by the system. The call button and/or the assigned phone number can be used as the contact information of the callee. For example, the callee can publish the call button and/or the phone number in a variety of media channels and environments, such as in the blog, in advertisements, in news articles, in column discussions, in business cards, etc.

In one embodiment of the present invention, the callees manage their own distribution of the call button and/or the phone number, since the callees may have their unique ways to reach potential callers (e.g., through blogs, home pages, business cards, etc.). The callees can bring the call button and/or the phone number into the context where the customers of the callees are, such as their own web pages or blogs or business cards (e.g., via a phone number).

Alternatively, or in combination, the system may also help the callees to reach callers through presenting the call buttons and/or the phone numbers in marketplaces, such as online listings of services, advertisements embedded in the search results generated by a search engine, classified advertisements, etc.

After signing up for the call button and/or the phone number, the callees can set up their own prices and their own hours for receiving the calls. When the call button and/or the phone number leads the callers to callees, the callees can earn money by talking to the callers without having to manage scheduling, queue, payment collection, privacy, etc. For example, the callees can enjoy the benefit of anonymity provided by the system, since the callees do not have to reveal their actual phone numbers to the potential callers in order to receive calls. The system provides the filtering functionality so that some callers can reach the callees.

In one embodiment of the present invention, the services of the system are packaged and delivered through the use of a call button and/or a communication reference (such as a phone number) assigned to the callee. The callees do not have to rely upon a marketplace, such as keen.com, to reach callers.

Figure 2:
FIG. 2 illustrates a user interface to create a listing according to one embodiment of the present invention.

FIG. 2 illustrates a user interface to create a listing according to one embodiment of the present invention. In FIG. 2, the callee can specify the rate the callee will charge the callers when the callers want to talk to the callee.

In one embodiment, the callee may specify the price (rate) in terms of a package, such as $100 for one hour. A call package has a specified price for a given time limit that is longer than one minute (e.g., one hour). Alternatively, the callee may specify the price in terms of a price per unit of time, such as $2 per minute, without specifying a time limit.

In one embodiment, when the rate is specified as a package that includes a time limit (e.g., 60 minutes, two hours, etc.), the callee can further specify the policy for the continuation of the call beyond the time limit (e.g., $50 per 30 minutes thereafter, or end call, or no longer charge).

In the user interface illustrated in FIG. 2, the callee can specify the phone number (e.g., 415-861-6100) at which the system will call the callee when a customer wishes to speak to the callee. The phone number is used by the system to call the callee and make a connection to the customer. The phone number of the callee is not provided to callers (customers of the callee) for anonymity.

In one embodiment, the callee may specify a listing name (e.g., for this listing). The callee may create multiple listings with different rates, phone numbers, etc., in the same account. Optionally, the callee provide may further description and a photo (e.g., a photo of the callee) for the listing.

In one embodiment, the photo of the listing should be no larger than 70 pixel wide by 70 pixel high and should be in either GIF or JPEG format. Alternatively, the system may automatically convert the image uploaded from the callee into the appropriate size and format. However, it is understood that other sizes can also be used.

After the listing is created, the callee can select the button "Continue" to access the next screen for getting the call button.

In one embodiment, the web server of the system provides the callee with: a call button and/or a phone number, such as 1-800-GO-ETHER extension XXXX, after the callee finishes creating the listing. The call button and the phone number assigned to the callee are intended for the callee to place wherever a caller (buyer) will come across them.

For example, a golf pro provides great swing tips. The golf pro as a callee (seller) can put a call button on a blog, on a web page, in the footer of an email, etc. When people are reading the blog about golf equipment, they might think "I'm really interested in what this person has to say, I think I'll pay to talk to them live and ask them all my questions".

In one embodiment, the call button includes HTML (Hypertext Markup Language) code which contains a reference to the listing and one or more links to a server of the system. The HTML code can be inserted into the blog and/or the home page of the callee, or an email. When the HTML code is rendered in the browser of the caller (e.g., when the caller visits the blog or the home page of the callee, or when the caller views an email from the callee), the browser shows a call button which can be selected (e.g., through "clicking" on the call button using a cursor controlling device, such as a mouse, a track ball, a joystick, a touch screen, etc.) to request a phone connection. An example of the appearance of a call button includes an icon showing a telephone set and the text "call now", as illustrated in FIG. 1.

In one embodiment, when the call button is rendered, the appearance of the call button may include an icon, which when selected or activated can initiated a request for a real time communication connection.

Alternatively, the call button can be specified in documents in a format other than HTML, such as in an extensible markup language (XML).

In one embodiment, the call button can change its state depending on the state of the caller and/or callee. For instance, if the callee is already on a phone call with a caller, the button would indicate "busy", so that a second caller would see that the callee is already on a telephone. Clicking on the button in this instance would give the second caller the ability to get in line to talk to the callee. Or, in another embodiment, the second caller clicking on the button could give him the ability to join the call in progress.

In one embodiment, the call button can change its state depending on what the callee explicitly indicates. The callee could, for instance, tell the system, via a web form or telephone IVR, that he is currently "taking calls" or "not taking calls" or "offering video" or "offering chat" or "taking appointments" or taking "arranged calls" or "callbacks". He could indicate that he is taking calls and is "by my phone", indicating a heightened presence. Depending upon each of such states, the system would lead callers down different communication paths. If a callee is "by my [his/her] phone", the system might call the caller first, since it's highly probably that the callee will be available for his/her side of the connection. If the callee is simply "taking calls", the system might call the callee first, since he/she might be the more unlikely party to be available. Other communication paths include getting in line, joining a conference call, turning on a video connection, scheduling an appointment, entering into a chat session, etc.

Similarly, the golf pro can use the phone number for various offline media and other media. For example, if the golf pro writes a column for Golf Digest magazine, he can put the phone number that is assigned to him (e.g., Ether phone number) at the end of the column, such as 1-800-GO-ETHER, extension XXXX. The system can even provide him with a custom 800 number, such as 1-800-GOLF-PRO, rather than the extension to a generic 1-800-GO-ETHER number. For example, the column may include the following message: "Call me to talk about your own golf swing. Dial 1-800-GOLF-PRO. $100/hour". Alternatively, the Ether phone number can be a phone number local to a specific region of interest to the golf pro (e.g., having the same area code, or the same area code and exchange, as those in the target geographical area).

In one embodiment, the callee may request a phone number, such as "1-800-GO-ETHER" extension "YOU", which is specifically assigned to the callee (and/or the listing). The callee can publish the assigned phone number in the blog, home page, printed publications, brochure, or business card. The phone number may be given out during a TV or radio talk show, etc. When the assigned phone number is called, the call is first connected to a server of the system. The system can then call the callee and join the caller and the callee for real time communication.

Figure 3:
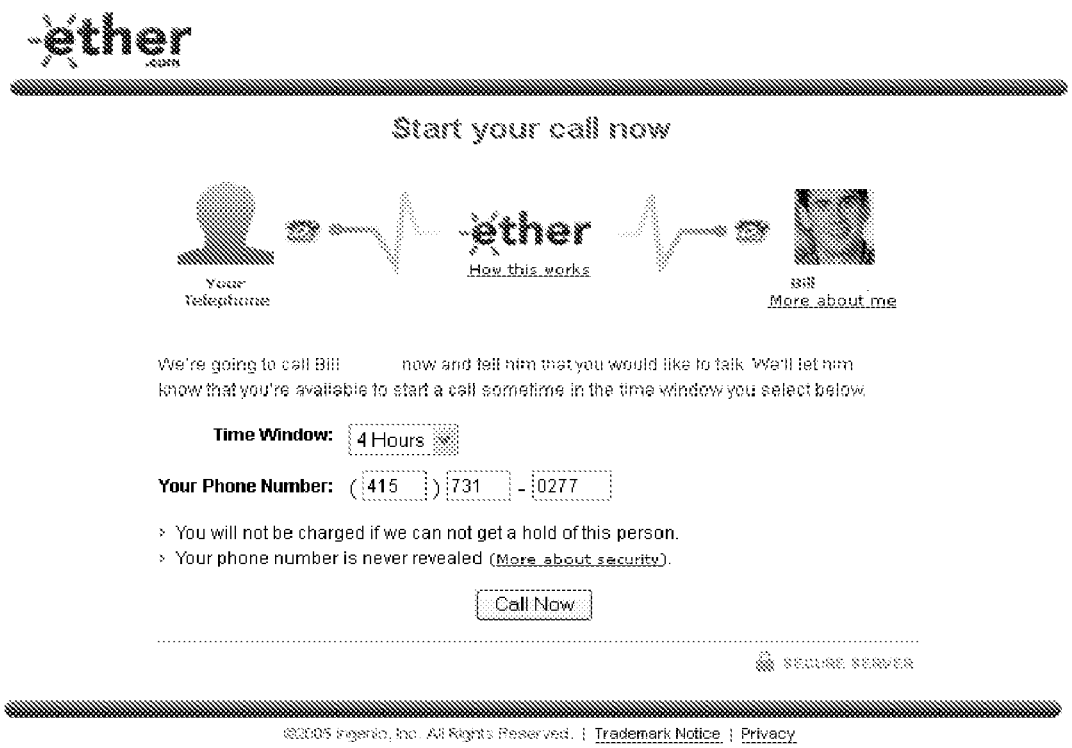
FIG. 3 illustrates a user interface to start a communication according to one embodiment of the present invention.

FIG. 3 illustrates a user interface to start a communication according to one embodiment of the present invention. For example, after a caller selects a call button, the user interface as illustrated in FIG. 3 is displayed (e.g., in the browser of the caller, or in a pop-up window).

In the example of FIG. 3, a call graphic is displayed to show the progress of making the connection. In FIG. 3, the photo of the callee (e.g., the photo uploaded by the callee to the server for the listing during the creation of the listing) is displayed with a link "More about me", which when selected causes the browser to display the description of the listing corresponding to the call button.

In one embodiment, when the photo of the listing is not available, the system may present a standard icon to represent the callee.

In FIG. 3, an icon and the description "Your Telephone" are displayed to present the caller. An "ether" icon between the caller and callee represents the system. The link "How this works" under the "ether" icon can be selected to see the details of the call process, which can be helpful to a user who is not familiar with the system.

The user interface presents an entry to receive a time window (e.g., 4 hours) within which the caller is available to take a call back from the system to talk to the callee. The user interface also includes an entry to receive the phone number of the caller such that the system can call back the caller to make the connection between the caller and the callee in this time window.

In one embodiment, the user interface can be part of the VoIP client application (e.g., the user interface of a VoIP terminal, such as the user interface of a VoIP-enable phone, or an application window of a VoIP application running on a computer or a Personal Digital Assistant (PDA)). The VoIP phone connection can be established, whether the user inputs the callback phone number or if the VoIP connection simply connects the two parties without the need of a phone number.

In FIG. 3, the user interface includes a button "call now" which when selected causes the user interface to send the time window and the callback phone number to a server to request for a phone connection.

In one embodiment, the user interface is part of the VoIP client application which can send the telephonic contact information (e.g., the phone number of the VoIP client application or a user ID of the VoIP system) to the server without the user explicitly specifying the call back number.

Figure 4:
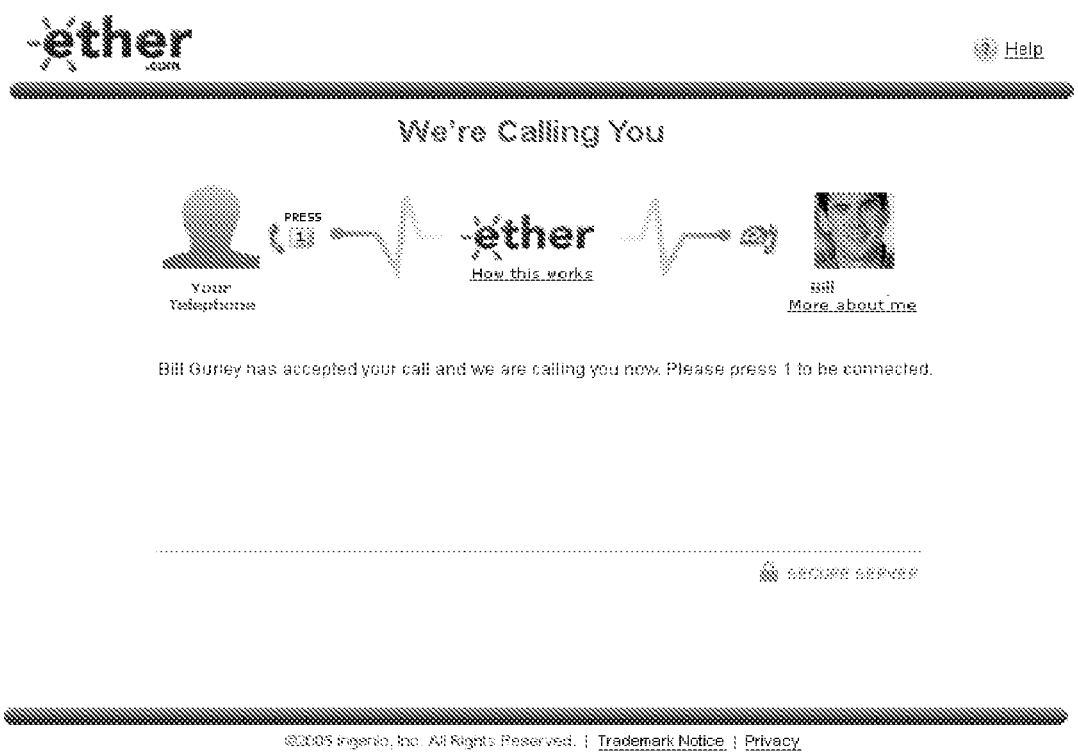
FIG. 4 illustrates a user interface to display the status of a communication connection process and to provide the user guidance through the process according to one embodiment of the present invention.

FIG. 4 illustrates a user interface to display the status of a communication connection process and to provide the user guidance through the process according to one embodiment of the present invention.

In FIG. 4, the call graphic shows that the phone of the callee is off the hook, indicating that the callee has accept the call. The call graphic shows the icon "Press 1" to instruct the caller to press "1" on the phone to be connected to the callee.

The user interface further provides text explaining the status and instruction to the caller.

In one embodiment, before the callee accepts the call, the system calls the callee, during which the call graphic shows that the phone of the callee is ringing and the phone of the caller is on the hook, not yet answered by the callee. The text is provided in the user interface to explain the current status of the connection process and to instruct the user to wait while the system is contacting the callee.

Thus, in one embodiment, the system provides the user-friendly, step-by-step feedback and instruction to the caller to guide the caller through the connection process.

In one embodiment, after the connection between the caller and callee is established, the system further provides feedback and instructions on the call graphic. For example, during the call the system can provide the accumulated call time for the purchased call. If the purchased call has a time limit, the call graphic can further show the remaining minutes of the call. When the time limit is approaching (or reached), the call graphic can provide the guidance and instructions for "recharge" (e.g., by purchasing a further package, or switching to a per minute mode with a further time limit, etc.). In one embodiment, the options to continue the call when the time limit is approaching (or reached) is displayed in the graphical user interface so that the caller may select an option in the graphical user interface without interrupting the conversation with the callee.

In one embodiment, if a purchased call with a time limit is interrupted/dropped before the time limit is reached, the caller can continue the call by requesting a re-connection with a time window. To help the caller, the call graphic can present the guidance and instructions for continue the call and present the status of the continuation of the call. For example, the call graphic may present a description of the continuation policy for interrupted/dropped call and show the remaining portion of the time window to resume the call.

One example scenario of using a call button that is placed in the blog, home page, or email of the callee (seller) is described below.

When the callee (seller) is taking calls, the call button of the callee (seller) says "Call Me".

When the caller (buyer) clicks on the button, the caller (buyer) is led to a landing page that explains how the service works and indicates the price, which might be $100 to talk on the phone for 60 minutes and $1 per minute thereafter.

When the caller (buyer) clicks the "Continue" button on the landing page, the caller (buyer) is brought to a page to specify payment options (e.g., credit card information). Or, if the caller (buyer) is a returning member, the caller (buyer) can sign in (e.g., through providing the correct member name and password) to instruct the system to use the billing information (e.g., credit card and billing address) that is already on file (e.g., that has been previously submitted to the system and that is stored in the database of the system in association with account of the caller). If the caller (buyer) is not a member, the caller (buyer) is presented with a page to register with the system and become a member. Alternatively, the caller (buyer) may specify the payment information without becoming a member.

For example, the page may identify the caller (buyer) as a member according to the information provided by a cookie maintained by the web browser of the caller (buyer). If the cookie exists, the cookie includes the member name of the caller (buyer). If the cookie indicates that the caller (buyer) has already signed in, the server may skip the sign-in process; otherwise, the caller (buyer) is prompt to sign in. If the caller (buyer) is new to the network, the caller (buyer) is asked to register and become a member.

In one embodiment of the present invention, the call button/link does not bring the caller (buyer) inside the marketplace (e.g., a list showing competitors). Instead, the actions related to the call button happen in the environment of the callee (seller). For example, the web page(s) can be just a pop-up window so that the caller does not have to leave the web page (e.g., blog or home page) of the callee (seller). The landing page may be within a frame of the blog/home page of the callee, or within an applet embedded in the blog/home page of the callee.

Alternatively, the call button may bring the caller (buyer) to a VoIP application and provide the guidance and instruction to the caller on the user interface of the VoIP application.

In one embodiment, the VoIP application has browser functionality and shows the call button with the blog, web page or email in the user interface of the VoIP application.

Alternatively, the call button may bring the caller (buyer) to the marketplace which shows the offers of the competitors of the callee (seller).

In one embodiment, after confirming the payment information, the caller (buyer) is led to a page to specify the phone number that the caller (buyer) would like to be called back at and the time window within which the caller (buyer) is willing to receive the call back to talk to the callee (seller). The time window might be "four hours". FIG. 3 shows an example of such a page.

When the caller (buyer) continues (e.g., pressing the button "Call Now" in FIG. 3), the system obtains the authorization to charge an amount, when the call is connected (e.g., $100 from the buyer's credit card, if the credit card is the method of payment).

In one embodiment, a call for a package of bulk minutes (e.g., that has a specified time limit) is charged when the two parties are connected, regardless of whether the duration of the time limit is reached. In one embodiment, to avoid the difficulty in charging the buyer (e.g., $100) to talk to a seller but the seller fails to call back within the time window requested by the buyer, the system does not charge the buyer until after a connection between the caller (buyer) and the callee (seller) is successfully established (e.g., for a minimum period of time, or after the phone call is completed, or after the time limit is reached, etc.).

In one embodiment, the system "pre-authorizes" the charge (e.g., $100) on the buyer's credit card to make sure that, should the connection be completed, the buyer would be able to pay. In one embodiment, the system indicates the status of pre-authorization, charging/not-charging to the buyer in the user interface that guides the user through the process of making the connection.

Alternatively, the system may make the charge (e.g., $100) on the buyer's credit card when starting to make the connection and make a refund to the buyer if the connection is not successful within the call back time window specified by the caller (buyer). Alternatively, the system may charge a portion of the fee (e.g., $100) during the phone connection set up period, and refund the charge if the connection is not successful or charge the remaining portion after the connection is made successfully (e.g., after the phone call is completed).

In one embodiment, the system determines whether or not to pre-charge the buyer based on statistical data, such as the credit history of the caller (buyer), the success rate of the callee (seller) to call back within the time window specified by the caller (buyer), etc. Thus, for example, if the system determines that the call is likely to be established within the time window, the system may pre-charge the caller; for example, if the system determines that the caller (buyer) has a good credit history, the system may defer the charge to a later stage (e.g., after the completion of the call).

In one embodiment, after the system determines that the caller (buyer) has a sufficient source to pay for the call, the system calls the callee (seller) and says: "We have a caller who is calling you on your call button. He is paying your $100 fee and is willing to wait up to 4 hours to talk to you. Please press 1 on your telephone keypad if you want to take the call now; press 2 if you can't take it now but can indeed take it within the next 4 hours that has been requested, or press 3 if you won't be able to take it within 4 hours". Note that different system may associate different sets of key pressing events (e.g., press 1, press 2, press 3, . . . ) with different options.

In one embodiment, the system can optionally provide the callee (seller) with more information about the caller (buyer) based on pre-recorded information. For example, the system can record the self introduction of the caller (buyer) (e.g., the name of the caller, for instance 'Bob') so that the system tells the callee "We have 'Bob' . . . " instead of "We have a caller . . . ", where 'Bob' is the recording of the self-introduction of the callee (buyer).

In one embodiment, the system has the name of caller (buyer) recorded as part of the member preference/attribute of the caller (buyer). Alternatively, the system can use a text-to-speech program to "read out" the name of the buyer when introducing the call to the callee (seller). Alternatively, the system can record the name of the caller (buyer) when the system receives a call from the caller at the phone number assigned to the callee, or callback the caller first to obtain the recording.

In one embodiment, if the callee (seller) presses 1, the system tells the callee (seller) to hold on while the system calls the caller (buyer). The screen of the caller (buyer) is updated automatically to indicate that the callee (seller) is ready and the caller (buyer) is being called back for the connection between the caller (buyer) and the callee (seller).

If the callee (seller) presses 2, the system tells the caller (buyer) (e.g., on the screen of the caller) that the callee (seller) can't take the call now but expect to take the call within an identified period of time (e.g., the next 4 hours). The system will arrange to make the phone connection within the identified period of time (e.g., the next 4 hours).

In one embodiment, the system may use alternative numbers to indicate a response of the callee.

For example, the system may send a message (e.g., through email, a web-based user interface for the callee (seller), a voice mail, an instant message, etc) to the callee about the call and the identified period of time (e.g., 4-hour time window) so that the callee (seller) may indicate to the system within the identified period of time (e.g., next 4 hours) that the callee (seller) is ready for the call.

Alternatively, the system may try to call the callee (seller) periodically or according to a time period specified by the callee (seller). For example, the callee may press 15 after pressing 2 to indicate that system should try to make the connection after 15 minutes. Alternatively, the callee may provide such an indication through replying to the email, instant message, short text message, or through a network-based user interface (e.g., web-based) that is designed to manage the user account. For example, the network-based user interface may present a list of calls in the queue and the corresponding time windows. When ready to take the next phone call, the callee can indicate to the system that the callee is currently available to take a call (or a particular one of the calls in the list).

Alternatively, the caller (buyer) may try to call the callee (seller) again within the time window (e.g., next 4 hours).

In one embodiment, the system may monitor the activities related to this call to avoid duplicated efforts in making the connection within the time window (e.g., next 4 hours) so that the caller and callee are not interrupted by unnecessary attempts to make the connection.

If the callee (seller) presses 3, the system tells the caller (buyer) that the callee (seller) can't take the call within the requested time window. The caller (buyer) in this case is not charged the price (e.g., $100). In one embodiment, the caller (buyer) is charged the price (e.g., $100) only when the call between the caller (buyer) and callee (seller) is actually connected.

When the system makes the connection between the caller (buyer) and callee (seller), the system may call the caller (buyer) first or call the callee (seller) first, or call both at about the same time. For example, the system may determine which one of the caller and callee is more reliable and call the reliable one of the two first. The system may determine which of the parties is more reliable based on statistic data collected from past call connection activities. Alternatively, the system may connect to the less reliable party first. Alternatively, the callee (seller) may specify the preference of who is to be called first as part of the specification of the listing.

When the caller (buyer) calls the phone number assigned to the callee (assignee) (e.g., 800-GO-ETHER extension 4567), the system may first authenticate the caller and/or arrange the payment options and then prompt the caller to enter the time window and the call back phone number using the key pad of the phone. An interactive voice response (IVR) system can be used to interact with the caller so that the caller does not need web access to be connect to the callee (seller).

Alternatively, the system may determine automatically the telephone contact information of the caller from the call received from the caller (buyer) (e.g., through call ID service or an Automatic Number Identification (ANI) service) and use the telephone contact information in calling back. The system may present an option for the caller (buyer) to confirm the automatically detected telephone contact information of the caller for calling back so that the caller has an opportunity to specify different telephone contact information for the call back.

In one embodiment, when the system determines that the caller has a graphical user interface (e.g., web access) while requesting the connection for the call (e.g., when the caller pushes a button on a web interface to request the call, or when the caller is signed into the system or when the online presence of the caller is detected, or when the call is initiated from a VoIP terminal that has a graphics capability), the system uses the graphical user interface to assist the caller. When the system fails to detect the online presence of the caller, the system uses the IVR system to provide the caller (buyer) with guidance. Thus, the system automatically switches between using the web interface to guide the caller or using the IRV interface to guide the caller.

In one embodiment, the system may further use other communication systems to guide the callee (e.g., according to the presence and availability of such communication systems). For example, the interface may be Wireless Application Protocol based (WAP-based) applications, or based on instant messaging, or based on a custom designed client-server application/protocol. Thus, a web-based interface is presented as an example. User interfaces based on other communication protocols and/or other types of communication systems can also be used.

In one embodiment, the system may ask the caller (buyer) to hang up temporarily until the callee accepts the call. Alternatively, the system may allow the caller (buyer) to stay on the line while the system attempts to reach the callee (seller).

In one embodiment, the system allows the callee (seller) to specify one or more alternative phone numbers in case the callee (seller) is not reachable at the primary phone number specified for the listing. Similarly, the caller (buyer) may also specify one or more alternative call back phone numbers. In one embodiment, the system allows the parties to specify other telephonic references (e.g., user names of Internet telephonic application) to make the telephone connection. In one embodiment, the system may further allow the user to specify other identities to make connections for other types of real time communications, such as chat, instant messaging, video conferencing, etc.

In one embodiment, the system arranges the call according to aspects of the methods described in the U.S. Patent Application Publication No. 2004/0252820 (application Ser. No. 10/360,776, filed on Jun. 12, 2003), which is hereby incorporated herein by reference.

When the caller (buyer) requests the connection using the call button, the web server provides the instructions and feedback to guide the caller (buyer) through the call process.

When the caller (buyer) dials the callee's listing via the Ether phone number (e.g., the 800 number assigned to the callee), an interactive voice response (IVR) system is used to provide similar instructions and feedback to guide the caller (buyer) through the call process.

For example, the caller (buyer) registers and creates an identity using the phone number and a PIN. A credit card is asked for via IVR or live operator to set up payment options. Then the call window is entered on the keypad of the phone, such as pressing the string of keys "4*" to indicate a "4" hours window or "60#" for a "60" minutes window.

In one embodiment, when the callee is having a telephonic connection with the system, the system prompts the caller (buyer) to utter a message for the callee (seller). For example, the caller (buyer) may say "I'm Bob Stanley—remember we met at the golf conference last weekend". The system records the messages of the caller (buyer). When the callee (seller) gets the call, the system says, "There's a buyer on the line who's paid $100 and is willing to wait 4 hours and here's how he identifies himself: 'I'm Bob Stanley—remember we met at the golf conference last weekend'". The system in such a way provides as much identifying information to the callee (seller) as possible so that the callee (seller) may screen the callers for acceptance. In one embodiment, the system behaves as an automatic secretary, screening who's on the line for the callee (seller).

In one embodiment, the system provides functionality for bulk-minute pricing.

For example, once a call starts, the system metes out the time that has been bought. When the time limit, for example, 60 minutes, is up, the system tells both parties on the phone that the time is up. The system then prompts the buyer to add more money to buy a second package, or go to per minute pricing, or end the call, or let them talk further for free, according to the continuation policy of the call which is specified by the callee (seller) in the listing (e.g., specified during the creation of the listing).

In one embodiment, if the parties hang up after just, for example, 35, minutes of a 60-minute call, the system has a time window in which it expires the remaining minutes. The time window can be set quite large, such as a year, so that someone can buy a 1,000-minute discount package and talk 100 times over the course of the year. Or the time window can be set small, such as 30 minutes, in which case the caller (buyers) can call again within the 30-minute window after the 35-minute call to keep talking based on the already purchased 60-minute package, but the caller (buyers) can be connected on the basis of the unused portion of the 60-minute call package after a break that is longer than the time window.

In one embodiment, the system time window specifies the longest period of break before the unused portion of the purchased package expires.

In one embodiment, the system time window specifies the period from the starting of the conversation and the time when the purchased package expires. For example, the system may specify a window of 4 hours or so by default, so that people who get cut off or interrupted can finish their calls in this window of time.

In one embodiment, the system time window is based on the size of the purchased package. The larger the time limit of the package, the larger is the time window. In one embodiment, the expiration of the package is based on a limit on the separate calls (e.g., three). In one embodiment, the expiration of the package is based on the expiration time window and the limit on separate calls, whichever is reached first.

In one embodiment, the system allows the callee (seller) to specify the expiration time window in the specification of the listing (e.g., as part of the continuation policy of the call package) and/or the limit on the separate calls.

FIGS. 5-12 show examples of flow diagrams of a process to connect a user and an adviser for telephonic conversation according to one embodiment of the present invention.

In one embodiment, when a caller selects (e.g., clicks) on a call button according to one embodiment of the present invention, the selection (e.g., click) leads down several different paths depending on the availability status of the seller.

Figure 5:
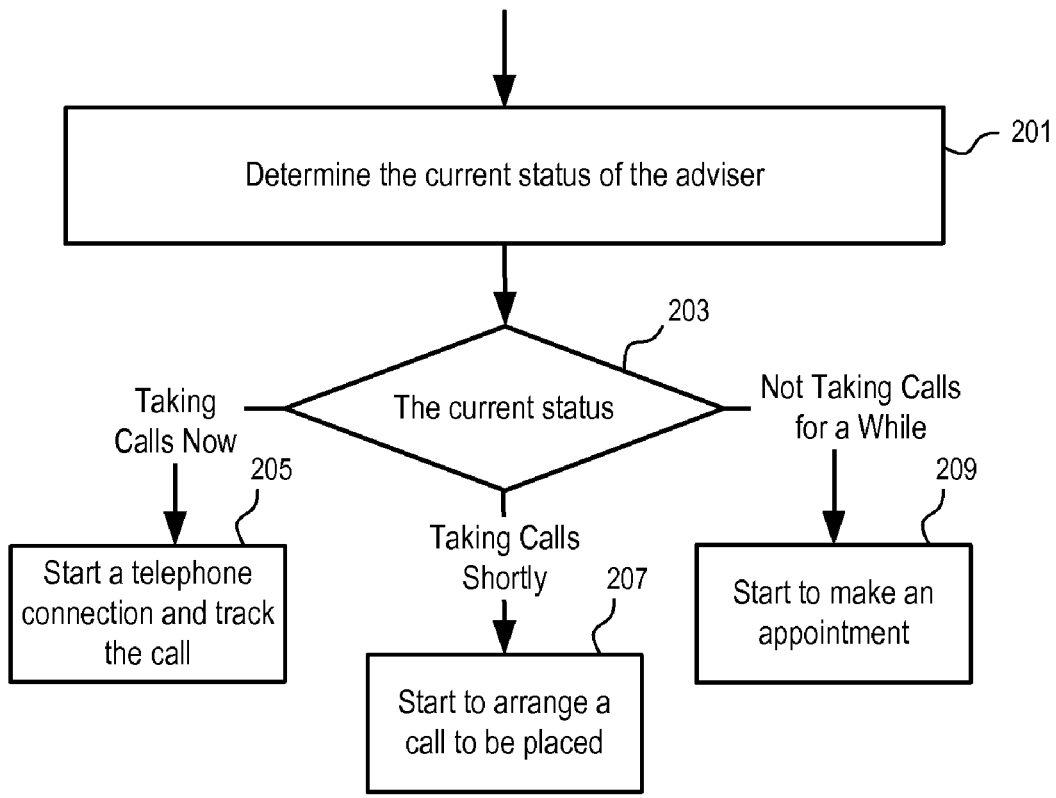
FIGS. 5-12 show examples of flow diagrams of a process to connect a user and an adviser for communication according to one embodiment of the present invention.

For example, in FIG. 5, the system determines (201) the current status of the adviser at the time the telephonic connection is started. In one embodiment, the current status of the adviser is determined based at least partially on the information provided by the adviser. For example, the adviser can specify the scheduled hours of the day during which the adviser is expected to take calls; the adviser may select a button (e.g., push through placing a cursor over the button on a display of a graphical user interface and activating a selecting device, such as a key or a button of a cursor positioning device such as a mouse or a touch pad or a joystick, etc.) on a web page, or make a phone call to the system, to indicate whether the adviser is currently busy and not answering new calls and/or to further specify the estimated duration of the busy period. The adviser may select a button on a user interface (e.g., a web page designed for the manage of the listing and/or account of the adviser) to indicate that the adviser is now free and ready to take calls. The adviser may pick up the phone call from the system and indicate to the system the current status of the adviser. The adviser may transmit the current status information to the system using instant messages, email, SMS messages, etc.

If the current status (203) of the adviser is "Taking Calls Now" or something equivalent, the system starts (e.g., immediately) a telephone connection and tracks the call (205).

If the current status (203) of the adviser is "Taking Calls Shortly", the system starts (207) to arrange the call to be placed within the time period specified by the caller without trying to call the adviser immediately, since the adviser is temporary busy and will be available to take calls within a short period of time.

If the current status (203) of the adviser is "Not Taking Calls for a While" or something equivalent, the system starts (209) to make an appointment for the user to call the adviser, since the adviser is not available to take the call and will not be available for a longer period of time.

Figure 6:
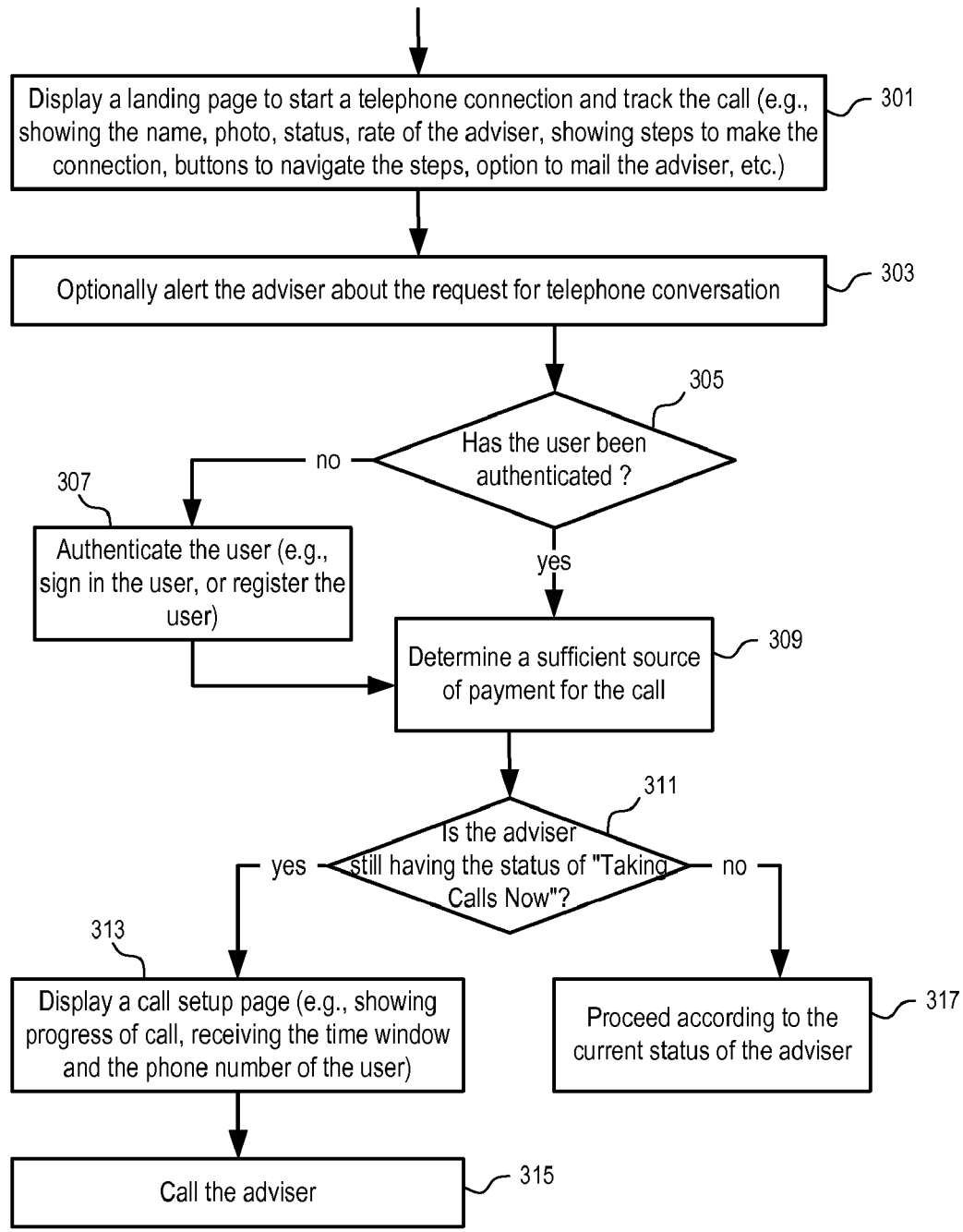

In FIG. 6, when the system starts to at least initiate a telephone connection (e.g., in response to a request from a selected call button), the system displays (301) a landing page to at least initiate a telephone connection and track the call. For example, the web server of the system transmits information defining the landing page to the web browser of the user to show the landing page (e.g., in a pop-up window).

For example, the landing page may show the name, photo, status, rate of the adviser, show/explain the process to make the connection, buttons to navigate the process, option to mail the adviser, etc.

Optionally, the system alerts (303) the adviser about the request for telephone conversation (e.g., through a web-based user interface, or through email, instant messaging, short text message, etc.)

The system determines whether the user has been authenticated (305). If the user has not been authenticated, the system authenticates (307) the user. For example, the system signs in the user if the user is already a member, or registers the user as a new member if the user is not yet a member.

The system then determines (309) a source of payment for the call.

After the system has identified a source of payment for the call based on the price for the call specified by the adviser in the listing, the system may further determine if the adviser is still having the status of "Taking Calls Now". In certain instances, the process of authenticating the user and securing the source of payment may take an extended period of time such that the availability status of the adviser may have changed.

If the adviser is no longer available for immediate connection, the system proceeds (317) according to the current status of the adviser, based on whether the current status is "Taking Calls Shortly" or "Not Taking Calls for a While".

If the adviser is still available for immediate connection, the system displays (313) a call setup page. The call setup page may show the progress of call and user interface elements to receive the time window and the phone number of the user (caller).

Once the time window within which the user (caller) is available for the call and the call back phone number of the user is received, the system calls (315) the adviser.

Figure 7:
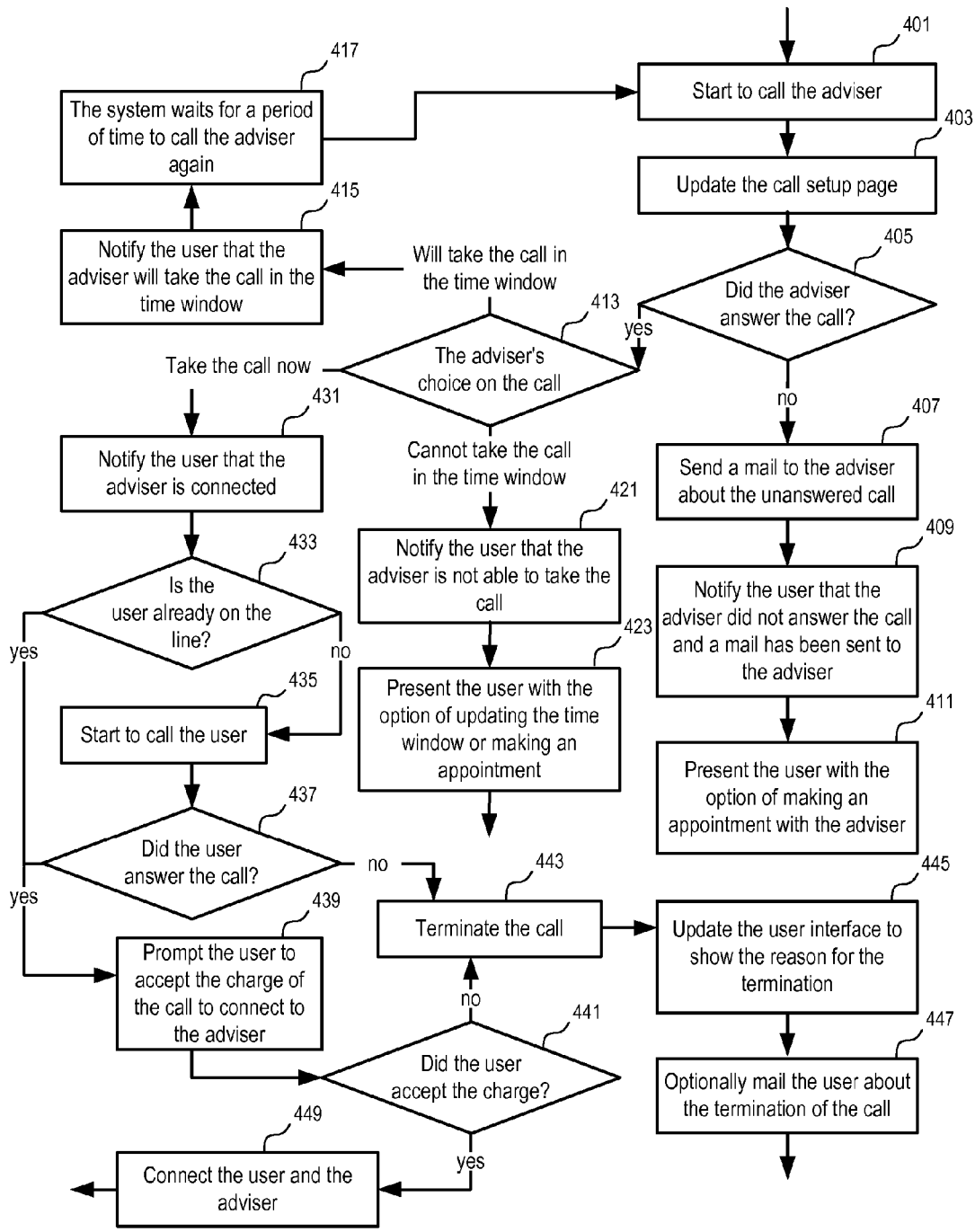

In FIG. 7, after the system starts (401) to call the adviser, the system updates (403) the call setup page. For example, the system may play an animation and/or sound clip and/or a text message to indicate that the system is calling the adviser, in one embodiment.

Then, the system determines whether or not the adviser answered the call (405).

If the adviser failed to answer the call, the system sends (407) a mail to the adviser about the unanswered call. The system notifies (409) the user that the adviser did not answer the call and a mail has been sent to the adviser. The system then presents (411) the user with the option of making an appointment with the adviser.

If the adviser answered the call, the system obtains the adviser's choice (413) on the call.

The adviser may indicate that the adviser will take the call in the time window specified by the caller, in which case, the system notifies (415) the user that the adviser will take the call in the time window. Then, the system waits (417) for a period of time to call the adviser again. Alternatively, the system may try the connection based on an indication from the adviser that the adviser is ready to take the call (e.g., by calling the system, selecting a button or a link on a web page in the account of the adviser, sending an email/instant message/short text message to the system or replying to a message from the system about the call, etc.)

The adviser may indicate that the adviser cannot take the call in the time window specified by the caller, in which case, the system notifies (421) the user (caller) that the adviser is not able to take the call and presents (423) the user with the options of updating the time window and making an appointment.

The adviser may indicate that the adviser wants to take the call now, in which case, the system notifies (421) the user that the adviser is connected and the server is now calling the user (at which point of the process, the caller may or may not be on the phone). The system then determines if the user is already on the line (433).

If the user is not already on the line, the system starts (435) to call the user and determines whether the user answered the call (437).

If the user did not answer the call back, the system terminates (443) the call (443) and the adviser is notified.

After the user answers the call back, the user is on one line and the adviser on another line. The system then prompts (439) the user to accept the charge of the call before connection to the adviser and determines whether the user accepts the charge (441).

If the user accepts the charge, the system connects (449) the user to the adviser (e.g., by joining the calls) and starts to monitor aspects of the call (e.g., duration) and charge the user.

If the user rejects the charge or fails to provide a response within a predetermined period of time, the system terminates (443) call. After the termination of the call, the system updates (445) the user interface to show the reason for the termination. Optionally, the system mails (447) the user about the termination of the call.

Figure 8:
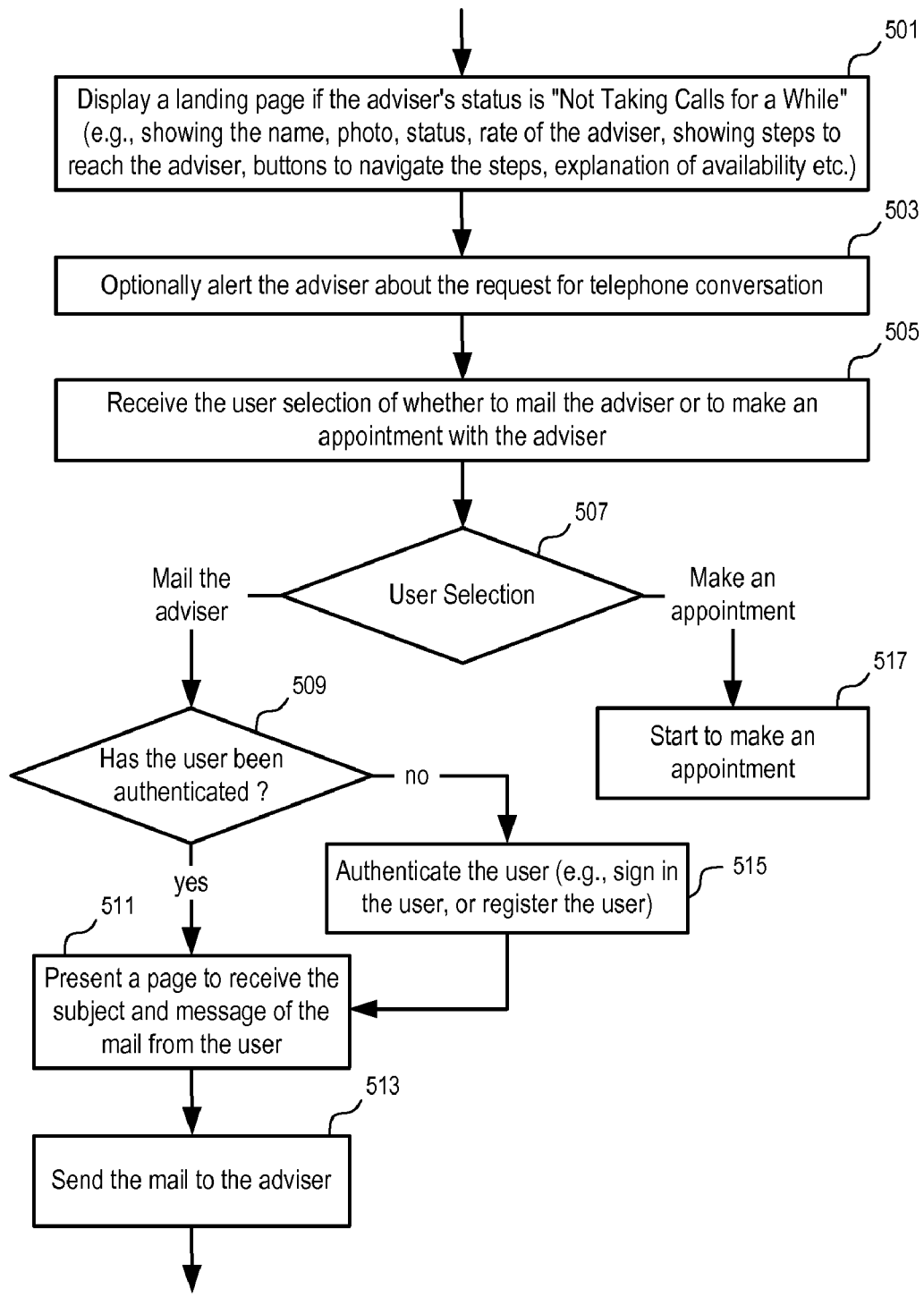

In FIG. 8, the system displays (501) a landing page, if the adviser's status is "Not Taking Calls for a While". The landing page may show the name, photo, status, rate of the adviser, and show the process to reach the adviser, buttons to navigate the process, explanation of availability, etc.

Optionally, the system alerts (503) the adviser about the request for telephone conversation.

In one embodiment, the system receives (505) from the landing page the user selection whether to mail (e.g., email or use other types of messaging systems) the adviser or to make an appointment with the adviser.

If the user selection (507) is to mail the adviser, the system determines if the user has been authenticated (509). If the user has not been authenticate, the system authenticates (515) the user. For example, if there is no cookie in the web browser of the user indicating that the user is currently in a valid session, the user may be presented with an interface to sign in or to register.

If the authenticated user chooses to mail the adviser, the system presents (511) a page to receive the subject and message of the mail from the user. After receiving the subject and message of the mail, the system sends (513) the mail to the adviser (without showing the mailing address of the adviser to the user and without showing the mailing address of the user to the adviser) in accordance with one embodiment.

In one embodiment, the mail is delivered electronically (e.g., through an email, instant message, SMS message, web mail). Alternatively, the mail may be delivered as voice mail, print out, etc.

If the user selection (507) is to make an appointment, the system starts (517) to make an appointment.

Figure 9:
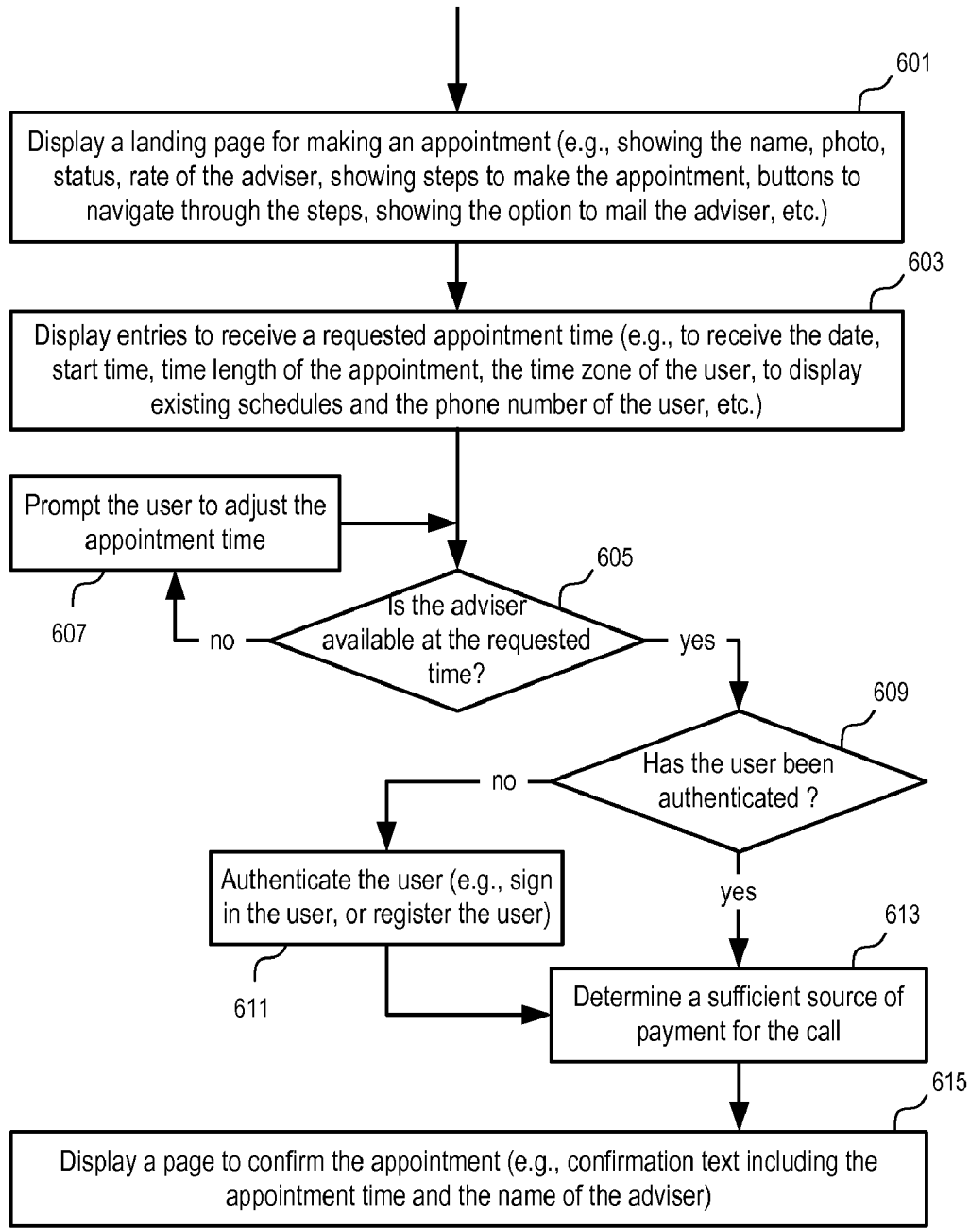

In FIG. 9, the system displays (601) a landing page for making an appointment. The landing page may display one or more of the name, photo, status, rate of the adviser, and show stages of operations to make the appointment, buttons to navigate through the stages of operations, show the option to mail the adviser, etc.

The system displays (603) entries to receive a requested appointment time. The entries can be part of the landing page or a page displayed after a navigation button is selected. In one embodiment, the entries are used to receive one or more of the date, start time, time length of the appointment, the time zone of the user, etc.

In one embodiment, the system further displays existing schedules and the phone number of the user, etc. for the convenience of the user (e.g., if the user is already authenticated at this point of the process).

After the requested time of the appointment is received from the user, the system determines if the adviser is available at the requested time (605). If the adviser is not available at the requested time, the system prompts (607) the user to adjust the appointment time; otherwise, the system proceeds to the task of filtering the callers.

If the system determines that the user has not been authenticated (609), the system authenticates (611) the user through signing in the user or registering the user. The system then determines (613) if a sufficient source of payment for the call is available from the user.

If there is a sufficient source of payment for the call, the system accepts the appointment and displays (615) a page to confirm the appointment. The confirmation page may show confirmation text including the appointment time and the name of the adviser.

In one embodiment, a callee (e.g., an advisor) can specify the times of day when the callee would be available for an appointment. This schedule can be set for the next few days. The schedule can also be a repeating schedule of when the caller will be available each week. For instance, a graduate student may have open "office hours" every Thursday from 4 pm to 6 pm. Then, when the caller seeks to make an appointment, the available time frames for the appointment are displayed according to the schedule of the callee. The caller can see the times when the callee will be available for this appointment. Thus, the caller can therefore select an appointment time from the open periods preset by the callee. When such an approach is used, the appointment has a much higher likelihood of being requested during a suitable time and therefore has a much higher likelihood of being successful.

In one embodiment, after the appointment is made, the system automatically starts to make connections to the caller and the callee separately at the requested time of the appointment. Alternatively, the system may reserve a time slot on the schedule of the callee on behalf of the caller and request the caller to make a request for a connection at the scheduled time. Alternatively, the system may request the adviser (callee) to make the request for the connection. For example, the system may determine a less reliable one of the two to make a request for the connection, or contacting the less reliable one first, during the appointment time is reached before starting to contact the other party.

Figure 10:
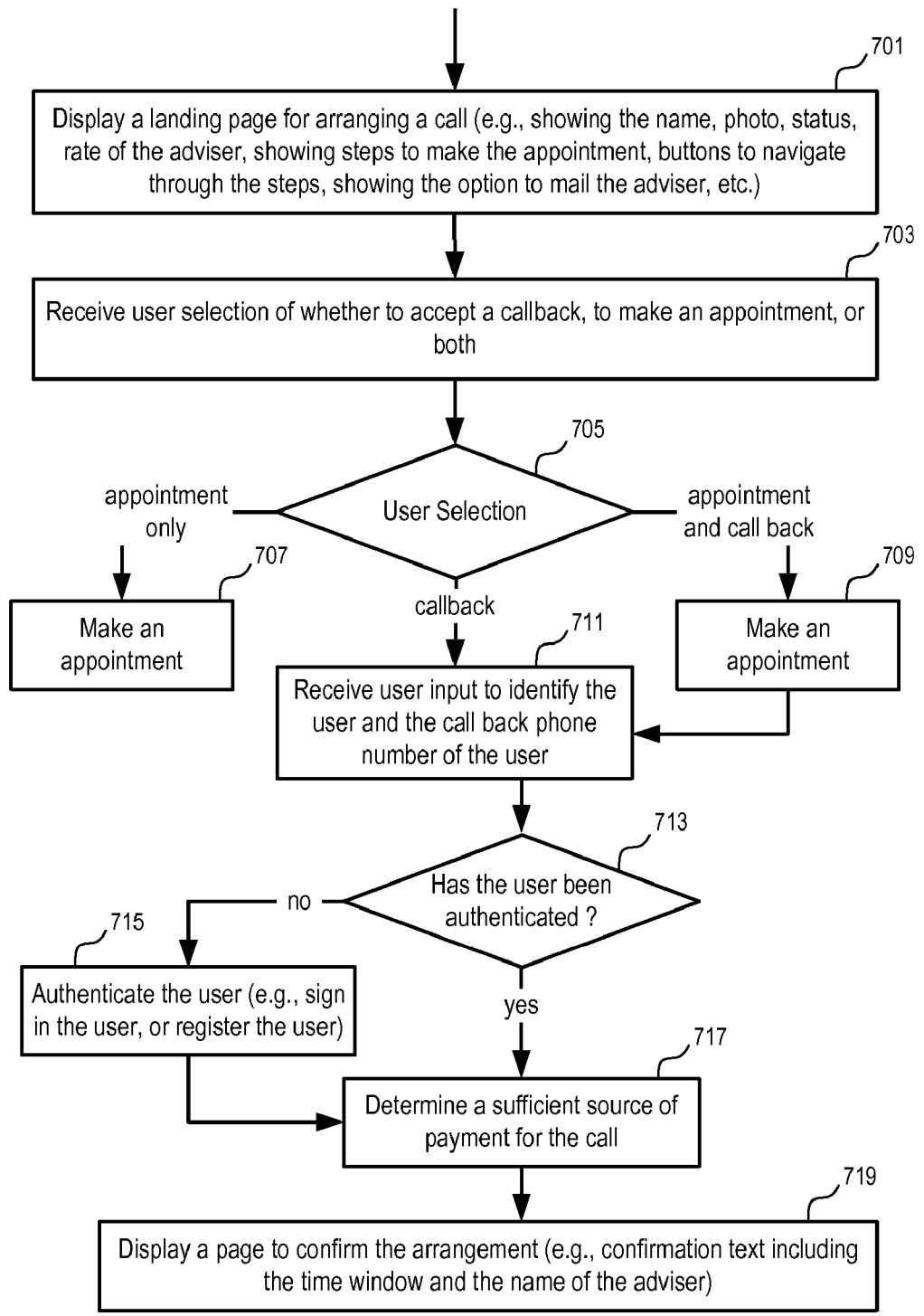

In FIG. 10, the system displays (601) a landing page for arranging a call. The landing page may display one or more of the name, photo, status, rate of the adviser, show stages of operations to make the appointment, buttons to navigate through the stages, show the option to mail the adviser.

The system receives (703) a user selection of whether to accept a callback, to make an appointment, or both.

If the user selection includes making an appointment, operation 707 or operation 709 is performed to set up an appointment (e.g., according to the process illustrated in FIG. 9).

If the user selection includes accepting a callback, the system receives (711) user input to identify the user and the call back phone number of the user and determines whether the user has been authenticated (713). If the user has not yet been authenticated, the system authenticates (715) the user (e.g., through signing in the user or registering the user).

After the user is authenticated, the system determines (717) if a sufficient source of payment for the call is available (e.g., to filter out non-serious callers). The system then displays a page to confirm the arrangement (e.g., confirmation text including the time window and the name of the adviser).

Figure 11:
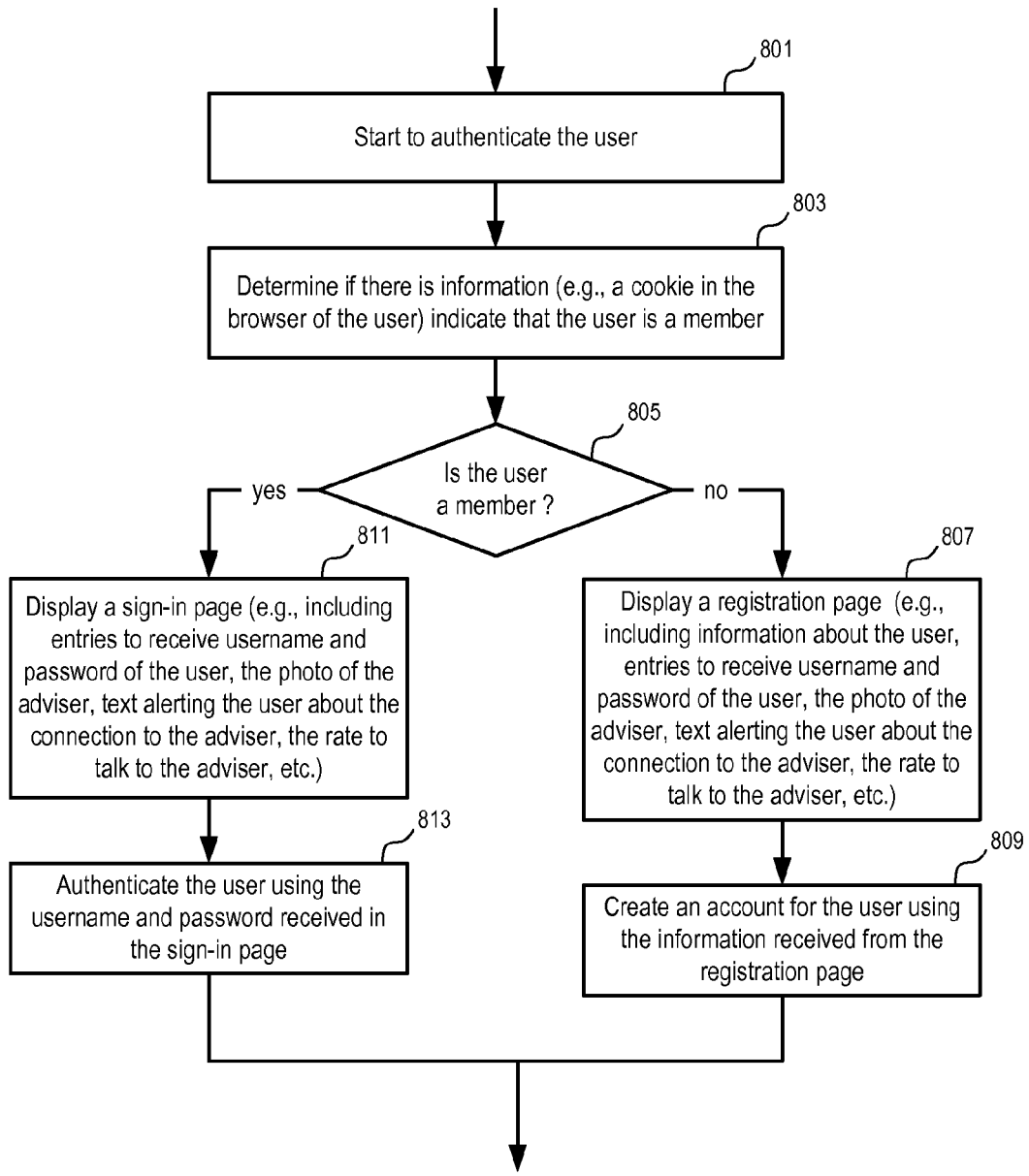

FIG. 11 shows an example to authenticate the user. In FIG. 11, after the system starts (801) to authenticate the user, the system determines (803) if there is information to indicate that the user is a member. The information may be in a cookie in the browser of the user, or a parameter encoded in an URL (universal resource locator) of a link, or a parameter in an applet running in the web browser.

If the user is a member (805), the system displays (811) a sign-in page which may include entries to receive a username and a password from the user. In one embodiment, the sign-in page may optionally further include the photo of the adviser, text alerting the user about the connection to the adviser, the rate to talk to the adviser, etc. Thus, the sign-in appears to be in the environment of the adviser. The system then authenticates (813) the user using the username and password received in the sign-in page.

If the user is not a member (805), the system displays (807) a registration page. The registration page may include information already collected about the user (e.g., during the interaction before the registration) for confirmation purpose. The registration page includes entries to receive username and password of the user. In one embodiment, the registration page may optionally further include the photo of the adviser, text alerting the user about the connection to the adviser, the rate to talk to the adviser, etc. Thus, the registration appears to be in the environment of the adviser. The system then creates (809) an account for the user using the information received from the registration page.

In one embodiment, after the user is authenticated, information is created to indicate that the user is authenticated for a valid session (e.g., using a cookie, a parameter in URL or in an applet) until the session expires or the user signs off.

Figure 12:
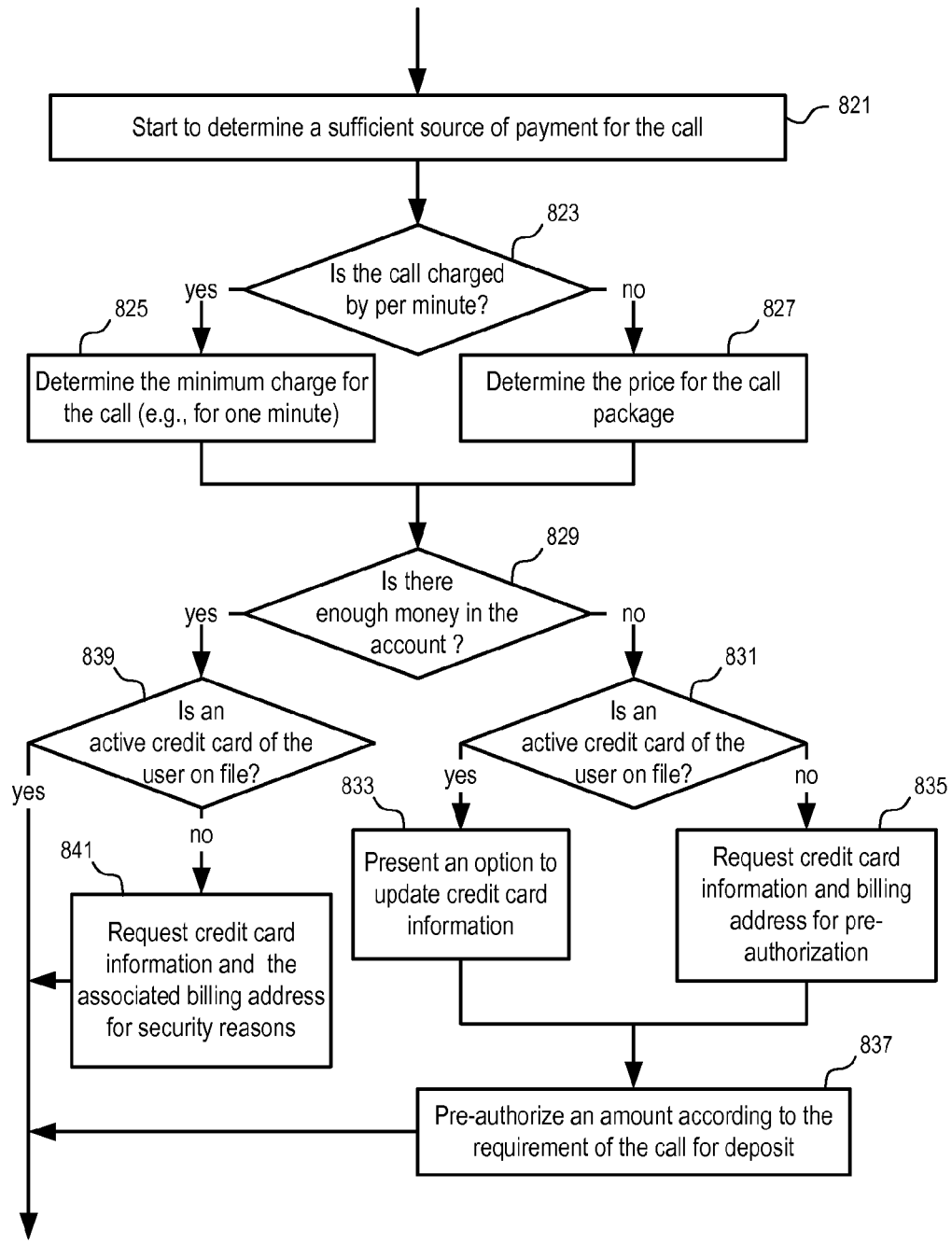

FIG. 12 shows an example to determine if a sufficient source of payment of the call is available.

After the system starts (821) to determine if a sufficient source of payment for the call is available, the system determines (823) whether the call is charged by per interval (e.g., per minute). If the call is charged by per interval, the system determines (825) the minimum charge for the call (e.g., for one minute). If the call is not charged by per interval, the system determines (827) the price for a call package (e.g., $100 for 1 hour, as specified by the adviser).

The system then determines whether there is enough money in the account of the user (829) and/or whether there is an active credit card of the user is on file (839 and 831).

If the account of the user has enough money for the call and/or an active credit card of the user is not on file, the system optionally requests (841) for the credit card information and the associated billing address for security reason.

If the account of the user does not have enough money for the call, the system will pre-authorize (837) an amount according the requirement of the call for deposit purpose. If an active credit card of the user is on file, the system optionally presents (833) an option to update the credit card information. If no active credit card of the user is on file, the system requests (835) credit card information and billing address for pre-authorization.

In one embodiment, when information identifying the user is available (e.g., through a "cookie" implemented in the web browser or parameters encoded in the URL, or parameters stored in the variables of an applet running in the web browser, etc.), the system uses the information about the user to help the user. For example, from the member information database, the system may retrieve the phone numbers of the user. If there are multiple phone numbers for the user, a combo box is displayed for the user to select one from the known phone numbers of the user (or to type in a different one). If there is only one known phone number of the user, the system may display the known phone number of the user in an entry box as the default value.

If a user as identified by the information (e.g., cookie) is different from the current user, the current user can choose to edit the information and/or sign in as a different user.

In one embodiment, a user can enter the input information to set up a call, such as the call window and/or the callback phone number before the user is authenticated. When the user is subsequently authenticated (e.g., through signing in as an existing member or registering as a new member), the information provided by the user before the authentication process is used to update the account information (if changed).

Figure 13:
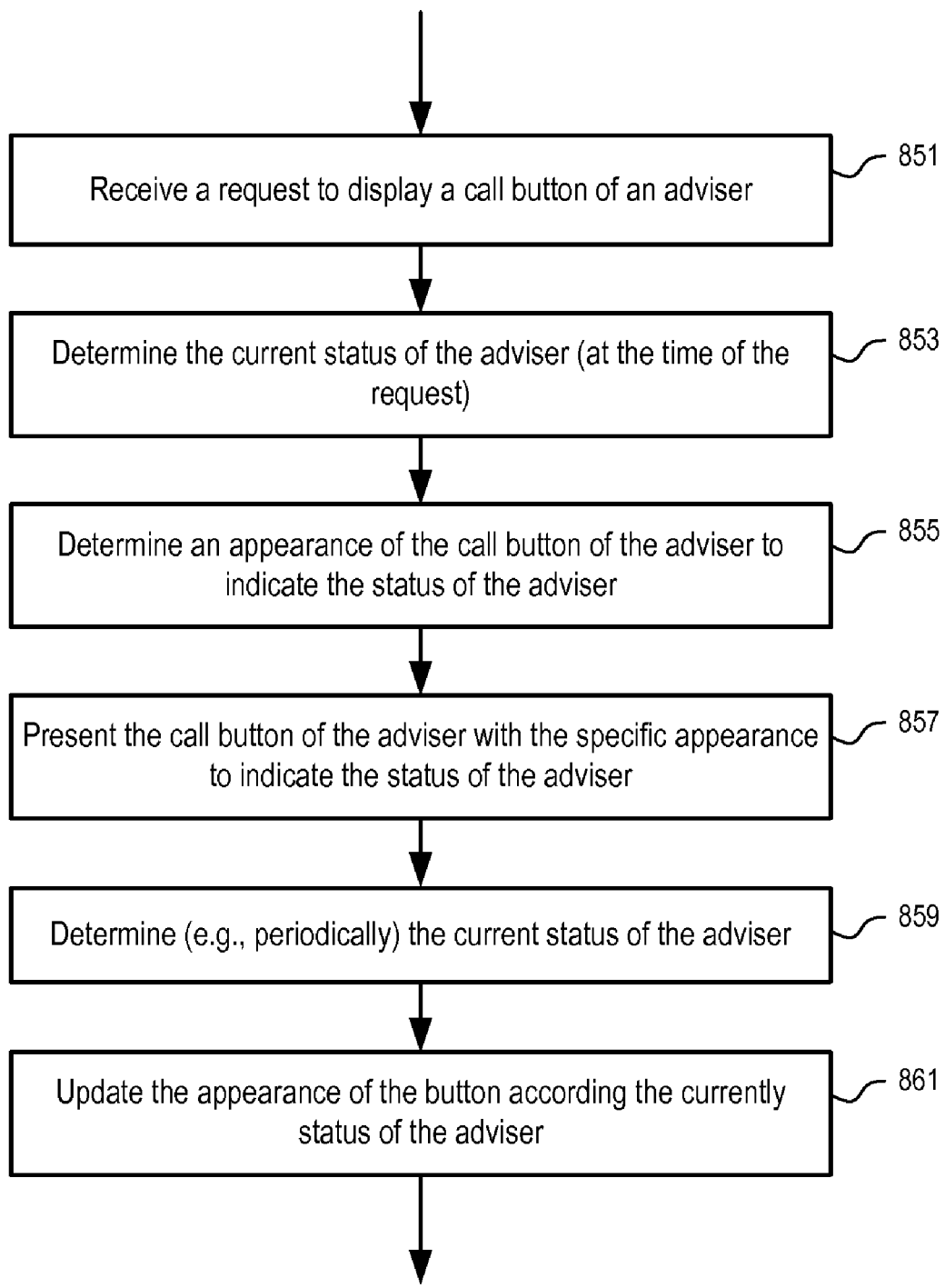
FIG. 13 illustrates a method to display a call button according to one embodiment of the present invention.

FIG. 13 illustrates a method to display a call button according to one embodiment of the present invention.

In one embodiment, the appearance of a call button is displayed according to the current availability status of the adviser to take the call.

For example, in FIG. 13, when the system receives (851) a request to display a call button of an adviser, the system determines (853) the current status of the adviser (at the time of the request). After the system determines (855) an appearance of the call button of the adviser to indicate the status of the adviser, the system presents (857) the call button of the adviser with the appearance to indicate the status of the adviser.

In one embodiment, the system further determines (859) (e.g., periodically) the current status of the adviser to update (861) the appearance of the button according the currently status of the adviser.

For example, the call button to be inserted in the blog of the callee can include an image at a URL on a server computer. When being requested the URL causes the server computer to determine a response based on the parameters encoded in the URL. For example, the URL can be pointing to a CGI (Common Gateway Interface) program which provides or generates the image according to the current status of the adviser. The URL may include a parameter to identify the adviser and/or the advertisement.

For example, when the current status of the adviser is "Taking Calls Now", the call button may show a telephone with text "Call Now"; when the current status of the adviser is "Taking Calls Shortly", the call button may show an off-hook telephone with text "Arrange a Call"; when the current status of the adviser is "Not Taking Calls for a While", the call button may show a telephone and a calendar with text "Appointment".

In one embodiment, different types of availability status of a callee (adviser) includes: on call, off call, busy, get in line, schedule an appointment, join conference, etc. It is understood that different systems may implement more or less types of availability status of a callee. Further, the call button may include other current status information about the callee, such as price, how many people are in line to call the callee, the schedule of the callee, and/or others.

In one embodiment, the call button is implemented using an applet running in the browser of the user. The applet displays the call button according to the current status of the adviser and checks the status of the adviser periodically to update the appearance of the button. In one embodiment, when an estimated time until which the adviser can take the call is available (e.g., received in the system from the adviser when the system attempts to contact the adviser, or provided by the adviser when the adviser is talking to a different user, etc.), the call button also shows an indication of such an estimated time to help the user in selecting a time window.

Alternatively, the call button may be implemented in custom applications (e.g., as plug-in to web browsers, email clients, etc., or as stand-along applications). The call button may communicate with the server using a special purpose protocol.

In one embodiment, a web/email (document) authoring tool is designed to automatically detect the phone number of the callee in a web page/email/document. The authoring tool can be set up to replace the phone number of the callee with the corresponding call button assigned to the callee and/or the phone number (e.g., ether phone number) that is assigned to the callee. For example, the authoring tool can detect the occurrence of the phone number of the callee in the document and prompt the user of the authoring tool to replace the phone number of the callee with the call button and/or the phone number assigned by the system. If the user accepts the suggestion, the authoring tool automatically replace the phone number of the callee with the call button and/or the phone number assigned by the system.

Figure 14:
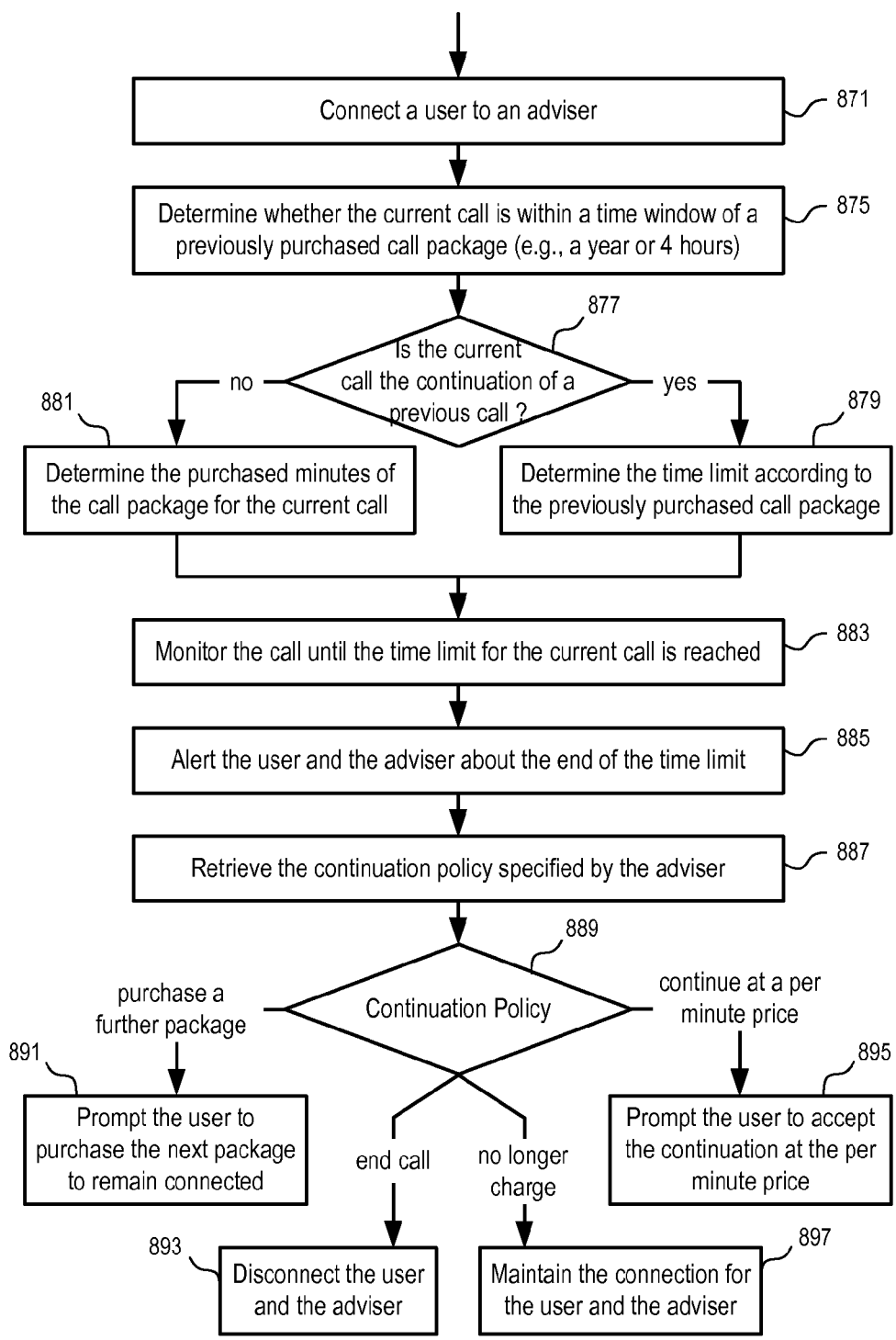
FIG. 14 illustrates a method to monitor and control a connection according to one embodiment of the present invention.

FIG. 14 illustrates a method to monitor and control a connection according to one embodiment of the present invention.

In FIG. 14, after the system connects (871) a user to an adviser, the system determines (875) whether the current call is within a time window of a previously purchased call package (e.g., a year or 4 hours).

In one embodiment, a call is considered a continuation of the previously purchased call package if the current call is within the time window. Thus, if the call of a previously purchased call package is interrupted, the user can continue the call within the time window without having to purchase another package.

Based on whether or not the current call is the continuation of a previous call (877), the system determines (879) the time limit according to the previously purchased call package, or determines (881) the purchased minutes of the call package for the current call. The system then monitors (883) the call until the time limit for the current call is reached. When the time limit for the call is reached, the system alerts (885) the user and the adviser about the end of the time limit.

In one embodiment, the continuation policy specified by the adviser is retrieved (887) to process the call at the end of the time limit.

If the continuation policy (889) is "purchase a further package", the system prompts (891) the user to purchase the next package to remain connected. For example, the user may be offered to continue the call at the price of $50 for another 30 minutes.

If the continuation policy (889) is "continue at a per minute price", the system prompts (895) the user to accept the continuation at the per minute price.

If the continuation policy (889) is "no longer charge", the system maintain (897) the connection for the user and the adviser until at least one of the user and the adviser hangs up.

If the continuation policy (889) is "end call", the system disconnects (893) the user and the adviser after altering the user and the adviser.

In one embodiment, the system stores a replication of the policy of the package the user purchased with the records of the purchased call (e.g., the policy at the time the call button is selected for the call package, or at the time the user is first connected to the adviser for the call package, or at the time the user explicitly confirms the purchase of the call package, etc.). Thus, the adviser is free to change the listing for the future callers even before the users finish the purchased call packages without retroactively affecting the purchased calls.

Some of the above examples are in the context of telephonic conversations. From this description, it will be understood that the techniques for connecting people for real time communications can also be applied to other types of communications, such as video and other multimedia channels, chat, instant messaging, document sharing, or screen-sharing, common "whiteboarding," interactive TV or internet TV, etc. Each of different multimedia channels can have different prices or be inclusive in one price (e.g., the use of part or all of the different channels can be included in the same price).

The real time communication may be on a one-to-one basis (e.g., one caller connected to one callee). The real time communication can also be in the form of one-to-many. For example, the seller may be hosting a conference in which multiple callers may attend. For example, 100 people can be in the same call or the same video session provided by the same seller.

Further, in one embodiment, the real time communication may include access to recorded sessions (e.g., recorded audio content and/or recorded video content).

Thus, the system on the whole may be used as a filter for sellers (callees), only letting in calls from people who are serious—they're serious because they have entered their credit card and are willing to pay. Celebrities can use the system. For example, people want to talk to the Oakland A's from the 70's, who are sitting on their porches these days. For example, Hollywood executives can use the system to hear pitches from scriptwriters who are willing to pay $ 1000 for the chance to pitch their script.

In one embodiment, these call buttons and the Ether phone numbers go to where the action is happening. In at least one embodiment of the present invention, it is recognized that not all service commerce will happen through marketplaces, such as keen.com or a search engine. People who want to talk to the Oakland A's players are more likely the visitor of the web site www.oaklandathletics.com—and that's where the call buttons can be very effective. And the Ether phone numbers can be in magazines, underneath photographs, in newspapers, on business cards, etc.

In one embodiment, the current status of the callee (e.g., availability, schedule, etc.) and guidance and instructions for the phone connection are provided through the appearance of the call button and the content of the call graphic. Alternatively or in combination, the status information, guidance and instructions can also be presented based using an interactive voice response (IVR) system.

For example, a talk radio station may have a guest on every day at a noon talk show. After the one-hour show, the radio announcer may say, "The time is up on our show. We've enjoyed talking with Dr. Webber and answering your calls. If you'd like to talk further with Dr. Webber, go to our website at WKBR.com and set up a conversation with him. Or, just dial the number 1-800-TALK-KBR and get in line. It's just $29 per 10-minute conversation".

In this example scenario, the phone number 1-800-TALK-KBR is assigned to Dr. Webber, which can be used to achieve many of the same goals as the call button assigned to Dr. Webber. While the button can visually communicate to the user the current (e.g., real-time) availability of the callee, the price, how many people are in line already, the schedule of the callee, etc., telephony prompts on a interactive voice response (IVR) system can also be used to provide such information after the caller dials the phone number that is assigned to the callee.

For example, in one embodiment, after a caller dials the phone number 1-800-TALK-KBR, the call is connected to a server, which determines that the call is for Dr. Webber since the phone number 1-800-TALK-KBR is assigned to (associated with) Dr. Webber. The server can then determine the current status of Dr. Webber, including the availability status, the price for the package, etc., and provide the information to the caller through the IVR system. In one embodiment, the server prompts options according to the current availability status of Dr. Webber. For example, the server may offer an immediate connection when Dr. Webber is available for immediate talk, or an opportunity to input a callback time window and/or callback phone number when Dr. Webber is expected to be available in a short period of time, or an opportunity to schedule an appointment with Dr. Webber when Dr. Webber is not expected to be available in a short period of time, etc. The server may use the IVR system to inform the caller the current status of the connection process and to provide instructions to the caller to take actions, such as providing a callback time window, providing an appointment time, providing an indication to accept the price of the call package, etc.

In one embodiment, the status information, instruction and guidance are provided using a combination of graphical presentations (e.g., over a graphical user interface terminal) and voice prompts (e.g., through an IVR system).

In one embodiment, the callee (seller) charges the caller(s) for the real time communication. The system provides the service to arrange and connect the call. The system can collect the payment from the caller(s), deduct a portion of the payment as fees to provide the service, and deliver the remaining payment to the callee (seller).

Alternatively, the callers may be not required to pay for the call; and the callee (e.g., advertisers) may pay the system for the service. In this case, the system may not provide the filtering functionality based on the willingness of the callers to pay. However, the callees (e.g., the advertisers) can still enjoy other benefits from the service provided by the system, such as call scheduling (no night calls), call queuing, toll-free number, local phone number, click-to-call, etc.

In one embodiment, the call buttons and the phone numbers assigned to the callees can also be published in advertisements in marketplaces, online or offline, on behalf of the callees; the callees bid for changes of the publicity and pay the bid amount on a per call basis for calls generated by the advertisements. When the callees generate the phone lead from their own media channel, the callees are only charged for a flat fee for the service of making the connection. Thus, in one embodiment, the system tracks the media channels that lead the caller to make the call.

Figure 15:
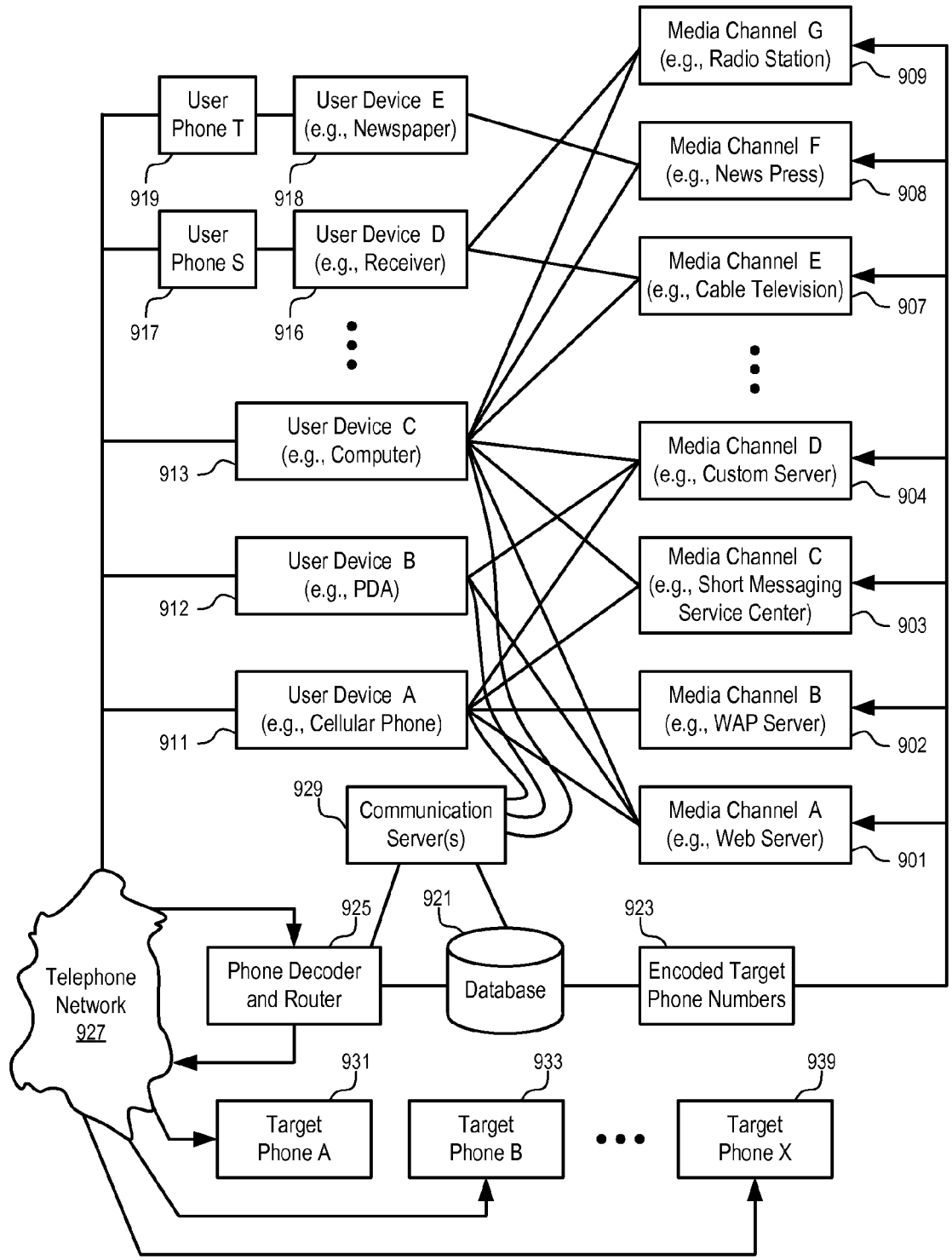
FIG. 15 shows a diagram of a system to assist and track connections according to one embodiment of the present invention.

FIG. 15 shows a diagram of a system to assist and track connections according to one embodiment of the present invention.

In FIG. 15, a database (921) may contain the phone numbers of target phone A (931), target phone B (933), . . . , target phone X (939), etc., of callees. Typically, the target phones belong to the institutions, businesses, individuals, etc, which seek for the services of embodiments of the present invention.

The call button and/or phone numbers assigned to the callees are distributed in various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the call buttons and/or the assigned phone numbers, which can be considered as the encoded phone numbers of the callees, are presented in the environment specific to the callees, not in the marketplaces that are specially designed to advertise the callees. Thus, the callees generate the phone leads on their own media distributions, such as their web site or blog site.

Alternatively, or in combination, the call buttons and/or the assigned phone numbers can also be presented in marketplaces, such as in listings/directories of services, advertisements in search results, etc.

In one embodiment of the present invention, the phone numbers of the target phones are not directly publicized over the media channels. Instead, encoded target phone numbers (923) are used. Using the encoded target phone numbers (923), a user cannot reach target phones directly. Using the encoded target phone numbers (923), a user reaches a server of the system first, which allows the system to provide various services before actually connecting the user to the callee, such as filtering, payment processing, etc.

The encoded target phone numbers (923) allow the association of additional information with the target phone numbers, such as the media channels used, special promotions, etc.

The encoded target phone numbers and/or the call buttons are delivered with content information (e.g., web page, WAP page, short message, television programs, news articles, advertisement, blog, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, etc.).

In one embodiment, a user device is capable of dialing a phone call (e.g., automatically according to the encoded phone number embedded in the content information when a user selects the number). Alternatively, a user may manually dial a phone call using a separate phone, such as user phone S (917) or user phone T (919).

In one embodiment, a user device (e.g., 911, 912, 193) is capable of rendering the call button and sending a message to the communication server(s) (929) when the call button is activated. The call button includes an identifier of the callee so that when the call button is activated the user devices communicates the identifier of the callee to the server(s) (929).

In one embodiment, the user device (e.g., 911) is further capable of automatically identifying a phone number of the caller, or a VoIP identifier of the caller, as a callback number. Alternatively, the user device (e.g., 911, 912, 913) is capable of communicating with the server(s) (929) to present user interfaces to receive the callback number and other parameters, such as the callback time window.

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the connection to target phone numbers can be paid for on a pay per call basis. Monitoring and tracking the calls can be used for billing the callee and/or the caller.

In one embodiment of the present invention, the additional information associated with the encoded target phone number is used to tracking phone calls for conditional promotions, electronic coupons, etc. Alternatively, the additional information for conditional promotions, electronic coupons, etc. are retrieved from the database of the listings at the time the corresponding call button is activated or presented, or at the time the encoded phone number is called.

The information about the media channels that are responsible for leading the users to the phone calls to the target phones can also be useful for the advisers. The advisers may wish to know which media channel is more effective in reaching users.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number (e.g., having an extension to the standard phone number). A first portion of the encoded target phone number has the same number of digits as a standard phone number to reach the phone decoder and router (925) through the telephone network (927); and a second portion of the encoded target phone number (e.g., the extension) is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The callees may be arranged to bid for shorter encoded target phone numbers.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with other parameters. To prevent revealing the target phone number and the parameters, an encryption/scrambling scheme can be used to encode the second portion, which is decoded at the phone decoder and router (925).

In one embodiment, the phone decoder and router (925) determines the target phone number from the encoded target phone number dialed by the user and then dials the target phone number for the user and joins the phone calls so that the user can talk to the target phone.

In one embodiment, the communication server(s) (929) determines the target phone number from the message sent from the user devices when the call button is pressed.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number. Alternatively, the system initiates the VoIP connection to the user device after receiving the message from the user device requesting the phone connection.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 15, the user device initiates the phone call. Alternatively, a phone router may be used to initiate phone calls both to the user device (or a separate user phone) and the target phone and then join the phone calls to connect the user to the target phone. For example, when the user selects the call button, the encoded target phone number is transmitted to the communication server(s) (929), which can instruct the phone decoder and router (925) to initiate the phone calls.

The user phone number can be automatically determined through ANI, or through a user preference setting, or through an entry submitted with the selection of the encoded target phone number (e.g., the call button).

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

Requester Queue Management

In one embodiment of the present invention, a tool is provided to allow a communicatee to manage a queue of communicators who have requested the system to establish communication links to the communicatee. The communicatee can prioritize the queue to specify the order of the communicators in which the communicatee would like to be connected to.

For example, the tool may display or play a recorded introduction of the caller to assist the callee to manage the queue. Self introductions of callers, the purposes or reasons of the calls, special notes for the calls, etc., can be collected when the system receives the requests for the telephone connections to the callee.

For example, an introduction can be collected in a call set up page that collects the callback telephone number of the caller and/or the desired time window for the callback. When the caller requests the telephone connection via calling the telephone number assigned to the callee (e.g., the Ether telephone number of the callee), the caller is connected to the system which determines the callee based on the telephone number dialed; and an introduction can be recorded via an Interactive Voice Response (IVR) system while the caller is connected to the system. When the introduction is collected in an audio form (e.g., via the telephone connection between the caller and the IVR system), the introduction can be converted to text through speech recognition. The text and/or the recorded the audio clip of the introduction can be presented to the callee for the management of the queue (e.g., via a visual tool, such as a web page). Similarly, an introduction collected in a text form (e.g., via a call set up page) can also be converted into an audio form through speech synthesis. The audio form of introduction can be used when the callee manages the queue via an audio channel (e.g., via a telephone connection between the callee and the system).

In one embodiment, the callee is allowed to define a measurement to rank the callers (customers) and/or the call requests. For example, the callee may rank the callers based on past experiences with the callers. The callee may rank the callers according to a total amount of past transactions with the callers, or a total amount of transactions with the callers within a specific period of time, or the durations of the previous calls from the callers, or the average durations of received calls from the callers, or accumulated durations of the received calls from the individual callers, or rank numbers specified by callee (e.g., a rank specified by the callee at the end of the previous call for a caller, or a weight averaged rank based on a number of previously specified ranks for a caller). The callee may designate one or more callers as VIP callers. The callee may further rank the call requests based on the introduction of the calls. The callee may use a combination of different factors to rank the callers and/or the call requests.

In one embodiment, the callee is allowed to see the queue of requesters (callers) with various status information, such as the call back time window, introductions/comments for the calls, statistical information about the callers (e.g., past transactions, ranks, comments by the callee, etc.). The callee can manually alter the order of callers in the queue. Thus, the callee can manage the queue based on factors determined by the system (e.g., indicators of long term value, etc.) and/or factors determined by the callees themselves (e.g., based on personal relationship, comments entered by callers, etc.). The system enables the callee to manage the queue, as well as information that are helpful in guiding the management of the queue.

FIG. 17 shows a user interface to collect comments on a request for a communication connection according to one embodiment of the present invention. In one embodiment, when a call button that is assigned to the callee is selected by a caller, the user interface as illustrated in FIG. 17 is displayed (e.g., as a web page, an applet, or as a standalone application).

In FIG. 17, the user interface allows the caller to specify a time window (1001) during which the caller is available to received a call back from the system to establish the requested phone connection with the caller. The caller can specify a call back phone number (1003). Alternatively or in combination, the system may also allow the caller to specify a VoIP telephone reference (e.g., a Session Initiation Protocol (SIP) address, a user name of a VoIP telephonic service, a user name of an instant messaging network, etc.) so that the system may call back to the caller via VoIP.

In FIG. 17, the user interface allows the caller to optionally specify a comment (1005) for the request. The comment can be displayed to the callee to assist the callee managing the queue. The caller may also use the comment to get the attention of the callee, to set up the context of the call, etc.

In one embodiment, a call button is assigned to the callee and arranged by the callee for presentation to potential callers. Alternatively or in combination, the call button can be presented on behalf of the callee in an advertisement, for which the callee is charged based on the telephone leads generated from the advertisement for the callee.

In one embodiment, a telephone reference (e.g., a VoIP telephone reference, or a regular telephone number with or without extension) that is assigned to the callee is used by the caller to request the system to make a telephone connection with the callee. The system determines the callee based on the telephone reference that is used to reach the system to make the request. While the caller is connected to the system via a telephone link, an IVR system can prompt the caller to specify the call back time window and/or the call back reference. The caller may provide the call back information and the comments for the call via the IVR system.

Alternatively or in combination, the system may also determine whether a connection to the caller can be made for visual communications, in additional to the audio communication link established via the telephone reference assigned to the callee. For example, when the caller is using a communication device that also supports visual communication, such as a mobile phone or a computer, the system may present a visual interface to collect the call back information (e.g., via a short text message, a web page, an instant message, etc.) When the caller is a registered member, the system may determine that the caller is logged in on a separate communication device (e.g., a personal comber) and attempt to utilize both the web link and the telephone link to communicate with the caller (e.g., to provide additional advertisement information, to collect comments and call back information, to collection both text and audio versions of comments, etc.)

FIG. 18 shows a user interface to manage a queue of requesters of phone connections to a callee according to one embodiment of the present invention. In FIG. 18, a visual presentation of the queue is provided to allow the callee to sort the list of requesters.

In one embodiment, the system identifies the callers and the presents the callers as their member names (user ID for the system) without revealing their real names for the privacy of the callers. A caller may provide a public profile to the system. The information specified in the public profile of the caller can be presented by the system to other members of the system. Thus, the caller can selectively provide information in the public profile for a desired level of privacy.

Alternatively, the system may present the callers using identifiers that are generated specifically for the callee, to avoid revealing the member names of the callers for enhanced privacy protection. For example, a caller for the callee may be identified as "caller12", while "caller12" for another callee may or may not be a reference to this caller and is generally not a reference to the same caller.

In one embodiment, the system also provides a tool to the callee to manage callee information. For example, in FIG. 18, when an identifier (e.g., 1031) is selected by the caller, a further user interface (not shown) can be displayed to manage information about the caller as identified by the identifier. The callee may specify a name for the caller. For example, during the conversation with the caller, if the caller provides the name of the caller to the callee, the callee can record the name so that the caller can be subsequently identified using the name entered into the system by the callee. The callee may record a comment about the callee for subsequent viewing. The callee may provide a rank to the caller, load past transactions with the caller, and/or specify a status of the caller.

In one embodiment, the system identifies a first time caller to the callee as "new" (1035). The caller may designated some callers as "VIP", some callers as "Preferred", some callers as "Blocked". The caller may sort the callers according to their status.

In one embodiment, the system uses a social network to identify the callers. For example, callers can be identified by whether they're a "friend" or a "friend of a friend" in a social network. For instance, a caller, Bob, might be identified as "2 degrees" away from a callee while Michael is "1 degree" away. Michael is a direct friend, whom the callee have certified as someone the callee knows, while Bob is a friend of a friend. For example, Bob might be a certified friend of Michael's. While the callee don't know Bob directly, Bob is in the extended network of the callee; and therefore the callee might want to talk to him. Cindy, on the other hand, might be "5 degrees" away. The callee might have little interest in communicating with someone so far outside the social network of the callee. In one embodiment, the system allows callees to individually certify friends, such that collectively the system maintains a social network, having data to identify friends of a friend, etc. Based on the social network, the system can compute the degrees of social separation between callers and the callee to allow the management of the caller queue using the degrees of social separation.

In one embodiment, the system also allows the callers to place bids to get priority in the queue. For example, when the caller requests the connection to the callee, the caller can also specify a bid amount for priority consideration. Thus, the order of callers in the queue can be at least partially determined by the amount that each caller is willing to pay for the priority. For instance, a first caller, Aaron, is in line. Then, a second caller, Billy, indicates he will pay a lump sum of an additional 10 cents to be in front of him. Billy is now first in line, and Aaron is second. Carol, a third caller, indicates she will pay 40 cents, and now she is first. Aaron decides to pay 20 cents and now he is in second place and Billy is in third. Thus, the queue can be dynamic changed according to a live auction for place in line. In one embodiment, the system can display a representation of the current queue to the callers to facilitate the auction of the priorities in the queue. For example, the system may inform a caller the current position of the caller and a list of current bids in the queue and allow the caller to modify his/her bid. The system may further provide estimated waiting times for the current queue to help the caller decide the bid. In one embodiment, the caller may sort the queue based on the bids for priority and other considerations, such as the comments/introductions submitted with the requests, the caller's personal relation with the callees, prior transactions, etc. For instance, a caller (advisor) could see the payments that each caller is willing to make for an earlier position in line, but the callee (advisor) may still decide to take the call from his best friend Michael first, or move his highest-spending caller Cynthia to the top position. In one embodiment, the system presents the information to facilitate the decision making by the callee in sorting the queue.

In one embodiment, the system allows a caller to specify an upper limit of the amount for the bid and automatically calculate the bid for the caller to improve the priority of the caller. For example, the system can determine the least amount of bid that can beat as many of the bids of other callers as possible without exceeding the upper limit.

In one embodiment, the bid for priority is charged as a lump sum once the connection between the caller and the callee is established. Alternatively or in combination, the bids can be in the form of additional price per minute for the communication time with the callee, if the callee delivers service to the caller over the communication connection. For example, the callee may specify that the communication time with the callee is at least at a given price (e.g., $1.5 per minute). A caller may bid above the price (e.g., additional $0.2 per minute) to seek for priority. In one embodiment, the callee may specify the allowable bid formats (e.g., as a lump sum for priority or as additional fees per minute for priority in the queue). When different forms of bids are allowed, the system can further compute an estimated effective bid (e.g., based on an estimated communication time) to assist the callee.

In one embodiment, a plurality of callers are in a group call with a callee (e.g., in a teleconference). The callers have listening-only privileges. The callers may request the privilege to be connected for speaking privileges also. A limited number of callers (e.g., one or two or more) may be granted the speaking privileges. A queue requesting the speaking privileges can be maintained.

For example, in a group call, there are a number of callers on the line all listening to a lecture given by the advisor. The callers may be paying a rate to be on the call, or not. In this case, the queuing criteria determine which of the callees get to have speaking privileges in addition to the listening privileges. For the speaking privileges, the callers may be identified and sorted according to various ways discussed, such as based on a best-customer criterion, a best-friend customer criterion, a highest-paying customer criterion, etc.

In another example, while a TV or radio show is in progress, fans may listen and/or watch the show and want to be able to ask a live question and contribute to the show. The fans can request the connection (e.g., for the speaking privilege) via one embodiment of the system. The connection may be provided via a microphone, a telephone, or a videophone. The queue of requests may be sorted according to one or more criteria, such as the introduction/comment presented for the corresponding request, the bids for priority, the geographic location of the requesters, past experiences with the requesters, etc. Such a system can allow mass audience participation.

Alternatively or in combination, the caller may sort the queue manually via the interface as show in FIG. 18. For example, the caller may select the icon (1045) to increase the priority of the caller (1031), select the icon (1047) to decrease the priority of the caller (1031), select the icon (1041) to assign top priority to the caller (1031), select the icon (1043) to assign bottom priority to the caller (1031) (e.g., move the caller to the bottom position in the list of non-blocked callers).

In one embodiment, the user can selectively show or hide the callers with the blocked status. For example, in FIG. 18 the blocked callers are listed; and the link (1049) can be selected to request a list that does not show the blocked callers, together with a link that can be used to request a list that shows the blocked callers.

In FIG. 18, the remaining call back windows as requested by the callers are also displayed, together with the amount of past purchases (e.g., 1037) from the respective callers, comments (e.g., 1039) from the callers for the respective requests, etc. The remaining call back window indicates the time period between the time the list is generated and the time when the requested call back window expires. The information specific to the callers and/or the requests are provided to assist the callee in managing the caller queue. More or less information can be displayed with the queue in different embodiments. In one embodiment, the items to be displayed with the queue is configurable by the caller (e.g., via a preference page).

The interface as illustrated in FIG. 18 can be used by the callee to manage the caller queue via a web connection or other types of data communication connection, using a web browser or a custom application.

In one embodiment, the callee can also manage a caller queue via an IVR system over a telephone connection. For example, when the callee is connected to the system via a telephone connection, the callee is presented with the caller queue. The callee can selectively reorder the queue, or select one from the queue for connection to the selected caller. In one embodiment, the system priorities the queue according to a set of rules specified by the callee and presents a number of top ranking callers for selection by the caller.

Figure 19:
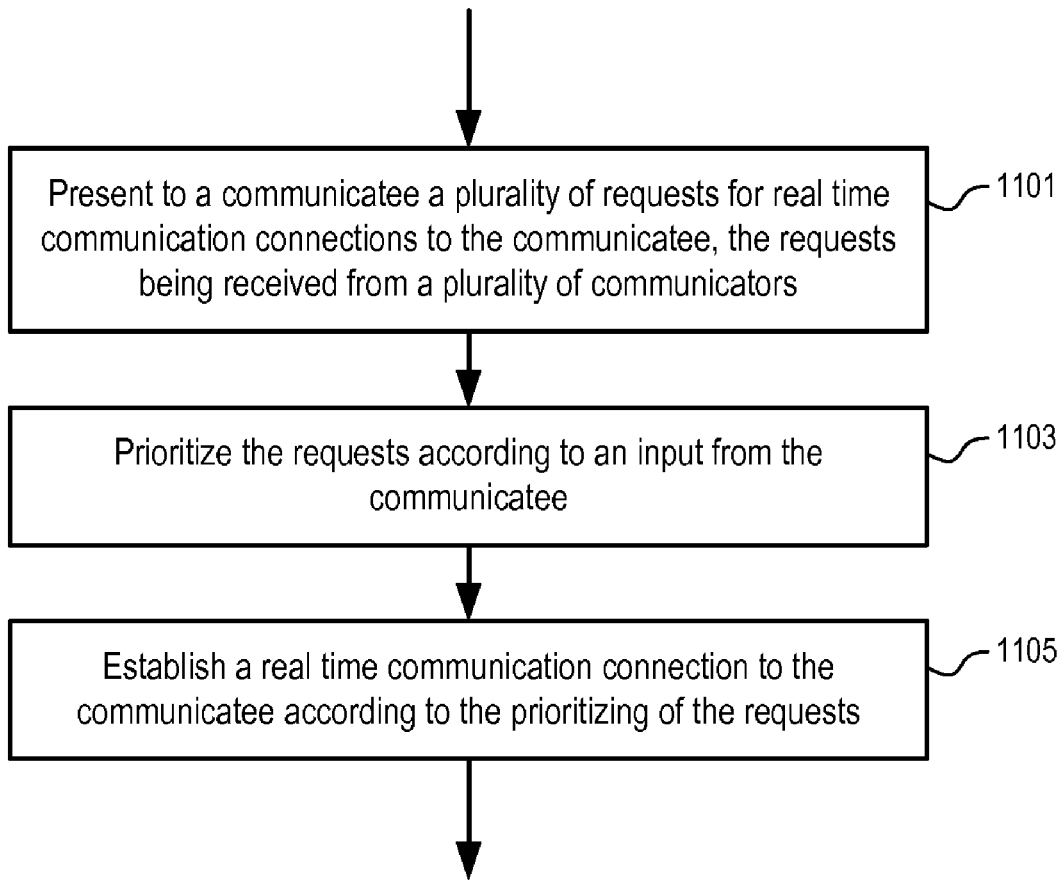
FIG. 19 shows a method to manage a queue of requesters of real time communication connections to a communicatee according to one embodiment of the present invention.

FIG. 19 shows a method to manage a queue of requesters of real time communication connections to a communicatee according to one embodiment of the present invention. A plurality of requests for real time communication connections to a communicatee is presented (1101) to the communicatee. The requests are received from a plurality of communicators. In one embodiment, the real time communication connections are telephone connections for real time voice conversation. Alternatively or in combination, the real time communication connections may also facilitate the real time transmission of audio, video, image, text, multi-media message, etc.

In one embodiment, the real time communication connections are requested to obtain services for a fee from the communicatee via the connections, such as obtaining advice or entertainment. Alternatively or in combination, the real time communication connections are requested as responses to advertisements presented on behalf of the communicatee; and the communicatee is charged based on a number of real time communication leads generated from the advertisements. As an advertiser, the communicatee may further specify a price bid per lead generated from the advertisement.

In one embodiment, the requests are prioritized (1103) according to an input from the communicatee; and a real time communication connection to the communicatee is established (1105) according to the prioritizing of the requests. For example, the communicatee may specify a rule to sort the requests, or manually sort the list, or select one as the top ranked requests. For example, the communicatee may explicitly request the connection for a request selected from the list; alternatively, the sorted list is submitted to the server, which implicitly initiate the connection from the top of the list when a condition to initiate is satisfied (e.g., when the communicatee indicates the real time availability to take a connection).

Figure 20:
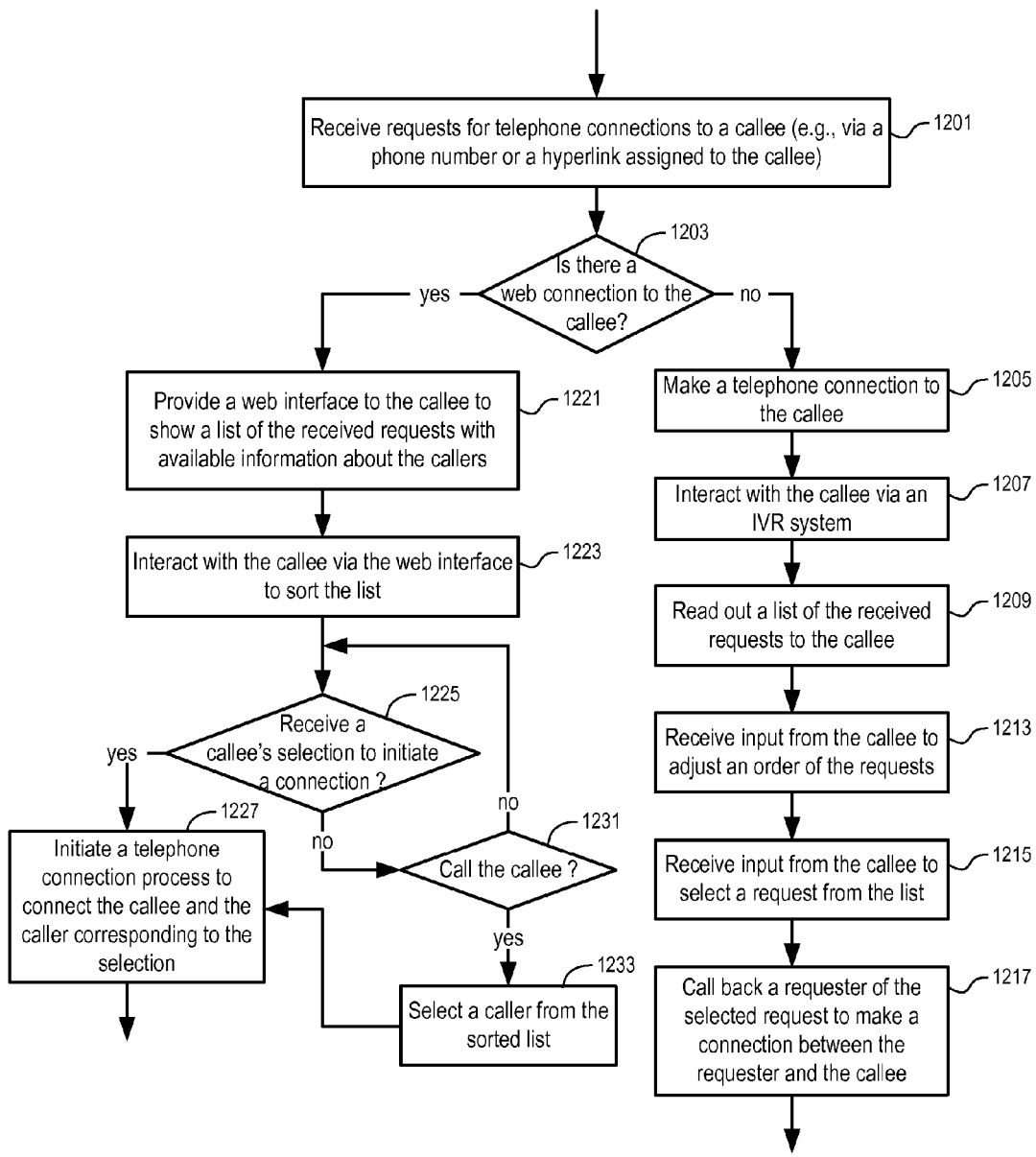
FIG. 20 shows a method to connect a callee with one of callers according to one embodiment of the present invention.

FIG. 20 shows a method to connect a callee with one of callers according to one embodiment of the present invention. In FIG. 20, requests for telephone connections to a callee are received (1201) (e.g., via a phone number or a hyperlink assigned to the callee). It is then determined (1203) whether there is a web connection to the callee.

If it is determined that there is no a web connection to the callee, a telephone connection to the callee is made (1205) to interact (1207) with the callee via an IVR system, which can read out (1209) a list of the received requests to the callee. Input from the callee is received to adjust (1213) an order of the requests and/or select (1215) a request from the list. A requester of the selected request is then called back (1217) to make a connection between the requester and the callee.

If it is determined that there is a web connection to the callee (or other connections that allows visual communication to the callee), a web interface (or other types of visual interface) to the callee is provided (1221) to show a list of the received requests with available information about the callers. The system interacts (1223) with the callee via the web interface to sort the list.

It is then determined whether a callee's selection to initiate a connection is received (1225). If the callee explicitly selects one from the list to initiate a connection, a telephone connection process is initiated (1227) to connect the callee and the caller corresponding to the selection; otherwise, the system determines (1231) whether it is an appropriate time to call the callee. When it is an appropriate time to call the callee, a caller (1233) is selected from the sorted list by the system (e.g., the top ranking request of the list); and a telephone connection process is initiated (1227) to connect the callee and the caller corresponding to the selection.

In one embodiment, a system can connect communicators to communicatees for real time communication via communication references assigned to the communicatees. The communicators can request the system to establish communication links to the communicatees through contacting the system via the communication references. The system identifies the communicatees based on the communication references the communicatees used to make the requests. The system can provide various communication links, such as telephone, video, text, web, WAP, Short Message Service (SMS) message, Multimedia Message Service (MMS) message, web television, instant message, document sharing, screen sharing, and common whiteboarding.

In one embodiment, a system is provided to allow the confirmation of a callback request before a callback is performed to establish a communication connection.

FIGS. 21-24 illustrate methods to confirm callback request according to various embodiments of the disclosure.

Figure 21:
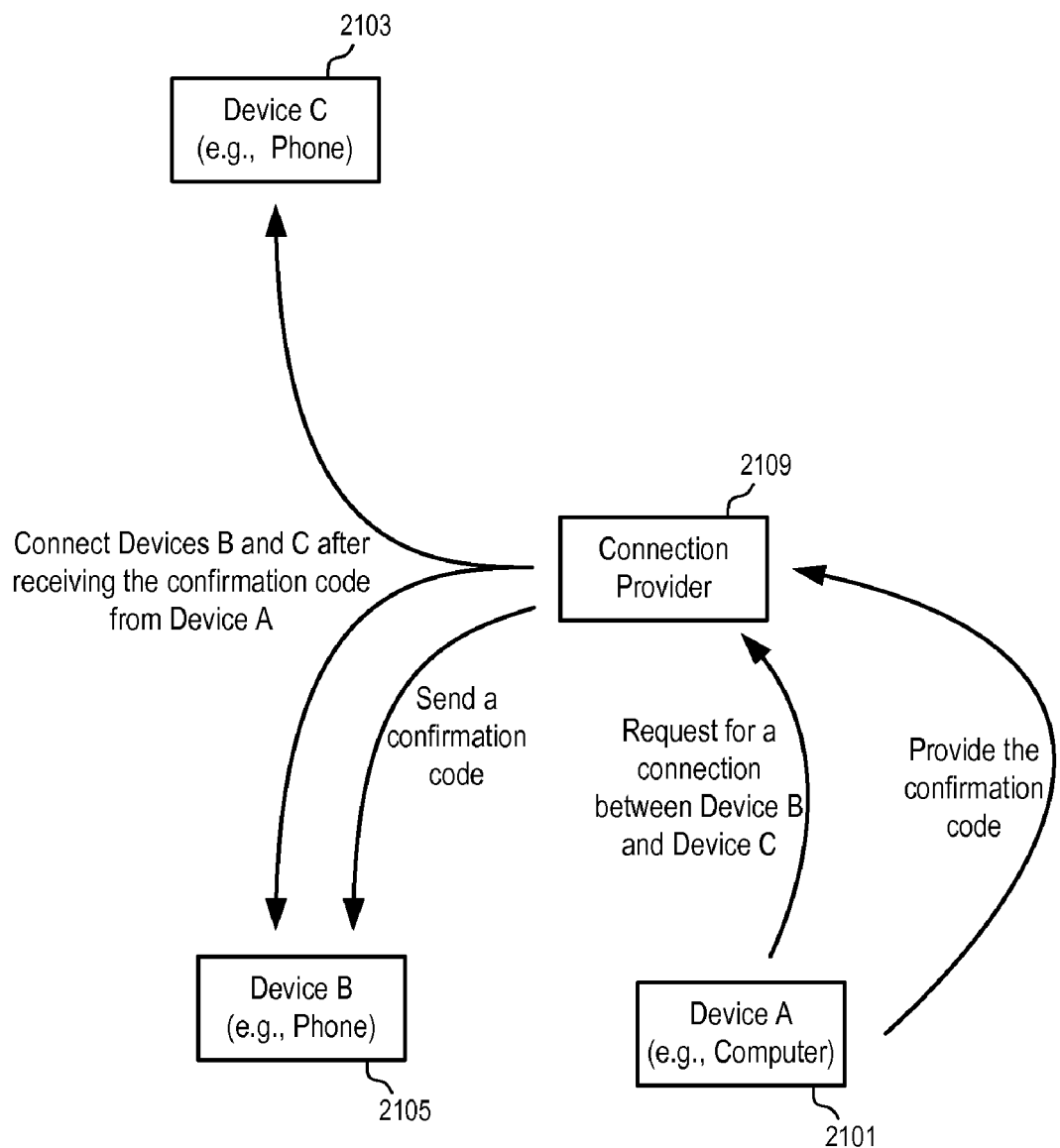
FIGS. 21-24 illustrate methods to confirm callback request according to various embodiments of the disclosure.

In FIG. 21, a connection provider (2109) is capable of providing a communication connection via making separate connections to the device C (2103) (e.g., a phone) and device B (2105) (e.g., a phone).

For example, when the connection provider (2109) receives a request for a connection between device B (2105) and device C (2103) from device A (2101) (e.g., a computer), the connection provider (2109) receives a communication reference (e.g., a phone number) of the device B (2105). Using the communication reference of the device B (2105), the connection provider (2109) is capable of making a connection between the device B (2105) and the connection provider (2109).

In one embodiment, before the initiation of the connection to the device B (2105), a confirmation code is sent to the device B (2105) using the communication reference of the device B (2105) that is received in the request from the device A (2101). A user in control of the device B (2105) can obtain the confirmation code and provide the confirmation code back to the connection provider (2109) via the device A (2101) to confirm the request.

After the connection provider (2109) receives the correct confirmation code from the device A (2101), the connection provider (2109) then starts to connect devices B and C (2105 and 2103).

Thus, if the user of device A (2101) is not in control of the device B (2105), the user would not be able to provide the correct confirmation code to confirm the request. Such an arrangement can be used to prevent false requests from being used to harass the owner of the device B (2105).

In one embodiment, the confirmation code is sent to the device B (2105) without making a connection to the device B (2105) for real time communication.

For example, instead of calling the device B (2105), the confirmation code can be sent to the device B (2105) via a data channel, such as SMS, email, presence status, etc. The delivery of the confirmation code is less intrusive for the user of the device B than a call for a connection for real time communication. For example, receiving a confirmation code to a mobile phone (e.g., cellular phone) via a text message is less annoying than an unsolicited call.

In one embodiment, the use of the confirmation code is required for the initiation of the requested connection in response to indications of abuse, error, or abnormality. For example, a confirmation code may be used after the device A (2101) is used to request callbacks to a number of different devices in a short period of time, or a callback to the device B (2105) in response to a previous request was not answered or disconnected shortly after being answered.

In one embodiment, the device B (2105) is capable of supporting real time communication in voice, as well as data reception without a call. In one embodiment, the received data are designed to be viewed in response to a request from the user. Preferably, the reception of the data does not require the user to answer a call for a connection. Thus, the use of the data reception capability of the device B (2105) to deliver the confirmation code can reduce the degree of intrusiveness, if the request is submitted from device A (2101) without the authorization of the user of device B (2105).

In one embodiment, the device used to submit the request for a callback is the same as the device that is to be called back. When the connection provider (2109) determines that the user is in possession of the device that is to be called back, the connection provider (2109) can make the requested connection without sending a confirmation code.

In one embodiment, when the connection provider (2109) cannot determine whether the received request is from the user of the device that is to be called back, the connection provider (2109) may send the confirmation code to the device B (2105) and require the confirmation code from the requester to confirm the request.

Figure 22:
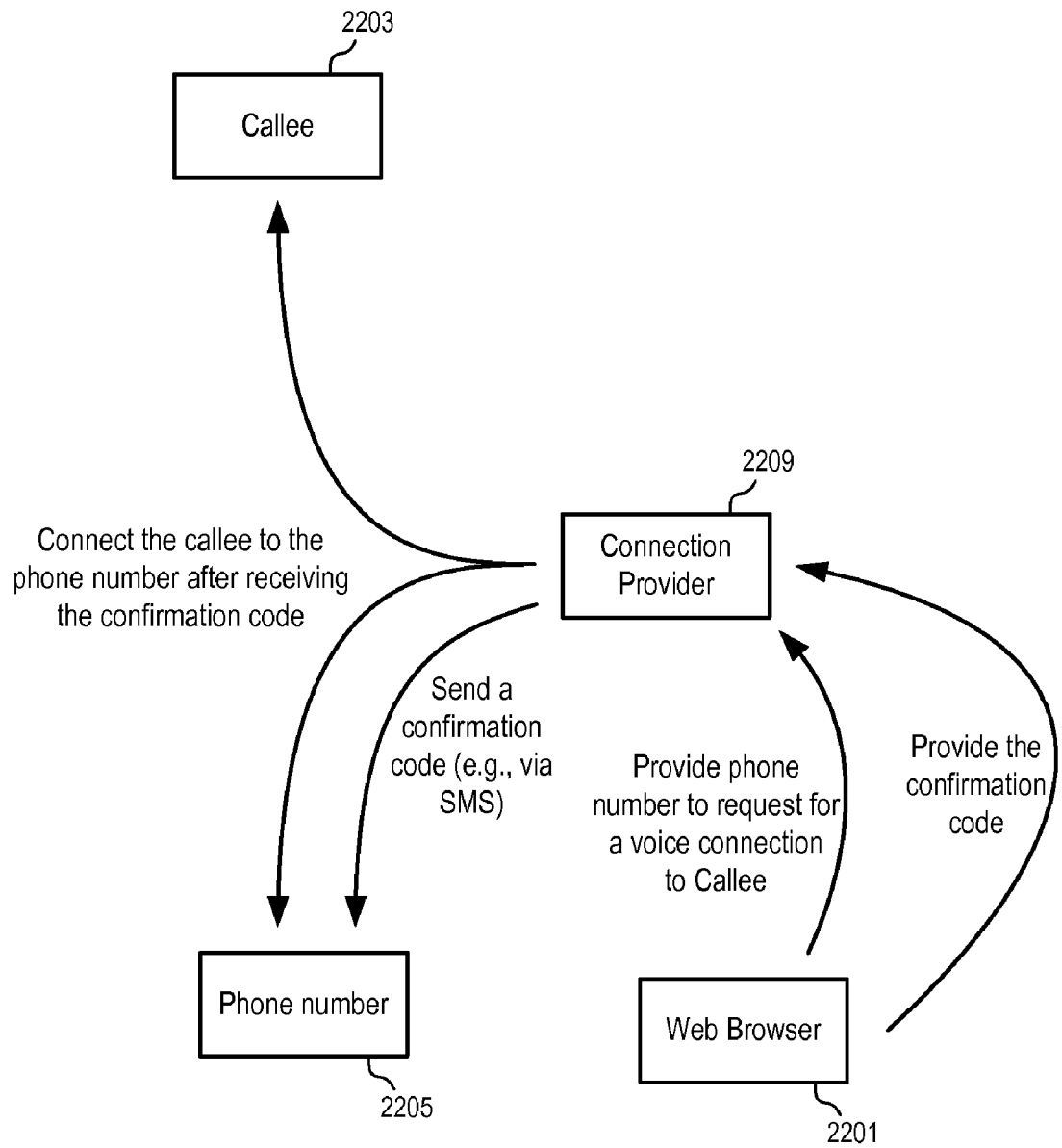

FIG. 22 illustrate an example of requesting a callback to a phone number (2205) for a voice connection to the callee (2203).

For example, a click-to-call icon may be presented in the web browser (2201). When the click-to-call icon is selected in the web browser (2201), a request for a callback to the phone number (2205) is sent to the connection provider (2209).

The phone number (2205) may be provided to the connection provider via a subsequent page that allows the user of the web browser to enter the phone number. Alternatively, the phone number (2205) can be configured to be stored in the computer that runs the web browser (2201) and provided to the connection provider (2209) when the click-to-call icon is selected. Alternative, the click-to-call icon may include a reference which can be used by the connection provider (2209) to determine the phone number (2205) (e.g., through decoding/decrypting the reference or through looking up the phone number from a database using the reference).

In one embodiment, the phone number (2205) is for a phone that is connected to a landline from a circuit switched telephone network, or a mobile phone, such as a cellular phone, or a satellite phone.

In one embodiment, the phone number (2205) is assigned by a telephone carrier to a VoIP-based telephone, such as a software-based phone, a Universal Serial Bus (USB) phone, a Bluetooth phone, etc. The phone number (2205) can be dialed using a plain old telephone system over a circuit switched telephone network. When the phone number is being called from a circuit switched telephone network, the telephone carrier bridges the circuit switched telephone network and the packet switched network at the telephone number.

Alternatively, the phone number (2205) is a VoIP-based phone reference, such as a user identifier of an instant messaging network, a uniform resource identifier, a session initiation protocol (SIP) address, etc.

In response to the web browser (2201) providing the phone number (2205) to the connection provider (2209) for a callback, the connection provider (2209) sends a confirmation code to the phone number via a data communication channel (e.g., via SMS).

In one embodiment, the connection provider (2209) determines the capability of the device at the phone number (2205) through looking up from a telephone directory. For example, when the telephone number is assigned to a cellular phone (e.g., serviced by a specific telephone carrier), the connection provider may determine that the device at the telephone number has the capability to receive SMS messages. In one embodiment, the connection provider (2209) determines the capability of the device at the phone number (2205) through receiving input from the web browser (2201). In one embodiment, the connection provider determines the capability of the device at the phone number (2205) from a database.

In one embodiment, the request for a callback is sent from the web browser (2201), when the user selects a click-to-call icon displayed in the web browser (2201). Alternatively, the request for a callback can also be sent via other communication methods. For example, a request can be sent via an email gateway, or SMS gateway, an instant messaging (IM) gateway, or a custom application using a custom designed communication protocol.

In one embodiment, when the connection provider (2209) fails to find a data communication channel to transmit a confirmation code to the phone number (2205), the user may be instructed to call the connection provider (2209) from the phone number (2205) to obtain a confirmation code. When the user calls from the phone number (2205) to obtain the confirmation code, the connection provider (2209) can use the Automatic Number Identification (ANI) service to verify that the confirmation code is provided to a caller from the phone number (2205).

Figure 23:
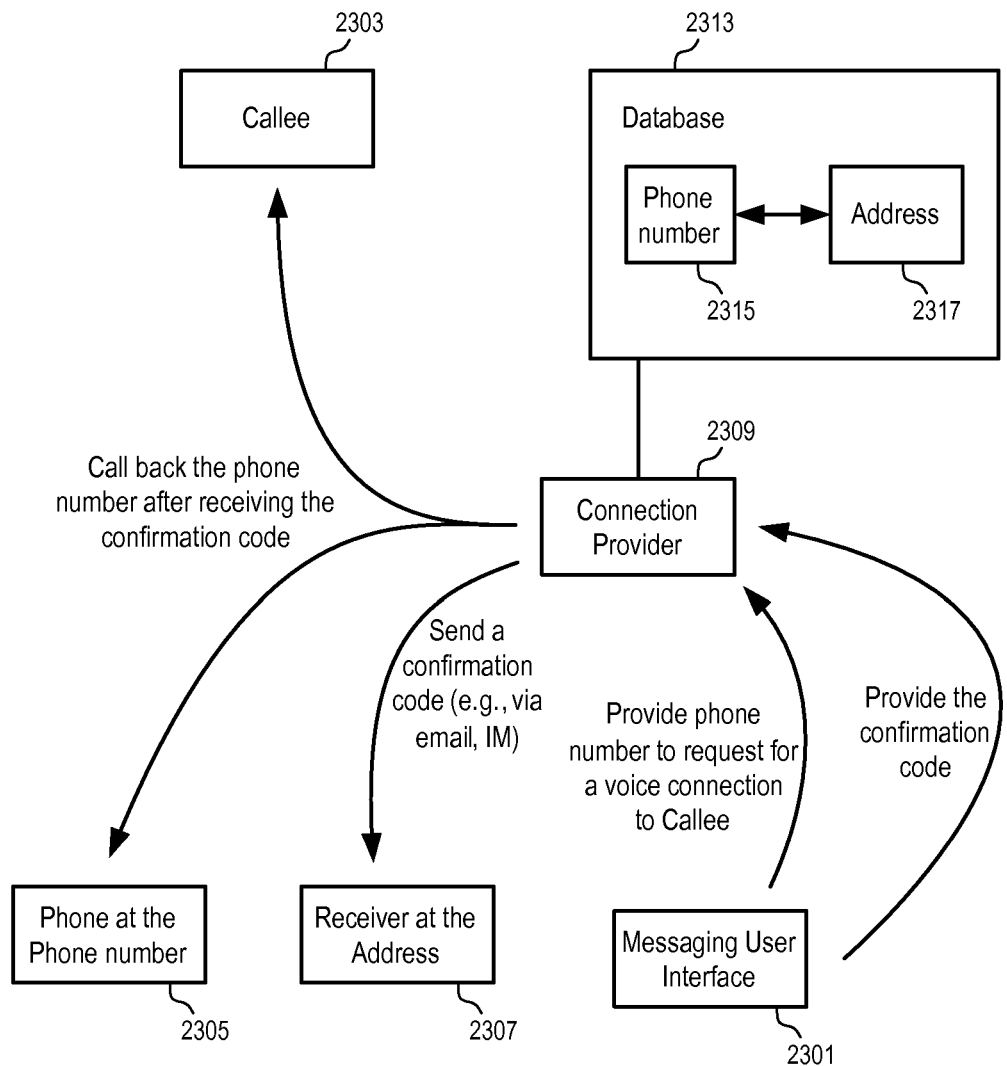

In one embodiment, instead of sending the confirmation code to the phone number (2205), the confirmation code is sent to an address that has a know relation with the phone number, as illustrated in FIG. 23.

In FIG. 23, a messaging user interface (2301) is used to provide the phone number (2315) to the connection provider (2309) to request for a voice connection to callee (2303) via calling back the phone (2305) at the phone number (2315). Since the phone (2305) may not support data reception, the connection provider (2309) can look up an address (2317) from the database (2313) using the phone number (2315) and send the confirmation code to the receiver (2307) at the address (2317). The receiver (2307) may be an email reader, an instant messaging application, etc.

Alternatively, a known relation between the address and the phone number can be used to compute the address from phone number. For example, an email address associated with the phone number can be a combination of the phone number and a domain identifier of the telephone carrier of the phone number. The telephone carrier may deliver the email via SMS, or forward the email to another email address of the user.

In one embodiment, the phone (2305) and the receiver (2307) are separate devices. For example, the receiver (2307) is running on a computer which may or may not run the messaging user interface (2301) (e.g., a web browser). Alternatively, the phone (2305) and the receiver (2307) can be on the same device. For example, the receiver (2307) may be an email client program running on the phone (2305).

In one embodiment, the confirmation code is transmitted to the receiver (2307) in a way which does not typically require the immediate attention of the user. For example, an email is typically queued in the inbox for viewing at a time convenient to the user.

In one embodiment, a presence status is used to transmit the confirmation code to the receiver (2307) via an instant messaging network. For example, the connection provider may appear as a buddy of the user in the receiver (2307); and the confirmation code is provided to the receiver (2307) as part of the presence status information of the connection provider. If the user of the receiver is not the requester, the user would not be bothered by the status information of the connection provider. If the user is expecting the confirmation code, which is required for the confirmation of the request for a connection to the callee (2303), the user can easily obtain the confirmation code and confirm the request for callback.

In FIG. 23, the connection to the callee (2303), established via a callback, supports voice communication (e.g., a phone connection).

Alternatively or in combination, the connection process according to embodiments of the disclosure can also be used to provide a connection for instant messaging, image, video, file sharing, application sharing (e.g., common whiteboarding), etc.

For example, a callback may be used to establish a text chat session between a customer and an adviser. For example, a callback may be used to establish an application sharing session between a customer and a specialist for training, trouble shooting, etc. For example, a callback may be used to establish a video conferencing session for meeting, presentation, entertainment, etc.

In one embodiment, the connection provider bridges two individual connections to the callee and to the caller to provide privacy for the callee and/or the caller. Thus, the addresses and/or the identities of the callee and/or the caller are not revealed to each other through the communication connection. The caller and the callee may choose to remain anonymous to each other even after the communication session.

In one embodiment, the connection provider tracks the calls made to the callee through providing the connection. For example, pay for performance advertisements can be charged based on the communication leads generated for the advertisers. Through tracking the calls generated via advertisements, the advertisements can be charged on a per call basis (e.g., based on a count of calls). The calls may be a telephone call, a call for an instant messaging session which may support text, voice, image and/or video, a call for an application sharing session, etc.

Figure 24:
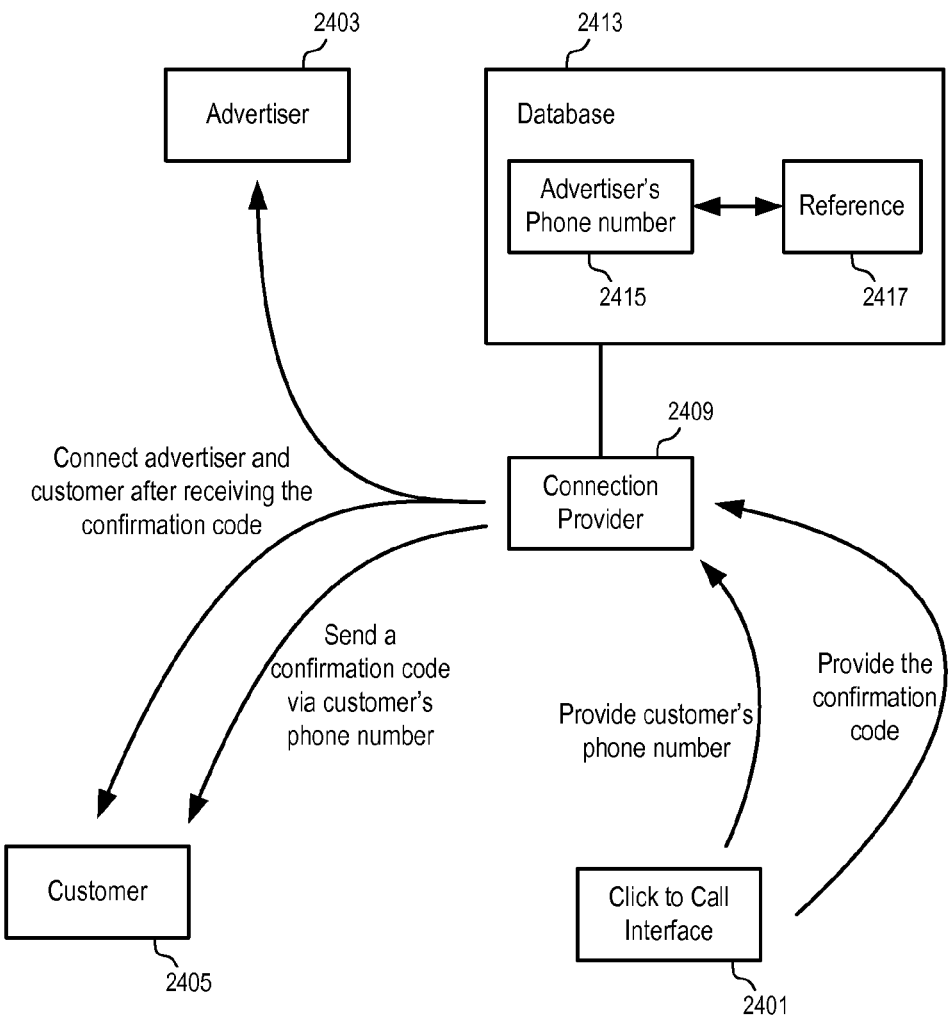

FIG. 24 illustrates an example in which an advertisement is provided with a click to call interface (2401), which includes a selectable link, icon or button embedded in the advertisement. When selected, the click to call interface sends a request to the connection provider (2409) for a callback.

In one embodiment, the click to call interface for the advertisement includes a reference (2417) which is associated with the advertiser's phone number (2415) in database (2413). The reference (2417) is sent to the connection provider (2409) with the callback request; and the connection provider (2409) looks up the advertiser's phone number (2415) using the received reference (2417).

In another embodiment, the click to call interface for the advertisement includes an encoded/encrypted version of the advertiser's phone number, which can be decoded/decrypted without relying upon a database (2413).

The click to call interface also provides the customer's phone number to the connection provider.

Since the phone number of the advertiser (2403) is not provided in the advertisement directly, a customer responding to the advertisement calls the advertiser (2403) via the connection provider (2409). Thus, the number of calls generated from the advertisement can be measured.

In one embodiment, to prevent the connection provider (2409) from calling a wrong customer (e.g., because of an unintentional or intentional error in the phone number provided by the requester), the connection provider (2409) may provide the confirmation code to the customer via the customer's phone number and require the correct conformation code from the click to call interface (2401) to connection the advertiser (2403) and the customer (2405).

In one embodiment, after the confirmation code is verified, the connection provider (2409) initiates calls to both the advertiser (2403) and the customer (2405) (e.g., via VoIP calls). Based on the phone numbers of the advertiser (2403) and the customer (2405), the calls initiated from the connection provider (2409) may be terminated by one or more telephone carriers at phones connected to a circuit switched network, or a package switched network.

In one embodiment, the advertiser (2403) specifies the price bid for each calls received from the advertisement; and the advertisements are presented based at least in part on the price bids. For example, when the advertisements are presented in response to a search, the order in which relevant advertisements are presented can be based on the price bids.

In one embodiment, the advertiser (2403) provides services (e.g., advice, entertainment, information, etc.) over the communication connection to the customer (2405). The customer (2405) is charged for the time of the advertiser (2403); and a portion of the fee charged by the advertiser (2403) is retained by the connection provider (2409) for the service rendered by the connection provider (2409).

In one embodiment, a seller who offers services over the communication connection provided by the connection provider (2409) may include the click to call interface in their own web site, blog, email, etc. The click to call interface includes the reference (2417) that is associated with the advertiser's phone number (2415). Thus, the connection provider (2409) provides the connection service but may or may not provide advertising service. In one embodiment, the connection provider (2409) also provide the services of collecting fees from the customer (2405) on behalf of the seller (e.g., advertiser 403), if the customer (2405) purchases communication time with the seller.

Figure 25:
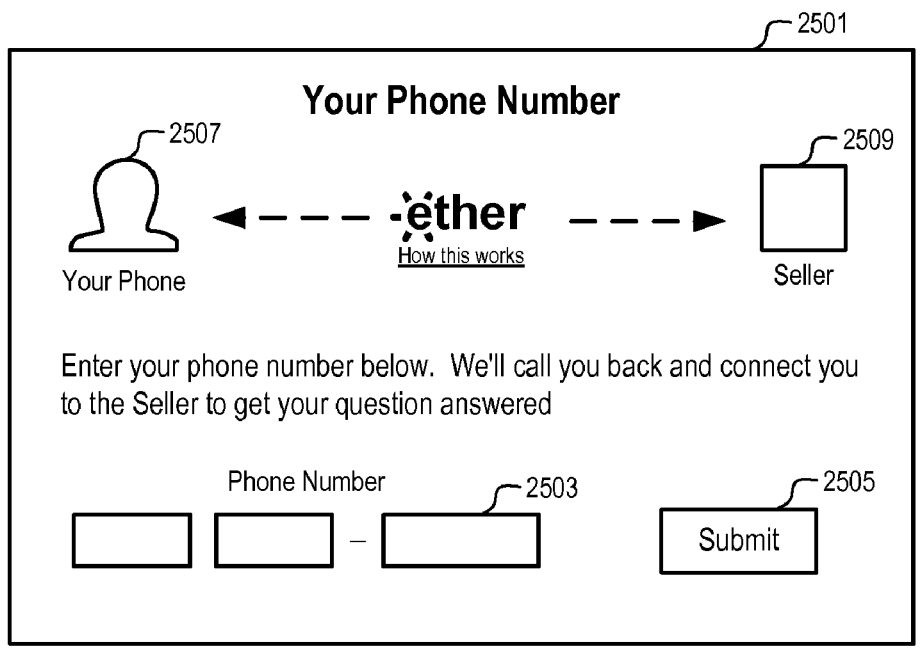
FIGS. 25-26 illustrate user interfaces which can be used to guide a user through a callback process according to embodiments of the disclosure.
Figure 26:
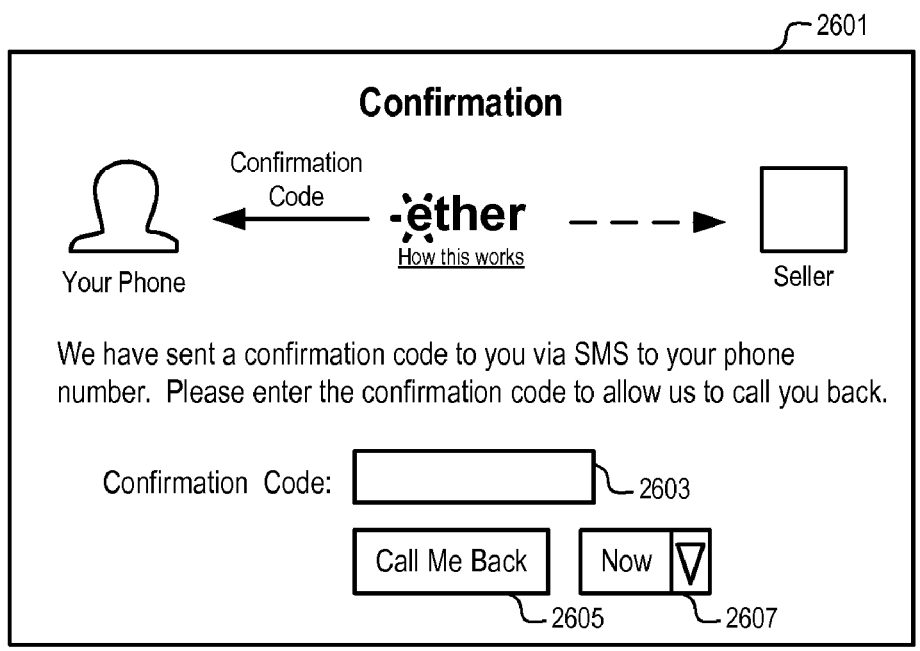

FIGS. 25-26 illustrate user interfaces which can be used to guide a user through a callback process according to embodiments of the disclosure. In FIGS. 25-26, a graphical representation of the connection process is presented with status information illustrating the progress of the connection process and instructions for the user to step through the connection process.

For example, in FIG. 25, the interface (2501) shows that the connection to the phone of the user and the connections are to be established, as indicated by the dotted lines pointing to the icons (2507 and 2509) the represent the caller and the callee. The user is prompted to enter the phone number in entry boxes (2503) and use the "submit" button (2505) to provide the system with the callback phone number.

After the callback phone number is received, the interface (2601) in FIG. 26 is shown, which indicates that a confirmation code has been sent to the phone number of the user. The user is prompted to enter the confirmation code in entry box (2603) to confirm the request for call back using the "call me back" button (2605). The user may choose to called back immediately or after a period of time using the selection box (2607). In one embodiment, a user can select a time period from a set of pre-determined time periods (e.g., 1 minute, 2 minutes, 5 minutes, 10 minutes, 15 minutes, etc.). In another embodiment, the user can enter the minutes that the system should wait before calling back the phone number.

Figure 27:
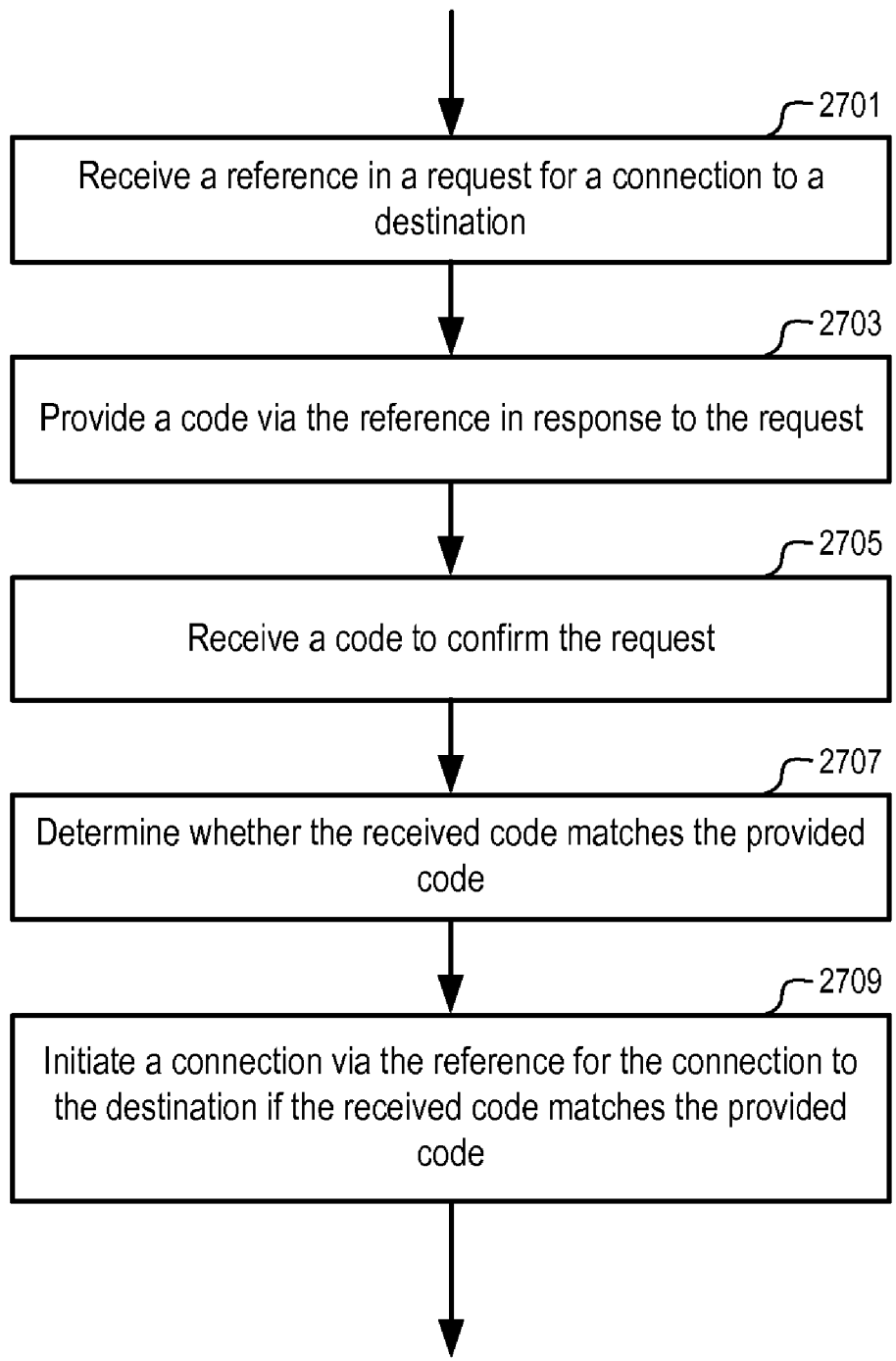
FIG. 27 shows a method to confirm a callback according to one embodiment of the disclosure.

FIG. 27 shows a method to confirm a callback according to one embodiment of the disclosure. In FIG. 27, a reference (e.g., a phone number) is received (2701) in a request for a connection to a destination (e.g., a phone connection). The connection to the destination is to be established via calling back the requester according to the reference (and calling the destination). In response to the request, a code is provided (2703) via the reference. A code is then received (2705) to confirm the request. It is determined (2707) whether the received code matches the provided code. If the received code matches the provided code, a connection is initiated (2709) via the reference for the connection to the destination.

In one embodiment, the callback reference includes a session initiation protocol (SIP) address or a uniform resource identifier (URI) (e.g., for a voice connection, for an instant messaging connection, etc.).

In one embodiment, the code can be provided via the reference through a data channel addressed to the reference, such as short message service (SMS), or an address (e.g., an email address, an instant messaging identifier) determined according to the reference. In one embodiment, the code is provided to the address as presence status information.

In one embodiment, the code can be provided as a Completely Automated Public Turing test to tell Computers and Humans Apart (CAPTCHA), in a text format, an audio format, a voice format, or a video format.

In one embodiment, the provided code and the received code are determined to be matching with each other when the provided code and the received code are the same.

In another embodiment, the provided code and the received code are determined to be matching with each other when the provided code and the received code have a predetermine relation but are not the same. For example, the received code may be required to be one increment above the provided code.

In one embodiment, an instruction to manipulate the provided code to generate the code that is to be sent back to the connection provider for conformation is provided with the confirmation code. In one embodiment, the instruction to manipulate the provided code to generate the code that is to be sent back to the connection provider for conformation is provided in the click to call interface.

In one embodiment, the instruction is provided to prevent a machine from making the request without a human behind it. Thus, the conformation process can also be used to verifying that the request is from a human user.

In one embodiment, the confirmation code is sent in the form of a Completely Automated Public Turing test to tell Computers and Humans Apart (CAPTCHA). For example, random words or letters are displayed in a distorted fashion so that they can be recognized by people, but not by software. The tests are typically formulated to require a solution to a difficult problem in the field of artificial intelligence (AI) to compile a software which could pass the tests.

In one embodiment, the confirmation code is sent in a text format according to the reference received. Alternatively, the confirmation code may be sent via voice mail, audio signal, image, video clip, etc.

Figure 28:
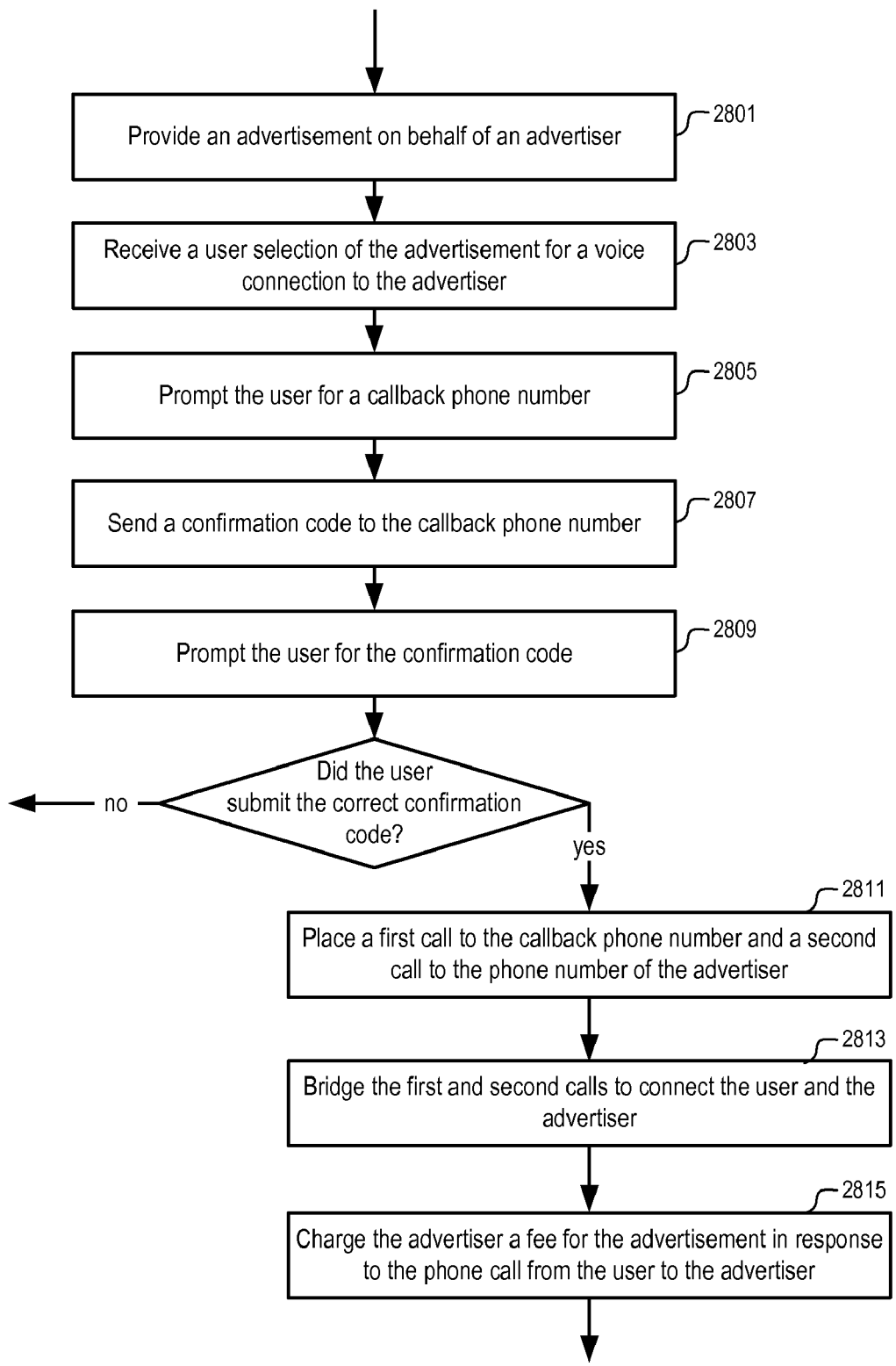
FIG. 28 shows a method to confirm a callback for voice connection to an advertiser according to one embodiment of the disclosure.

FIG. 28 shows a method to confirm a callback for voice connection to an advertiser according to one embodiment of the disclosure. In FIG. 28, an advertisement is provided (2801) on behalf of an advertiser. A user selection of the advertisement for a voice connection to the advertiser is received (2803). The user is prompted (2805) for a callback phone number. After receiving the callback phone number, a confirmation code is sent (2807) to the callback phone number (e.g., via SMS, or email, or a status indicator). The user is then prompted (2809) for the confirmation code.

It is then determined whether the user submitted the correct confirmation code. If the confirmation code received from the user is correct, a first call is placed (2811) to the callback phone number and a second call to the phone number of the advertiser. The first and second calls are bridged (2813) to connect the user and the advertiser. The advertiser is charged (2815) a fee for the advertisement in response to the phone call from the user to the advertiser.

If the confirmation code received from the user is correct, the callback is not initiated. The user may resubmit the confirmation code or make a correction to the callback number.

In one embodiment, a connection provider system determines whether a source of a call request is on a directory of blocked entities before initiating a call in response to the call request. The source may be an IP address for the initiation of a request for callback, for the initiation of a VoIP-based call, for the initiation of an instant messaging session, etc. The source may be a callback phone number, a phone number or an email address from which a call request is received. The source may be a user identifier of the caller, or a credit card number of the caller, or a digital certificate of the caller. In one embodiment, the system can detect an abnormal usage pattern associated with a source of call requests and put the source on the directory of blocked entities; alternatively or in combination, the system can receive indication from callees to identify the calls that are received from the system as a result of the call requests from the sources and thus identify the sources for blocking; alternatively or in combination, the system can receive instructions from callees for blocking incoming calls from the system under certain conditions (e.g., for a time period specified by a callee). In one embodiment, a caller can circumvent the call blocking and/or remove the source associated with the caller from the directory of blocked entities by performing certain actions, such as providing a code obtained from the system or from an advertisement, passing a Completely Automated Public Turing test to tell Computers and Humans Apart (CAPTCHA), talking to an operator, providing an identity through registering with or logging into the system, paying a fee, etc.

For example, the system can block specific callers based on identifications of the callers, such as the phone number from which the call is initiated (e.g., the phone number determined using the ANI service), the IP address from which the request for call is initiated (or from which a VoIP-based call is initiated). The system may block calls based on a time schedule, the volume of calls to a specific callee and/or the volume of calls initiated from a specific caller, etc. For example, the system may block calls based on a set of conditions, such as blocking specific callers according to a time schedule for a specific callee, blocking all callers to a callee when the number of calls to the callee exceeds a threshold during a time period, blocking a caller to a selected set of callees, or a category of callees or all callees, when the number of calls initiated from the caller exceeds a threshold, or when the number of calls initiated from the caller to a category of callees exceeds a threshold during a time period. The block may be enforced for a period of time and automatically removed. Alternatively or in combination, the block can be removed when the caller and/or callee can provide information to verify their identities and distinguish themselves from abusers.

Figure 29:
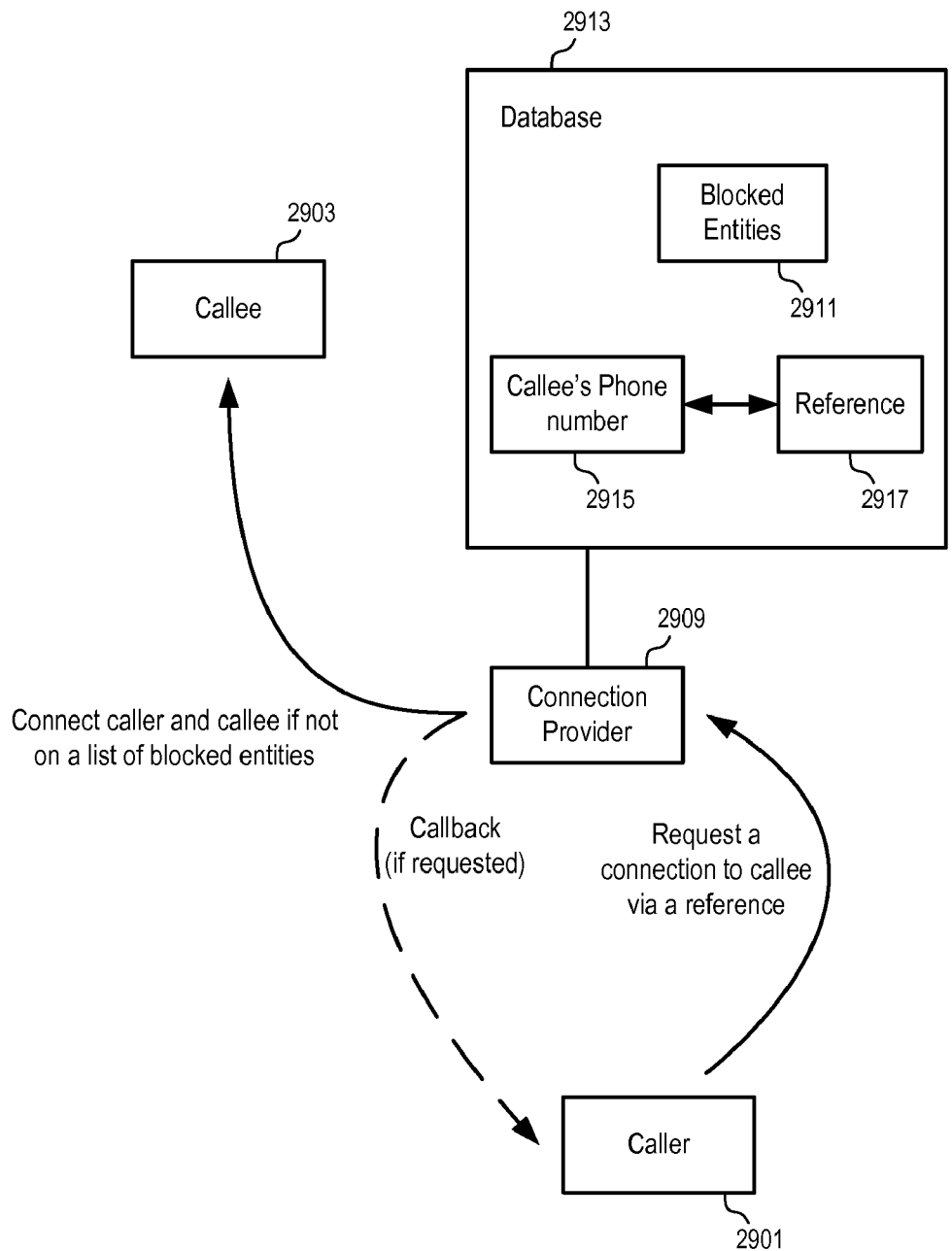
FIG. 29 illustrates a system to block calls from reaching a destination according to one embodiment of the disclosure.

FIG. 29 illustrates a system to block calls from reaching a destination according to one embodiment of the disclosure. In FIG. 29, a request for a telephone connection is initiated by a caller (2901) who sends a request to the connection provider via a reference (2917) that is associated with the phone number (2915) of the callee (2903). The request may be sent via a phone call to the connection provider (2909), via a selection of an icon or link provided in a web page (e.g., an advertisement, or a blog), via sending an email or SMS to the connection provider for a callback, via an instant message to the connection provider (2909), via a VoIP-based call to the connection provider (2909).

Although FIG. 29 illustrates the call process for a phone connection, the process can also be applied to calls for other types of communication sessions, such as a session for real time voice, text, video and/or image communications, or a session for non-real time communications (e.g., email, or SMS communications).

In FIG. 29, the caller (2901) does not have the phone number (2915) of the callee (2903). The caller (2901) requests the connection to the callee (2903) via a reference (2917) provided by the connection provider (2909). The reference (2917) may be provided in an advertisement presented on behalf of the callee (2903), or provided to the callee (2903) for distribution to customers (e.g., via a blog of the callee, or business cards).

For example, the reference (2901) can be a phone number of the connection provider assigned to the callee, such as a plain phone number (with or without extension), or a SIP phone number, or an instant messaging ID. Alternatively, the phone number may be a click-to-call reference for requesting a callback to the caller (2901) for a connection to the callee (2903).

In FIG. 29, the connection provider (2909) uses the reference (2917) to determine the callee's phone number (2915) using the database (2913). Alternatively, the reference (2917) may include an encoded/encrypted version of the phone number of the callee; and the phone number of the callee can be decoded/decrypted without relying on a database.

In FIG. 29, before the connection provider calls the callee (2903) using the callee's phone number (2915), which may be a plain phone number with or without an extension, or a SIP phone number, or a VoIP user ID, or a uniform resource identifier, the connection provider (2909) checks the blocked entities (2911) to determine whether the call should be blocked.

In one embodiment, if neither the callee's phone number nor the caller's phone number is on the list on the blocked entities, the connection provider (2909) initiates a call to the callee (2903) using the callee's phone number (2915) to provide a phone connection between the callee (2903) and the caller (2901). When a callback is requested, the connection provider (2909) also initiates a separate callback to the caller according to a callback number obtained from the caller (2901). The callback number may be obtained from the caller (2901) together with the request, or looked up from a database based on an identity of the caller (2901) or an identity of a device used by the caller (2901) to submit the request.

In one embodiment, when the caller (2901) receives the callback, the caller (2901) may be instructed to confirm the acceptance of the callback for a connection between the caller (2901) and the callee (2903). For example, the caller (2901) may be asked to press a key (e.g., "*" or "9"), or dial a sequence (e.g., "#99", or "*75", etc.), or provide a voice response (e.g., "yes" or "connect"), before the system further makes a connection to the callee (2903). Thus, the system can confirm that the caller (2901) is actually available before making a call to the callee (2903), reducing or eliminating the possibility of false calls to caller (2901).

In one embodiment, the instructions for the confirmation of the acceptance of the callback are provided over the callback connection between the caller (2901) and the connection provider (2909). Alternatively, the instructions for the confirmation of the acceptance of the callback are provided over a data connection as a response to the callback request. For example, if the callback request is received via a web request, the instruction can be provided via a web response. Further, in one embodiment, a different key (or sequence or the voice response) may be required for the acceptance for different callbacks requests. For example, the key, sequence or the voice response may be randomly selected for a callback request. In one embodiment, the required key, sequence or the voice response is presented in the form of a CAPTCHA test. For example, a distorted visual or audio presentation of a code can be provided as a response to the callback response; and the correct code is required over the callback connection to confirm the acceptance of the callback request. The CAPTCHA test can be provided in response to an indication of the lack of a human behind the callback request.

In one embodiment, the caller (2901) is required to stay connected for a period of time, after the caller (2901) receives the callback, before the system initiates the call to the callee (29013). For example, after the caller (2901) picks up the phone in response to the callback, the system presents a message to the caller (2901) over the phone connection between the caller (2901) and the connection provider (2909) (e.g., indicating that the callback in response to a request for a phone connection to the callee (2903)). If the caller (2901) fails to stay connected for the period of time, the system can avoid a false call to the callee (2903).

Alternatively or in combination, the caller may be asked to provide an indication if the callback is unwanted. For example, the caller (2901) may be asked to press a key (e.g., "#" or "1"), or dial a sequence (e.g., "#11", or "*99", etc.), or provide a voice response (e.g., "spam", or "wrong number", "block it"), if the caller (2901) did not request the callback.

In one embodiment, if the caller (2901) fails to provide the indication to confirm the acceptance of the callback for a connection between the caller (2901) and the callee (2903), or fails to stay connected for the period of time, or indicates that the callback is unwanted, the connection provider (2909) can put the source of the request for the callback on a block list to prevent future false callbacks to the caller (2901).

In one embodiment, the caller (2901) can request a phone connection without requesting a callback. For example, the caller (2901) can dial a phone number of the connection provider to request that the call be further connected to the callee. The connection provider can determined the callee based on the phone number dial the caller (2901) to reach the connection provider and/or an extension dialed by the caller. Alternatively, the caller may be prompt to identify the callee via an Interactive Voice Response (IVR) system, or a human operator based on a reference number or identifier provided in an advertisement. For example, the caller (2901) can make a VoIP-based voice connection (e.g., a SIP phone call, or a voice-based instant messaging call) to the connection provider to request the further connection to the callee (2903).

In one embodiment, the callee (2903) may request the connection provider to block incoming calls to the callee (2903) from the connection provider. For example, the callee (2903) may request the connection provider to block incoming calls for a certain period of time the day and/or on a certain day of the week. For example, the callee (2903) may request the connection provider to block further incoming calls when the callee (2903) has a predetermined number of received calls that have not yet been disconnected. For example, the callee (2903) may request the connection provider to block, for a period of time, repeated calls that have been previously disconnected by the callee for a conversation that was shorter than a threshold. In response to such request, the callee (2903) is added to the list of blocked entities (2911) with the corresponding conditions for the call blocking request. The callee (2903) may subsequently modify the call blocking request, or delete the call blocking request.

In one embodiment, the caller (2901) is identified and added to the blocked entities by the connection provider (2909). For example, the caller (2901) may be identified as a spammer who making indiscriminate calls that are generally unwanted by the corresponding callees. The caller (2901) may be identified based on an identification of the source of the request, such as the phone number (or IP address or email address or other types of addresses) from which the call or request is initiated, an identification of a device used by the caller to initiate the call or request, a callback phone number, a user ID that represents the caller (2901), a credit card number of the caller (2901), a financial account of the caller (2901), a personal identification number of the caller (2901), a digital certificate of the caller (2901), etc.

For example, the callback requests may be received via a web request (e.g., an HTTP request); and the IP address of the device may be used to identify the source. For example, the callback requests may be received via an email or SMS message; and the email address or the mobile phone number can be used to identify the source. In one embodiment, the caller is required to authenticate with the connection provide to request a phone connection with the callee; and the user identifier of the authentication system can be used to identify the source. In one embodiment, a source of payment information from the caller is required to connect the call to the callee; and the source of payment information (e.g., credit card number) can be used to identify the caller.

Spammers may be identified based on the call patterns and call history. For example, the frequency of callback requests initiated from a device can be used to determine whether the device is under the control of a spammer.

In one embodiment, when an abnormal call pattern is detected for calls from a source associated with the caller (2901), the calls from the source may be blocked for a specific callee (e.g., 2903) or a group of callees. For example, when the frequency of the calls initiated from the caller (2901) is above a threshold, the caller (2901) may be blocked. For example, when the call requests from a caller (2901) exceeds a threshold in a predetermined time period, the caller may be blocked for a period of time. For example, when the caller (2901) initiates more than a predetermined number of simultaneous calls, the caller (2901) may be blocked.

In one embodiment, a call blocking rule has an expiration time period. For example, when the caller (2901) accidentally initiates multiple simultaneous calls, the caller (2901) may be blocked for a period of time. After the expiration of the time period, the caller (2901) is allowed to make calls via the connection provider (2909) without further actions from the caller (2901).

In one embodiment, after a caller is blocked, the caller may use an authentication process to further provide an identity of the caller to avoid being blocked. For example, the caller may provide a pair of user name and password to verify an identity of the caller; after the successful authentication process, the caller can be considered as a different source; and if the caller as being identified by the user name is not on the list of blocked entities (2911), the call request can be accepted for a connection to the callee (2903). Thus, different users of a phone or a computer may make different requests, which can be selectively blocked based on the identities of the callers. For example, calls initiated from a public phone can be selectively blocked based on the identify of the callers; and the block for calls initiated from the public phone may be expired automatically after a period of time (e.g., one hour, or a day). In one embodiment, the time period to expiration increases as the number of previous blocks increase.

In one embodiment, the caller can provide a valid credit card number or a digital certificate to specifically identify the caller.

In one embodiment, the caller can pay a fee (e.g., to the callee and/or to the system) in a request associated with the source to ask the system to remove the source from the list of the blocked entities. In one embodiment, the fee may increase as the number of previous blocks increase to discourage spammers.

In one embodiment, when a source of a call is determined to be on a blocked list, the callers can be prompted to provide information to verify their identities. For example, the callers can be prompted to provide a credit card number, a pair of username and password, a pin number, an account number, a phone number, an email address, an instant messaging user ID, etc. In one embodiment, to verify that the caller is a human and/or the identity, the caller can be asked to pass a CAPTCHA test, and/or to receive a confirmation code via SMS (or via email or instant message or a voice mail or a callback to the caller) and provide the correct confirmation code back to the system.

In one embodiment, different prompts are played to the callers based on whether or not the source of the call is on a blocked list, the level of block if the source of the caller is on the blocked list.

In one embodiment, after the caller reveals more detailed identity of the caller (e.g., via an authentication process, a credit card number, a personal identification number, a digital certificate) to avoid being blocked, the caller is subsequently identified using such detailed/specific identification information, such as the user name, the credit card number, the personal identification number, the digital certificate, etc.

The source as represented by the detailed information can be further blocked, in response to abnormal usage pattern or requests from callees.

For example, a caller as identified using the user name, the credit card number, the personal identification number and/or the digital certificate can be subsequently identified as sources that need to be blocked. To further avoid being blocked, the caller may be required to pay a fee; and the fee may be increased as the block level increases. Alternatively, the caller may explain the situation to an operator to ask the operator to remove the block.

In one embodiment, the block level for a source can be decreased after a number of legitimate calls have been received from the source. For example, a caller at the source may present a detailed identity to avoid the block and to request a legitimate call to a callee. After making a number of legitimate calls from the source for one or more callers who have revealed their detailed identities, the block on the source may be removed.

For example, after an IP address of the caller's computer is on the list of the blocked entities, the caller may submit subsequent requests from the computer via an authentication process. After a period of operations from the computer, the system may determine that the risk of spamming from the computer is substantially reduced and thus remove the IP address of the caller's computer from the blocked entities. After the removal of the IP address of the caller's IP address from the list of blocked entities, the caller can make subsequent requests without going through the authentication process.

In one example, if a number of registered users using a computer having an IP address has been blocked for various reasons, subsequent registered users using the computer may be required to present a valid credit card number, and/or a digital certificate to identify themselves to avoid being blocked.

In one embodiment, the source of a call can also be identified via the identity of a distribution source that is responsible for delivering the communication reference (e.g., a phone number or a call button). For example, a phone number introduced to the caller via one entity may not be blocked, while the phone number introduced to the caller via another entity may be blocked. In one embodiment, the caller is prompted to identify the distribution source.

Alternatively, the distribution source may be identified automatically. For example, the referring URL of a call button can be used to determine identity of the distribution source of the call button. When a call button is selected in a browser, the browser sends the URL of the document that contains the call button, together with the request initiated through selection of the call button. Thus, the In one embodiment, the system can selectively block or allow the calls based on the identity of the distribution source and/or other conditions.

Thus, the system provides an hierarchical, flexible system to allow the removal of blocks by the callers themselves when they are blocked due to various reasons. By identifying the caller with varying degrees of certainty, the system can balance the convenience and privacy for the callers and the frequency of unwanted calls. The higher is the certainty requirement for identifying a caller, the higher is the deterrence to potential spammers. The lower is the certainty requirement for identifying a caller, the more convenient and private is the system for the caller.

Figure 30:
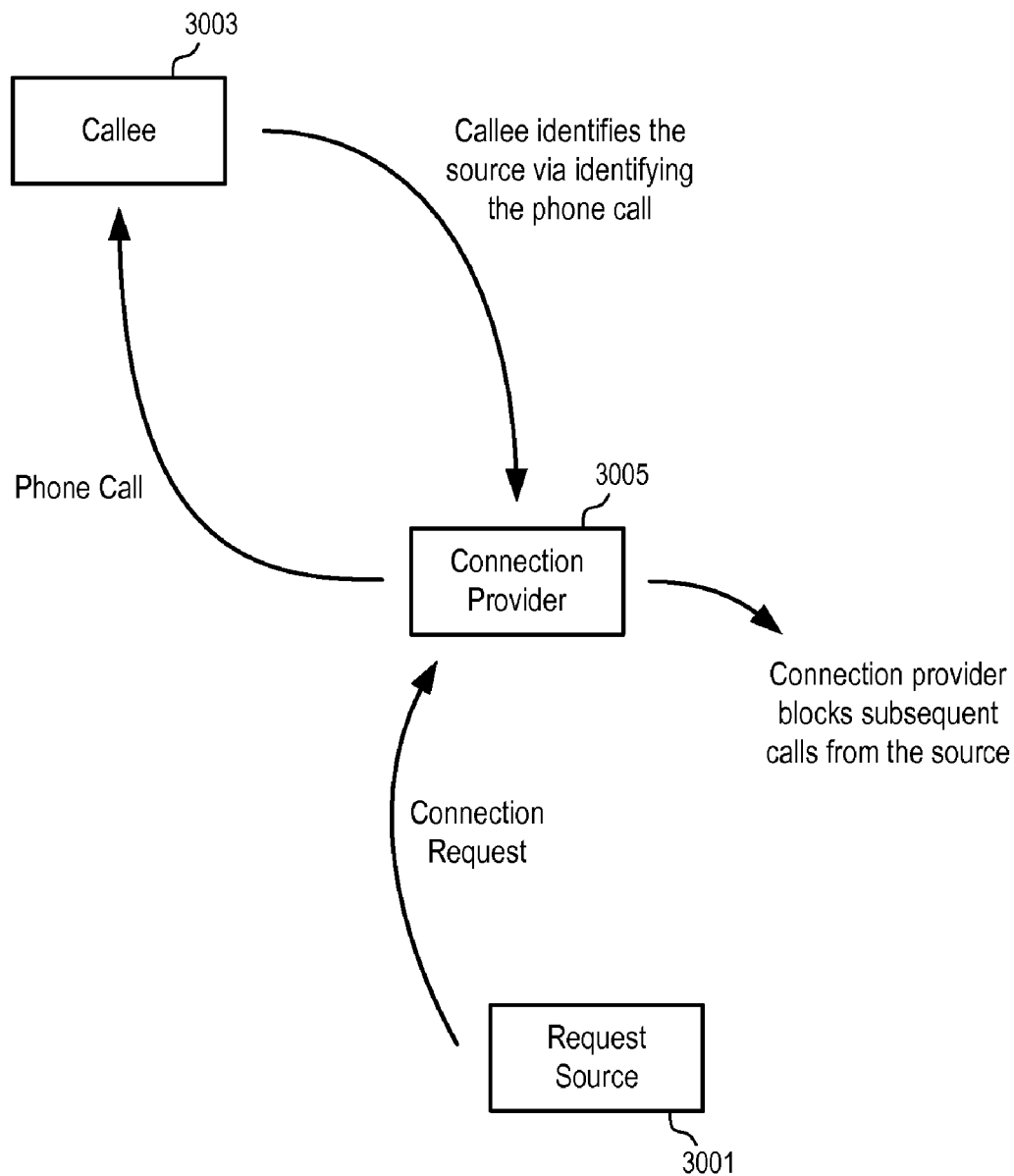
FIG. 30 illustrates a method to identify request sources for call blocking according to one embodiment of the disclosure.

FIG. 30 illustrates a method to identify request sources for call blocking according to one embodiment of the disclosure. In one embodiment, a callee (3003) can request the connection provider (3005) to block subsequent calls initiated from a request source (3001). After receiving a call from a connection provider (3005) that is in response to a request from the source (3001), the callee (3003) can request the connection provider (3005) to block subsequent calls that are initiated from the same source (3001) of the received call. The callee (3003) identifies the source (3001) via identifying the phone call that is received from the connection provider (3005). Based on the connection records, the connection provider (3005) can identify the source (3001) based on various information available to the connection provider (3005), such as the callback phone number of the caller, the phone number that initiated the call to the connection provider (3005), the IP address or email address that is used to initiate the callback request, the user name of the caller if the identity of the caller is authenticated, the credit card number of the caller, and/or a digital certificate of the caller, etc.

In one embodiment, connection provider (3005) maintain a record of identification information of the request source (3001) for a phone call that is placed by the connection provider (3005) to the callee (3003) in response to the request. If the callee requests the connection provider (3005) to block subsequent calls from the source, the connection provider (3005) generates a record in the list of blocked entities, based on the record of identification information of the request source. The list of blocked entities are checked for the subsequent call requests.

In one embodiment, the callee (3003) can instruct the connection provider (3005) to block subsequent calls from the source by dialing a sequence (e.g., "#99", or "*75", etc.) before the callee disconnects the phone connection between the callee (3003) and the connection provider (3005).

Alternatively, the callee (3003) can instruct the connection provider (3005) to block subsequent calls from the source by calling the connection provider after the callee disconnects the phone connection for the call from the caller. In one embodiment, the connection provider (3005) blocks subsequent calls from the source that initiated the last call to the callee (3003) via the connection provider (3005). In another embodiment, the callee can further indicate the call from the source by specifying the date and/or time of the call that is received from the connection provider (3005). For example, the callee (3003) may be connected to an operator or an interactive voice response (IVR) system to provide input to identify the call that is received from the source via the connection provider (3005).

Alternatively, the callee (3003) may use other communication channels to request the connection provider (3005) to block the request source (3001). For example, the callee (3003) may use a web interface to submit the request to block the source (3001); or the callee (3003) may send an email or SMS message to the connection provider (3005) to submit the request to block the source (3001).

In one embodiment, a user interface is provided via a data connection between the callee (3003) and the connection provider (3005) while the phone connection between the callee (3003) and the connection provider (3005) is maintained for the request from the source (3001). For example, the user interface may be a web page including a link or icon which can be selected to block further calls from the request source (3001), with or without disconnecting the current phone connection between the callee (3003) and the caller.

In one embodiment, the callee (3003) can further indicate a reason for blocking the source; and the connection provider (3005) can determine whether to block the source for calls to other callees, based on the reason provided by the callee (3003). For example, if the callee simply does not want to receive subsequent calls from the caller, the caller may be allowed to call other callees via the connection provider. However, if the callee identifies the caller as a spammer, the connection provider may block call requests from the source from reaching the callee (3003) and other callees.

Since the callee (3003) may mistakenly identify the source (3001) as a spammer, or the source (3001) may be subsequently associated with a non-spammer (e.g., when the IP address is reassigned to a different user of a different computer), the system provides a way for the user at the source (3001) to avoid being blocked indefinitely without the need for further actions from the callee (3003). For example, the block may be set to expire in a period of time; for example, the callers may further identify themselves by providing personal identification information which a spammer would avoid. In one embodiment, when the callee (3003) indicates that the source (3001) is a spammer, the system can further determine the likelihood that the source (3001) is a spammer based on call activities that are associated with the source. Thus, a combination of the monitored call activities and input from the callees can be used to more reliably identify spam sources.

In one embodiment, a correct code may be required to avoid being blocked, or to have the corresponding source removed from the list of blocked entities. For example, a callee may specify a code for acceptance of incoming calls. The code can be provided in an advertisement presented on behalf of the callee, or be distributed by the callee. The caller may be required to present the code in a request for a connection to the callee. When the code is received, the call request is temporarily unblocked; or the source is removed from the list of blocked entities.

In another embodiment, the connection provider provides a code to determine whether there is a human behind the request. For example, in one embodiment, the code is presented in a way that is difficult for an automated computer process to recognize. For example, the code may include a Completely Automated Public Turing test to tell Computers and Humans Apart (CAPTCHA), in a text format, an audio format, a voice format, or a video format. If the caller fails to provide correct the code in the request for a connection, the request may be blocked; and the caller may be added to the list of blocked entities if the caller fails the test multiple times in a short time period.

In one embodiment, a callee can use a call management tool (e.g., similar to the user interface illustrated in FIG. 18) to selectively block subsequent calls from various sources. The call management tool can display an entry corresponding to a call that is currently connected to the callee; and the callee can select the entry to request a block on the source associated with the entry. In one embodiment, the call management tool can further display a pre-defined number of previously received calls or previously received calls within a pre-determined time period (e.g., within the last twenty four hours, or within the seven days, etc.) Using the call management tool, the callee can easily identify a source from which subsequent calls need to be blocked. In one embodiment, the callee can use the management tool to selectively display certain calls by specifying a profile (e.g., the call duration, a time window of the calls, etc.) and thus reduce the number of calls to be examined for the identification of calls that need to be blocked.

In one embodiment, an operator (or administrator) of the system can use a user interface to list calls and associated sources of the calls. Using the user interface, the calls need to be blocked (e.g., based on a complain from a callee, or abnormal usage patterns) can be identified. The sources of the calls can be then identified for blocking future calls from the identified sources. The sources may be identified based on the identifiers of the devices from which the calls or the request for calls are initiated (e.g., IP address, phone number, device serial number, etc.), the identifiers of the callers (e.g., PIN numbers, username, account number, credit card number, digital certification, etc.), and/or the referring distribution sources of the calls.

FIG. 31 illustrates rules to block calls according to one embodiment of the disclosure. The rules may be used to implement at least part of the list of blocked entities (2911) in the database (2913) in FIG. 29.

In FIG. 31, the rules may include a number of fields for the identification of call destinations (e.g., callee's user ID 3101 and callee's phone number 3102) and the fields for the identification of the request sources (e.g., caller's user ID 3103, caller's phone number 3104, caller's IP address 3105). A rule can have an expiration date and/or time (3106).

For example, when a callee A123 requests the connection provider to block a source, the connection provider may determine that that source is a request for callback to phone number 456-789-1234 and the callback request is received from IP address 178-25-3-12; thus, the system can add a rule including fields 3111-3116 to block the calls to callee A123 (3111) that are initiated from the IP address 178-25-3-12 (3115) and/or the phone number 456-789-1234 (3114). Further, if the callee A123 indicates that the received call is from a spammer, the rule including fields 3121-3126 is added to block calls from the phone number 456-789-1234 (3124).

For another example, if the connection provider detects abnormal call patterns associated with the phone number 456-789-1234, a rule including fields 3121-3126 can be added to block calls initiated from the phone number 456-789-1234 (3124).

For example, a user C821 calling from the phone number 456-789-1234 may avoid being blocked by providing the user ID C821 in an authentication process. If the call is connected to the callee B213 who subsequently requests the connection provider to block calls from the same source, a rule including fields 3131-3136 can be added to specifically block calls from the user C821 (3133) to the user B213 (3131).

In one embodiment, the callee may request the calls to a specific phone number of the callee be blocked while allowing calls to other phone numbers of the callee. For example, the rule including fields 3141-3146 can be added to specifically block calls from user C821 (3143) to the phone number 800-789-1234 (3142) of user D533 (3141).

In one embodiment, the methods to block calls to callees can also be used to block unwanted callbacks. For example, when the callback number belongs to a registered user of the system, the user may log into the system to view callback histories and request the system to block the sources of callback requests for subsequent callbacks. For example, before the phone connection between the connection provider and the recipient of the callback is disconnected, the recipient of the callback may dial a sequence (e.g., "**#") to instruct the connection provider to block subsequent callbacks initiated from the same source. For example, after the phone connection between the connection provider and the recipient of the callback is disconnected, the recipient of the callback may call the connection provider to block subsequent callbacks initiated from the source, such as the last callback from the connection provider or a callback as identified by the caller based on an indication of the date and/or time of the callback. To remove a block, the caller can make a call to the connection provider to explicitly identify a source that is to be allowed for the initiation of callbacks. Alternatively, the caller may submit a code to the connection provider to allow the connection provider to remove blocks on sources which can provide the correct code with the call request.

Figure 32:
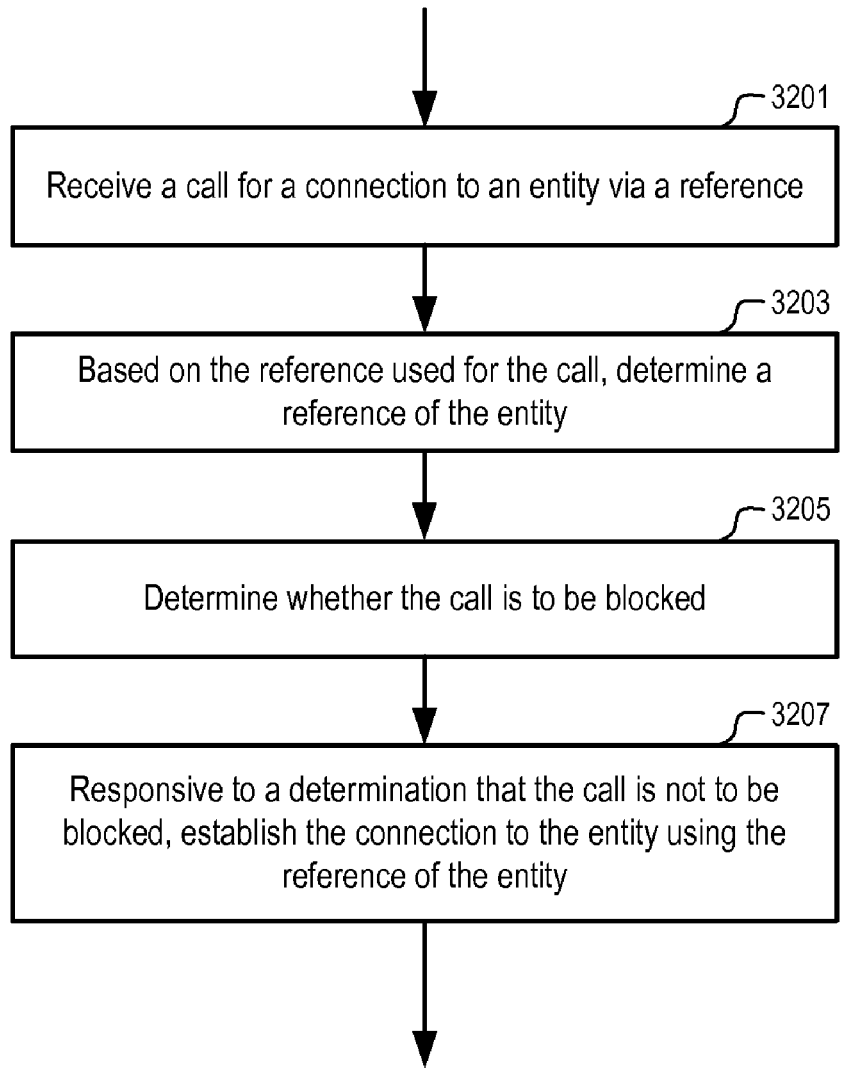
FIG. 32 shows a flow diagram of a method to connect calls according to one embodiment of the disclosure.

FIG. 32 shows a flow diagram of a method to connect calls according to one embodiment of the disclosure. In FIG. 32, a call for a connection to an entity is received (3201) via a reference; based on the reference used for the call, a reference of the entity is determined (3203); it is determined (3205) whether the call is to be blocked; and responsive to a determination that the call is not to be blocked, the connection to the entity is established (3207) using the reference of the entity. In one embodiment, the connection is established to facilitate two-way communications in real time in at least one of voice, text, image, video, and audio.

In one embodiment, the reference used for the call includes a phone number of a service provider; and the reference of the entity includes a phone number of the entity. For example, the phone number of the service provider may include a Session Initiation Protocol (SIP) Uniform Resource Identifier (URI), or an extension to be dialed in Dual Tone Multi-Frequency (DTMF), or an extension to be provided via an interactive voice response system. In one embodiment, the reference used for the call includes a communication address of a service provider; and the reference of the entity includes a communication address of the entity.

In one embodiment, whether the call is to be blocked is determined without using the reference of the entity. For example, whether the call is to be blocked can be determined based on a pattern of call requests initiated from a source, such as a frequency of call requests initiated from the source. The source may be an Internet Protocol (IP) address, a phone number, or a user identifier.

In one embodiment, whether the call is to be blocked is determined based on the reference of the entity and a source of a request for the call.

In one embodiment, responsive to an indication from the entity, subsequent calls from the source for connections to the entity are blocked. In one embodiment, a requester from the source is authenticated for subsequent calls for connections after the indication received from the entity. In one embodiment, calls from the source for connections to the entity are unblocked after a predetermined period of time since the indication.

In one embodiment, the reference used for the call is provided in an advertisement. The call is in response to the advertisement. The connection is established between the entity and a requester of the call without authenticating the requester. And, the entity is charged for the advertisement based on a count of one or more connections made to the entity via the reference provided in the advertisement.

In one embodiment, the reference is provided to the entity for distribution to customers. A source of payment is verified prior to establishing the connection to the entity. And, the source of payment is charged on behalf of the entity for a period of communication time with the entity over the established connection.

Figure 16:
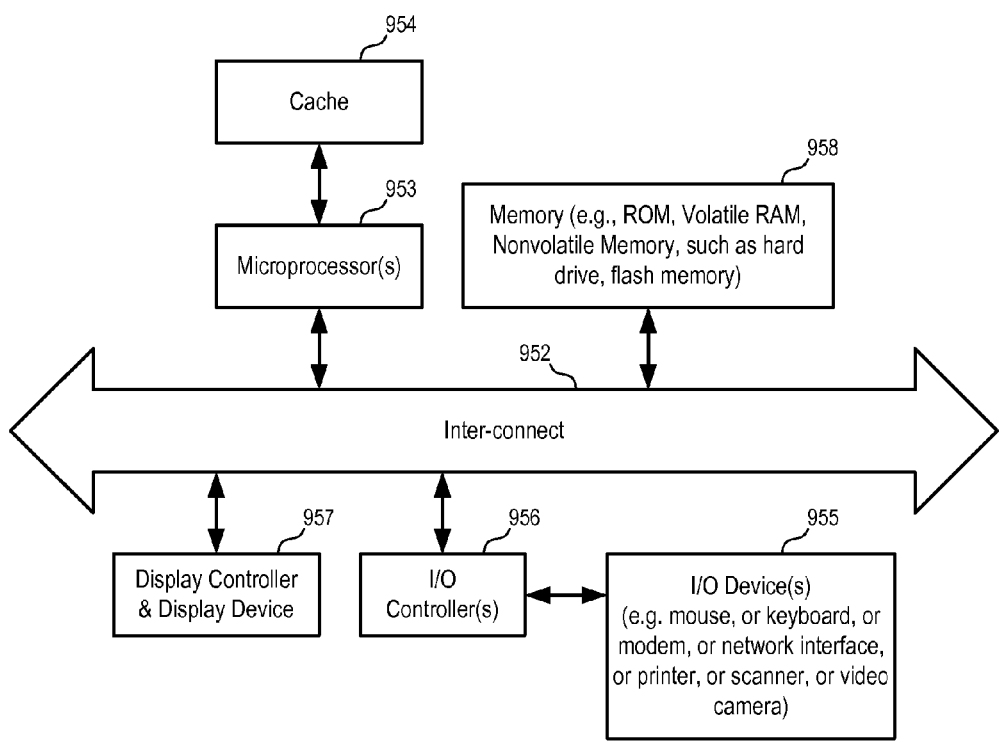
FIG. 16 shows a block diagram example of a data processing system which may be used with the present invention.

FIG. 16 shows a block diagram example of a data processing system which may be used with the present invention.

While FIG. 16 illustrates various components of a computer system, it is not intended to represent any particular architecture or manner of interconnecting the components. Other systems that have fewer or more components may also be used with the present invention.

In FIG. 16, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 16.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 16 is used as one of the communication server(s) (e.g., 929, 925, and/or 921 in FIG. 15, or connection provider 2909).

Further, a user terminal as a client system can be a data processing system similar to the system of FIG. 16. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) may be used in some embodiments of the present invention.

From this description, it will be appreciated that certain aspects of the invention are embodied in the user devices, certain aspects of the invention are embodied in the server systems, and certain aspects of the invention are embodied in a system as a whole.

Embodiments of the present invention can be implemented using hardware, programs of instruction, or combinations of hardware and programs of instructions.

Figure 33:
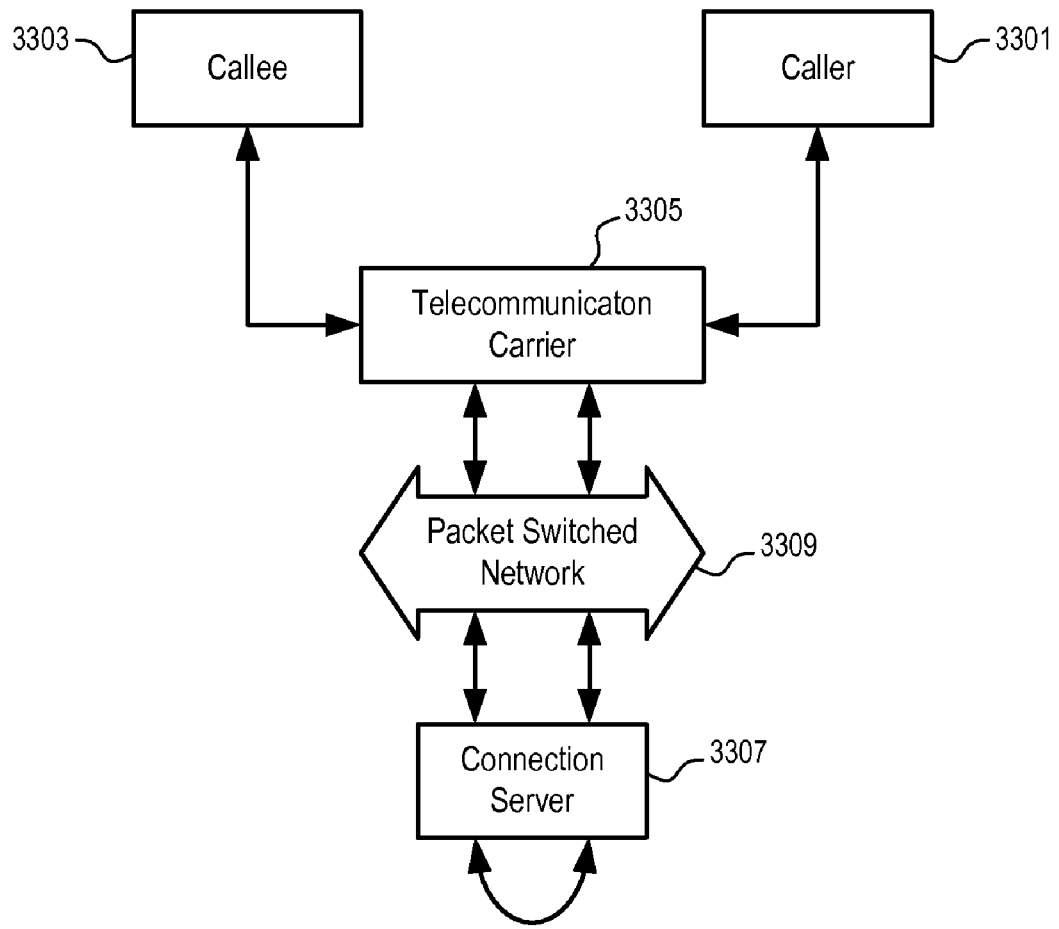
FIG. 33 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 33. In FIG. 33, the connection server (3307) receives and/or places telephone calls via the telecommunication carrier (3305) over the packet switched network (3309). The telecommunication carrier (3305) further routes the telephone communications towards the caller (3301) and the callee (3303).

Since the telecommunication carrier (3305) can route a call from a packet switched network to a variety of destinations (e.g., a traditional analog telephone set, a mobile phone, a cellular phone, a WiFi phone, a Bluetooth phone, a softphone running on a computer, etc.), the connection sever (3307) can use one type of communication connection with the telephone carrier (3305) to facilitate the communication connections with variety of devices used by the customers (e.g., callers and callees). Thus, the implementation of the connection server (3307) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (3305), to the caller (3301) (e.g., the requester of the click-to-call) and the callee (3303) (e.g., the destination of the click-to-call request).

If the caller (3301) (or the callee 3303) is on a public switched telephone network (PSTN), the telecommunication carrier (3305) bridges the packet switched the network and the public switched telephone network (PSTN). The telecommunication carrier (3305) routes the call from the packet switched network (3309) to the caller (3301) (or the callee 3303) on the circuit switched network. Thus, the caller (3301) (or the callee 3303) can use a telephone set to receive the call via a Plain Old Telephone Service (POTS). The connection server (3307) joins the separate calls that are placed via the packet switched network (3309) to connection the callee (3303) and the caller (3301).

In one embodiment, call signaling and media content may use different network paths. While call signaling is arranged to go through the packet switched network (3309) and the connection server (3307), the media stream does not have to go through the connection server (3307). For example, when the calls are joined, the media content may be redirected to flow over the communication carrier (3305) without going through the packet switched network (3309) to the connection server (3307) for improved performance and efficiency. The connection server (3307) can release the control over the media stream to allow the media stream to flow through the shortest path, without going through the connection server, while maintaining control to the connection for the call by staying on the path for call signaling.

In another example, when the caller (3301) initiates a call over a PSTN to the connection server (3307), the telecommunication carrier (3305) converts the call for the packet switched network (3309) for the connection server (3307).

In one embodiment, virtual softphones on the telecommunication carrier (3305) are assigned to the caller (3301) and the callee (3303) for interfacing with the connection server (3307) over the packet switched network (3309). The virtual softphones encapsulates the devices and networks used by the caller (3301) and callee (3303) to access the connection server (3307); and the telecommunication carrier (3305) shields the connection server (3307) from the implementation details of the user devices and networks used by the caller (3301) and the callee (3303). The connection server (3307) calls (or receives calls from) and connects the virtual softphones on the telecommunication carrier (3305) to connect the caller (3301) and the callee (3303).

In FIG. 33, the telephone connection between the telecommunication carrier (3305) and the connection server (3307) is facilitated via a packet switched network (3309). Thus, the connection server (3307) can operate efficiently in a digital domain. The connection server (3307) interfaces with the telecommunication carrier (3305) using one type of Internet Telephony systems (e.g., SIP-based Internet telephony).

Alternatively, a connection server may include some or all of the functionality of the telecommunication carrier (3305). For example, the connection server may be configured to bridge a packet switched network and a circuit switched network. The connection server may support multiple, different types of Internet Telephony systems.

In one embodiment, the connection server (3307) and the telecommunication carrier (3305) are operated by different, separate entities. Alternatively, the connection server (3307) and the telecommunication carrier (3305) may be operated by the same entity. In another embodiment, the telecommunication carrier (3305) includes a set of facilities operated by a number of separate entities.

In one embodiment, the caller (3301) and/or the callee (3303) may also place/receive calls via a packet switched network. The telecommunication carrier (3305) may route the calls between the caller (3301) and the callee (3303) without using a PSTN. In one embodiment, caller (3301) and/or the callee (3303) may place calls to or receive calls from the connection server (3307) via Internet.

Figure 34:
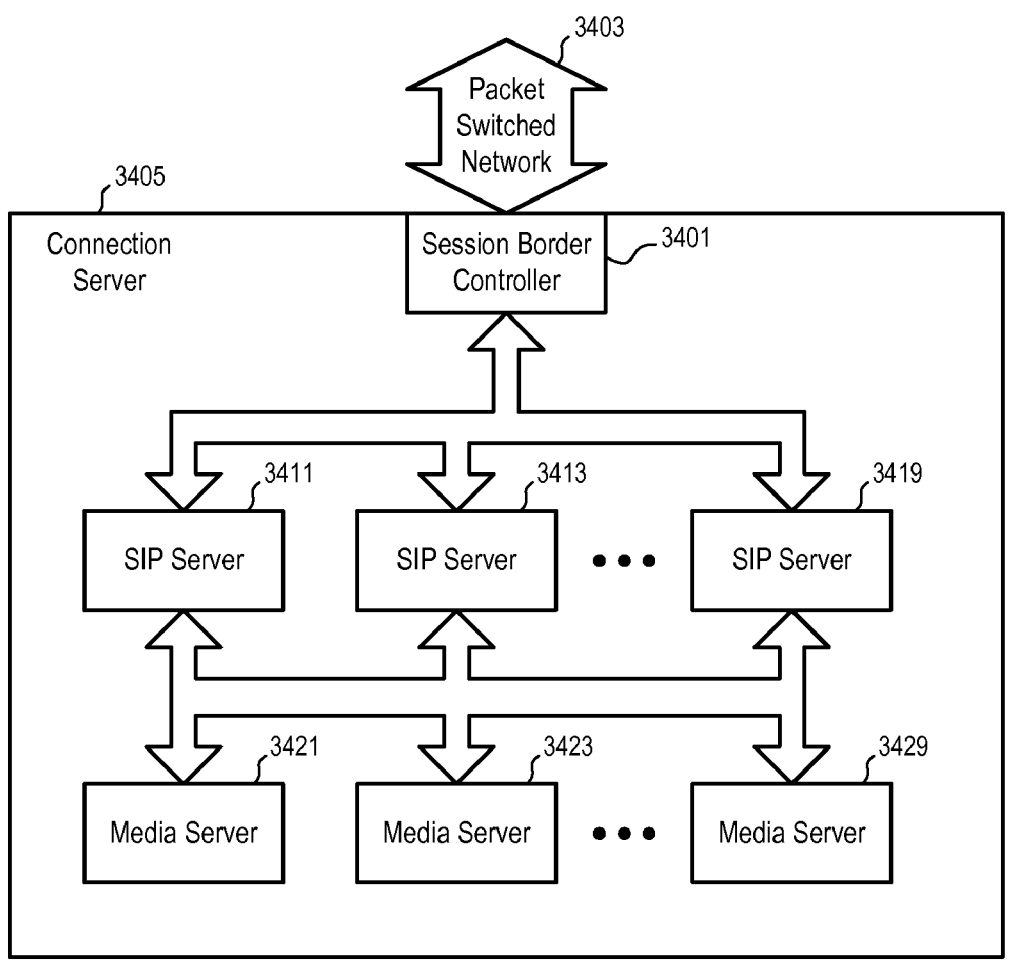
FIG. 34 shows a connection server according to one embodiment.

FIG. 34 shows a connection server according to one embodiment. In FIG. 34, the connection server (3306) is configured to place and/or receive VoIP calls using Session Initiation Protocol (SIP). A session border controller (3401) is used to interface with the packet switched network (3403) and control the types of network traffic related to VoIP calls that might go into the connection server (3405).

In one embodiment, the session border controller (3306) is configured to control the signaling and media stream during the setting up, conducting and tearing down of VoIP calls to or from the connection server (3405). In some embodiments, the session border controller (3306) may pick up the call that comes to the session border controller (3306), places a separate call from the session border controller (3306), and joins the received call and the placed call to control both the signaling and media stream. In some embodiments, the session border controller (3306) may perform signaling/encoding translation to allow the connection server (3405) to process the VoIP calls in one standard, while receiving VoIP calls in a variety of standards (e.g., SIP, H.323, etc.). In one embodiment, the session border controller (3306) is configured to perform one or more firewall functionalities, such as denial of service protection, call filtering, bandwidth management, etc.

In one embodiment, the session border controller (3306) is configured to perform media releasing operation. When the session border controller (3306) determines that the source and destination of a media stream is on the same side of the session border controller (3306) (e.g., both the source and the destination of the media stream is outside the connection server 3405), the session border controller (3306) can release the hairpining of the media stream and allow the media stream to flow without going through the session border controller (3306).

In FIG. 34, a set of SIP servers (e.g., 3411, 3413, . . . , 3419) are networked to the session border controller (3401) to receive messages for incoming calls and to initiate outgoing calls. The session border controller (3401) is configured to evenly distribute the calls for processing by the SIP servers.

For example, when an incoming message for the initiation of a call is received (e.g., a SIP INVITE message from the telecommunication carrier 3305), the session border controller (3401) may route it to a SIP server (e.g., 3411) for processing. The INVITE message includes the phone number dialed by the caller and the contact information about the caller (e.g., the phone number of the caller 3301 and/or the identity of the virtual SIP phone at the telecommunication carrier 3305).

The SIP server may determine whether the phone number dialed by the caller (3303) is sufficient to determine the phone number of the callee (e.g., 3303). If the phone number of the callee (e.g., 3303) can be determined from the phone number dialed by the caller (3303) (e.g., via decoding the phone number dialed by the callee, or looking up the phone number of the callee from a table using the phone number dialed by the caller as a key), the SIP server can place a separate SIP call to the callee via the packet switched network (3403) and then connect the caller and the callee. Alternatively, the SIP server can further route the SIP INVITE message (e.g., to the telecommunication carrier (3305) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (3421) (or a virtual softphone on SIP server) as the initiator for a separate call. The SIP server then connects the calls for the media stream.

In one embodiment, the caller is first connected to a media server (e.g., 3421, 3423, or 3429). For example, the SIP server may forward the SIP INVITE message to one or more of the media servers for answering the call. When a media server (e.g., 3421) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (3403) (e.g., by sending a SIP INVITE message to the telecommunication carrier 3305, which further bridges the call to the callee 3303). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (3401) into the connection server (3405). For example, the media stream can go through the telecommunication carrier (3305) in FIG. 33 without going to the connection server (3307) after the SIP server connects the caller and the callee.

However, the SIP server stays on the signaling path to monitor the progress and termination of the call. The SIP server can also break the connection between the caller and the callee, or force the media stream to come through the connection serve (3405). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (3403) for a connection to the caller. The SIP call may be bridged onto a circuit switched network (e.g., by a telecommunication carrier 3305). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (3411, 3413, . . . , 3419) and media servers (3421, 3423, . . . , 3429) are implemented on separate computers connected via a local area network (and/or intranet or Internet). Alternatively, at least the some of the servers can be implemented on a same computer. In one embodiment, the SIP servers and the media servers are also integrated with the session border controller (3401) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (3405) may further include a database server (3405) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, routines executed to implement the embodiments of the invention may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   receiving, via a communication network, a request by a requester from a source for a connection to an entity using a call reference;
   based on the call reference, determining, via a computing device, an entity reference of the entity;
   determining, via the computing device, whether the call is to be blocked based upon one of a pattern of call requests initiated from the source and an indication from the entity to block calls from the source;
   responsive to a determination that the call is not to be blocked, establishing, via the computing device, the connection to the entity using the entity reference; and
   authenticating, via the computing device, the requester from the source for a subsequent call for a connection.

2. The method of claim 1, wherein the call is received at a connection provider; and
   establishing the connection to the entity comprises:
   the connection provider placing a voice over Internet protocol call to the entity via a third party, wherein the third party bridges the voice over Internet protocol call to a public switched telephone network for the entity.

3. The method of claim 2, wherein a virtual softphone at the third party corresponds to the entity; and establishing the connection to the entity further comprises:
   the connection provider causing a media connection to be established to the virtual softphone without the media connection going through the connection provider.

4. The method of claim 1, wherein the reference used for the call comprises a phone number of a service provider; and the reference of the entity comprises a phone number of the entity.

5. The method of claim 4, wherein the phone number of the service provider comprises a session initiation protocol uniform resource identifier.

6. The method of claim 4, wherein the phone number of the service provider comprises an extension to be dialed in dual tone multi-frequency.

7. The method of claim 1, wherein the call reference comprises a communication address of a service provider; and the entity reference comprises a communication address of the entity.

8. The method of claim 1, wherein determining whether the call is to be blocked comprises:
   determining whether the call is to be blocked without using the entity reference.

9. The method of claim 1, wherein the pattern comprises a frequency of call requests initiated from the source.

10. The method of claim 9, wherein the source comprises one of an Internet protocol address, a phone number, a user identifier, and an identifier of a distributor of the call reference.

11. The method of claim 1, wherein determining whether the call is to be blocked comprises:
    determining whether the call is to be blocked based on the entity reference and a source of a request for the call.

12. The method of claim 1, further comprising:
    unblocking calls from the source for connections to the entity after a predetermined period of time since the indication.

13. The method of claim 1, wherein the connection is established between the entity and a requester of the call without authenticating the requester.

14. The method of claim 13, further comprising:
    providing the reference used for the call in an advertisement; and
    charging the entity for the advertisement based on a count of connections made to the entity via the reference provided in the advertisement.

15. The method of claim 1, further comprising:
    verifying a source of payment prior to establishing the connection to the entity.

16. The method of claim 15, further comprising:
    providing the reference to the entity for distribution to customers; and
    charging the source a payment on behalf of the entity for a period of communication time with the entity over the established connection.

17. The method of claim 1, wherein the connection is established to facilitate two-way communications in real time in at least one of voice, text, image, video, and audio.

18. A tangible machine readable medium storing instructions that, when executed by a computing device, cause the computing device to perform a method, the method comprising:
    receiving a call for a connection to an entity via a call reference;
    based on the call reference used for the call, determining an entity reference;
    determining whether the call is to be blocked based upon one of a pattern of call requests initiated from a source and an indication from the entity to block calls from the source;
    responsive to a determination that the call is not to be blocked, establishing the connection to the entity using the entity reference; and
    authenticating, via the computing device, the requester from the source for a subsequent call for a connection.

19. A data processing system, comprising:
    communication means for receiving a call for a connection to an entity via a call reference; and
    processor means for, based on the call reference, determining an entity reference,
    the processor means further being for determining whether the call is to be blocked based upon one of a pattern of call requests initiated from a source and an indication from the entity to block calls from the source,
    the communication means further being for, responsive to a determination that the call is not to be blocked, establishing the connection to the entity using the entity reference, and
    the processor means further being for authenticating the requester from the source for a subsequent call for a connection.

* * * * *